US009807798B2

United States Patent
Jung et al.

(10) Patent No.: US 9,807,798 B2
(45) Date of Patent: Oct. 31, 2017

(54) APPARATUS AND METHOD FOR OPERATING RESOURCE IN WIRELESS LOCAL AREA NETWORK SYSTEM SUPPORTING MULTI-USER TRANSMISSION SCHEME

(71) Applicant: Samsung Electronics Co., Ltd., Suwon-si (KR)

(72) Inventors: Byoung-Hoon Jung, Seoul (KR); Hyun-Jeong Kang, Seoul (KR); Sang-Hyun Chang, Seoul (KR); O Hyun Jo, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 59 days.

(21) Appl. No.: 14/834,231

(22) Filed: Aug. 24, 2015

(65) Prior Publication Data

US 2016/0057736 A1   Feb. 25, 2016

(30) Foreign Application Priority Data

Aug. 22, 2014 (KR) .................. 10-2014-0109714
Sep. 3, 2014 (KR) .................. 10-2014-0117230
(Continued)

(51) Int. Cl.
*H04W 74/06* (2009.01)
*H04W 74/00* (2009.01)
(Continued)

(52) U.S. Cl.
CPC ......... *H04W 74/06* (2013.01); *H04W 74/006* (2013.01); *H04W 74/0816* (2013.01); *H04W 84/12* (2013.01)

(58) Field of Classification Search
None
See application file for complete search history.

(56) References Cited

U.S. PATENT DOCUMENTS

2006/0002336 A1* 1/2006 Stanwood ............. H04W 72/10
                                                          370/328
2009/0135776 A1* 5/2009 Sashihara ............. H04W 28/26
                                                          370/329
(Continued)

FOREIGN PATENT DOCUMENTS

EP          1898567         3/2008

OTHER PUBLICATIONS

International Search Report, mailed Dec. 1, 2015, corresponding to International Application No. PCT/KR2015/008821.
(Continued)

*Primary Examiner* — Kodzovi Acolatse
(74) *Attorney, Agent, or Firm* — McAndrews, Held & Malloy, Ltd.

(57) ABSTRACT

The present disclosure relates to a pre-5$^{th}$-Generation (5G) or 5G communication system to be provided for supporting higher data rates Beyond 4$^{th}$-Generation (4G) communication system such as a Long Term Evolution (LTE). A method for operating a resource in a first device in a wireless local area network (WLAN) system supporting a multi-user transmission scheme is provided. The method includes determining a number of resource allocation request messages acceptable at a timing point; and transmitting information related to the number of resource allocation request messages, wherein a resource allocation request message is acceptable if the first device is capable of allocating a resource to a second device that transmits the resource allocation request message at the timing point.

8 Claims, 37 Drawing Sheets

(30) Foreign Application Priority Data

Sep. 30, 2014 (KR) .................. 10-2014-0131896
Oct. 24, 2014 (KR) .................. 10-2014-0145251
Nov. 19, 2014 (KR) .................. 10-2014-0161575

(51) Int. Cl.
*H04W 74/08* (2009.01)
*H04W 84/12* (2009.01)

(56) References Cited

U.S. PATENT DOCUMENTS

| | | | |
|---|---|---|---|
| 2010/0169486 A1 | 7/2010 | McCormack et al. | |
| 2010/0303022 A1* | 12/2010 | Maas | H04L 5/0007 370/329 |
| 2011/0268054 A1 | 11/2011 | Abraham et al. | |
| 2011/0299612 A1 | 12/2011 | Tan et al. | |
| 2012/0082040 A1* | 4/2012 | Gong | H04W 74/0816 370/252 |
| 2013/0229996 A1* | 9/2013 | Wang | H04W 72/0413 370/329 |
| 2014/0244848 A1* | 8/2014 | Lynch | H04L 12/5695 709/226 |

OTHER PUBLICATIONS

Written Opinion of the International Searching Authority, mailed Dec. 1, 2015, corresponding to International Application No. PCT/KR2015/008821.

* cited by examiner

APPARATUS AND METHOD FOR OPERATING RESOURCE IN WIRELESS LOCAL AREA NETWORK SYSTEM SUPPORTING MULTI-USER TRANSMISSION SCHEME

RELATED APPLICATION(S)

This application claims the benefit under 35 U.S.C. §119 (a) of a Korean patent application filed in the Korean Intellectual Property Office on Aug. 22, 2014 and assigned Serial No. 10-2014-0109714, a Korean patent application filed in the Korean Intellectual Property Office on Sep. 3, 2014 and assigned Serial No. 10-2014-0117230, a Korean patent application filed in the Korean Intellectual Property Office on Sep. 30, 2014 and assigned Serial No. 10-2014-0131896, a Korean patent application filed in the Korean Intellectual Property Office on Oct. 24, 2014 and assigned Serial No. 10-2014-0145251, and a Korean patent application filed in the Korean Intellectual Property Office on Nov. 19, 2014 and assigned Serial No. 10-2014-0161575, the entire disclosure of all of which is incorporated herein by reference.

BACKGROUND

The present disclosure relates to an apparatus and method for operating a resource in a wireless local area network (WLAN) system, and more particularly, to an apparatus and method for operating a resource in a WLAN system supporting a multi-user transmission scheme.

To meet the demand for wireless data traffic, which has increased since deployment of $4^{th}$-generation (4G) communication systems, efforts have been made to develop an improved $5^{th}$-generation (5G) or pre-5G communication system. Therefore, the 5G or pre-5G communication system is also called a 'Beyond 4G Network' or a 'Post long-term evolution (LTE) System'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional multiple-input multiple-output (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM), and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

A communication system has evolved to support a high data rate in order to satisfy a demand for wireless data traffic which continuously increases. For example, a communication system has evolved to improve a spectral efficiency and increase a channel capacity based on various schemes such as an orthogonal frequency division multiplexing (OFDM) scheme, a MIMO scheme, and the like in order to increase a data rate.

For example, a WLAN system may use a multi-user multiple input multiple output (MU-MIMO) scheme that includes a plurality of stations (STAs) and a plurality of antennas, an orthogonal frequency division multiple access (OFDMA) scheme that uses a plurality of channels at the same time, and the like in order to support a mass data service.

Meanwhile, a medium access control (MAC) protocol, an institute of electrical and electronics engineers (IEEE) standard that operates based on a contention-based scheme, regards two signal transmissions which are simultaneously performed at a specific timing point as a collision. However, in a MIMO environment, where a plurality of antennas may be used, two or more than two signal transmissions may be detected at the same time. As such, a scheme in which a signal is transmitted to a plurality of STAs using a plurality of antennas, e.g., a MU-MIMO scheme, may be supported.

In a multi-channel environment which a plurality of channels are used at the same time, two or more signal transmissions may be detected through different channels. Thus, a scheme in which a signal is transmitted to a plurality of STAs using a plurality of channels, for example, an OFDMA scheme may be supported. Thus, an IEEE standardization for supporting a MU-MIMO scheme and an OFDMA scheme in a physical (PHY) layer and a MAC layer has been developed.

A structure of a conventional WLAN system supporting a multi-user transmission scheme will be described with reference to FIG. 1.

FIG. 1 schematically illustrates a structure of a conventional WLAN system supporting a multi-user transmission scheme.

Referring to FIG. 1, the WLAN system includes an access point (AP) 111, and a plurality of STAs, e.g., five STAs, i.e., STA#1 113, STA#2 115, STA#3 117, STA#4 119, and STA#5 121.

The STA#1 113, STA#2 115, STA#3 117, STA#4 119, and STA#5 121, and the AP 111 may monitor a channel to receive a related signal.

Upon detecting that a signal is to be transmitted, each of STA#1 113, STA#2 115, STA#3 117, STA#4 119, and STA#5 121, and the AP 111 transmits a related signal if a channel state indicates that a number of slots in an idle state is greater than or equal to a threshold slot count. In a WLAN system, an uplink and a downlink are implemented based on a contention-based scheme.

Thus, if a collision occurs in the uplink and/or the downlink, each of STA#1 113, STA#2 115, STA#3 117, STA#4 119, and STA#5 121, and the AP 111 performs a backoff operation that each of STA#1 113, STA#2 115, STA#3 117, STA#4 119, and STA#5 121, and the AP 111 waits until the channel state indicates that the number of slots in the idle state is greater than or equal to the threshold slot count to transmit a related signal again.

A structure of a conventional WLAN system supporting a multi-user transmission scheme has been described with reference to FIG. 1, and a resource operating process performed in a conventional WLAN system supporting a multi-user transmission scheme will be described with reference to FIG. 2.

FIG. 2 schematically illustrates a resource operating process in a conventional WLAN system supporting a multi-user transmission scheme.

Referring to FIG. 2, the conventional WLAN system is the same as the WLAN system in FIG. 1.

Firstly, an AP 111 transmits a beacon signal at operation 211, and each of STA#1 113, STA#2 115, STA#3 117, and STA#4 119 is allocated a resource from the AP 111 upon detecting a signal is to be transmitted. Each of STA#1 113, STA#2 115, STA#3 117, and STA#4 119 thus transmits a resource allocation request message to the AP 111. In FIG. 2, it will be assumed that STA#2 115 transmits a resource allocation request message to the AP 111 at operation 213, STA#1 113 transmits a resource allocation request message to the AP 111 at operation 215, STA#4 119 transmits a resource allocation request message to the AP 111 at operation 217, and STA#3 117 transmits a resource allocation request message to the AP 111 at operation 219. In FIG. 2, it will be noted that the resource allocation request message is illustrated as 'Request'.

In the embodiment shown, the AP 111 uses a plurality of antennas, e.g., two antennas. As such, while the AP 111 may receive the resource allocation request messages from STA#1 113, STA#2 115, STA#3 117, and STA#4 119, the AP 111 may only allocate resources to two of the STAs, for example, STA#2 115 and STA#1 113, and transmit information, for example, scheduling information on the allocated resources at operation 221. After a short interframe space (SIFS), the AP 111 receives an uplink signal from each of STA#1 113 and STA#2 115 labeled as 'UL MU-MIMO Data' at operations 223 and 225, respectively.

Upon receiving the uplink signal from the each of STA#1 113 and STA#2 115, the AP 111 transmits an acknowledgement (ACK) signal to the uplink signal received from STA#1 113 and STA#2 115 at operations 227 and 229.

The ACK signal may be one of a block MAC protocol data unit (MPDU), an aggregated MPDU (A-MPDU) or a block MAC service data unit (MSDU), and a block ACK (BA) or BACK signal to an aggregated MSDU (A-MSDU).

As described above, in a WLAN system supporting a multi-user transmission scheme, an AP may allocate a resource to up the number of antennas used in the AP. However, the number of STAs to which the AP provides a service may be significantly greater than the number of antennas used in the AP. For example, if the STAs to which the AP provides the service transmit a resource allocation request message at the same time, a collision may occur. In this case, due to the collision, the STAs may transmit a resource allocation request message to the AP again after a preset backoff time has elapsed.

That is, if a resource allocating process is performed in the manner described above, a collision may occur. In this case, efficiency of a radio resource may be decreased and service delay may occur due to a transmission of a resource allocation request message in STAs.

As such, there may be a need for a resource operating method of preventing a collision and decreasing service delay in a WLAN system supporting a multi-user transmission scheme.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to propose an apparatus and method for operating a resource in a WLAN system supporting a multi-user transmission scheme.

Another aspect of the present disclosure is to propose an apparatus and method for operating a resource thereby preventing a collision occurrence in a WLAN system supporting a multi-user transmission scheme.

Another aspect of the present disclosure is to propose an apparatus and method for operating a resource thereby decreasing service delay in a WLAN system supporting a multi-user transmission scheme.

Another aspect of the present disclosure is to propose an apparatus and method for operating a resource thereby increasing wireless resource efficiency in a WLAN system supporting a multi-user transmission scheme.

Another aspect of the present disclosure is to propose an apparatus and method for operating a resource based on the number of signal receiving apparatuses which are capable of requesting resource allocation in a WLAN system supporting a multi-user transmission scheme.

Another aspect of the present disclosure is to propose an apparatus and method for operating a resource based on the number of antennas used in a signal transmitting apparatus in a WLAN system supporting a multi-user transmission scheme.

In accordance with an aspect of the present disclosure, a method for operating a resource in a first device in a wireless local area network (WLAN) system supporting a multi-user transmission scheme is provided. The method includes determining a number of resource allocation request messages acceptable at a timing point; and transmitting information related to the number of resource allocation request messages, wherein a resource allocation request message is acceptable if the first device is capable of allocating a resource to a second device which transmits the resource allocation request message at the timing point.

In accordance with another aspect of the present disclosure, a method for operating a resource in a first device in a wireless local area network (WLAN) system supporting a multi-user transmission scheme is provided. The method includes determining a number of resource allocation request messages acceptable at a timing point; and notifying second devices that the first device allows the second devices to transmit a resource allocation request message based on the number of resource allocation request messages, wherein the resource allocation request message is acceptable if the first device is capable of allocating a resource to one of the second devices that transmits the resource allocation request message at the timing point.

In accordance with another aspect of the present disclosure, a method for operating a resource in a second device in a wireless local area network (WLAN) system supporting a multi-user transmission scheme is provided. The method includes receiving information related to a number of resource allocation request messages acceptable at a timing point from a first device, wherein a resource allocation request message is acceptable if the first device is capable of allocating a resource to a second device that transmits the resource allocation request message at the timing point.

In accordance with another aspect of the present disclosure, a method for operating a resource in a second device in a wireless local area network (WLAN) system supporting a multi-user transmission scheme is provided. The method includes receiving a message notifying that a first device allows second devices to transmit a resource allocation request message from the first device, wherein the first device transmits the message notifying that the first device allows the second devices to transmit the resource allocation request message based on a number of resource allocation request messages acceptable at a timing point, and wherein the resource allocation request message is acceptable if the first device is capable of allocating a resource to one of the second devices that transmits the resource allocation request message at the timing point.

In accordance with another aspect of the present disclosure, a method for operating a resource in a first device in a wireless local area network (WLAN) system supporting a multi-user transmission scheme is provided. The method includes determining a number of resource allocation request messages acceptable at a timing point; and performing a polling operation on second devices based on the number of resource allocation request messages, wherein a resource allocation request message is acceptable if the first device is capable of allocating a resource to a second device that transmits the resource allocation request message at the timing point.

In accordance with another aspect of the present disclosure, a method for operating a resource in a second device in a wireless local area network (WLAN) system supporting a multi-user transmission scheme is provided. The method includes performing a polling operation with a first device, wherein the first device performs the polling operation with the second device based on a number of resource allocation request messages acceptable at a timing point, and wherein a resource allocation request message is acceptable if the first device is capable of allocating a resource to the second device that transmits the resource allocation request message at the timing point.

In accordance with another aspect of the present disclosure, an operating method of a first device in a wireless local area network (WLAN) system supporting a multi-channel is provided. The method includes determining a user group that performs an uplink multi-channel multi-user transmission operation; transmitting a group polling frame signal to request the uplink multi-channel multi-user transmission operation to the user group; receiving a resource allocation request message from stations (STAs) that belong to the user group through different channels; and performing the uplink multi-channel multi-user transmission operation with the STAs.

In accordance with another aspect of the present disclosure, an operating method of a second device in a wireless local area network (WLAN) system supporting a multi-channel is provided. The method includes receiving a group polling frame signal to request an uplink multi-channel multi-user transmission operation; transmitting a resource allocation request message to a first device through a preset channel if there is information to be transmitted; and performing the uplink multi-channel multi-user transmission operation with the first device, wherein the second device is included in a user group that performs the uplink multi-channel multi-user transmission operation, and the preset channel is a channel used by one or more other second devices in the user group.

In accordance with another aspect of the present disclosure, a first device in a wireless local area network (WLAN) system supporting a multi-user transmission scheme is provided. The first device includes a controller configured to determine a number of resource allocation request messages acceptable at a timing point; and a transmitter configured to transmit information related to the number of resource allocation request messages, wherein a resource allocation request message is acceptable if the first device is capable of allocating a resource to a second device that transmits the resource allocation request message at the timing point.

In accordance with another aspect of the present disclosure, a first device in a wireless local area network (WLAN) system supporting a multi-user transmission scheme is provided. The first device includes a controller configured to perform an operation of determining a number of resource allocation request messages which are acceptable at a timing point; and a transmitter configured to perform an operation of notifying to second devices that the first device allows the second devices to transmit a resource allocation request message based on the number of resource allocation request messages, wherein the resource allocation request message is acceptable if the first device is capable of allocating a resource to a second device that transmits the resource allocation request message at the timing point.

In accordance with another aspect of the present disclosure, a second device in a wireless local area network (WLAN) system supporting a multi-user transmission scheme is provided. The second device includes a receiver configured to receive information related to a number of resource allocation request messages acceptable at a timing point from a first device, wherein a resource allocation request message is acceptable if the first device is capable of allocating a resource to the second device that transmits the resource allocation request message at the timing point.

In accordance with another aspect of the present disclosure, a second device in a wireless local area network (WLAN) system supporting a multi-user transmission scheme is provided. The second device includes a receiver configured to receive a message notifying that a first device allows second devices to transmit a resource allocation request message from the first device, wherein the first device transmits the message notifying that the first device allows the second devices to transmit the resource allocation request message based on a number of resource allocation request messages acceptable at a timing point, and wherein the resource allocation request message is acceptable if the first device is capable of allocating a resource to the second device which transmits the resource allocation request message at the timing point.

In accordance with another aspect of the present disclosure, a first device in a wireless local area network (WLAN) system supporting a multi-user transmission scheme is provided. The first device includes a controller configured to determine a number of resource allocation request messages acceptable at a timing point; and a transmitter configured to poll second devices based on the number of resource allocation request messages, wherein a resource allocation request message is acceptable if the first device is capable of allocating a resource to one of the second devices that transmits the resource allocation request message at the timing point.

In accordance with another aspect of the present disclosure, a second device in a wireless local area network (WLAN) system supporting a multi-user transmission scheme is provided. The second device includes a receiver configured to poll with a first device, wherein the first device polls with the second device based on a number of resource allocation request messages acceptable at a timing point, and wherein a resource allocation request message is acceptable if the first device is capable of allocating a resource to the second device that transmits the resource allocation request message at the timing point.

In accordance with another aspect of the present disclosure, a first device in a wireless local area network (WLAN) system supporting a multi-channel is provided. The first device includes a controller configured to determine a user group that performs an uplink multi-channel multi-user transmission operation; a transmitter configured to transmit a group polling frame signal for requesting the uplink multi-channel multi-user transmission operation to the user group; and a receiver configured to receive a resource allocation request message from stations (STAs) that belong to the user group through different channels, wherein the transmitter and the receiver perform the uplink multi-channel multi-user transmission operation with the STAs.

In accordance with another aspect of the present disclosure, a second device in a wireless local area network (WLAN) system supporting a multi-channel is provided. The second device includes a receiver configured to receive a group polling frame signal for requesting an uplink multi-channel multi-user transmission operation; and a transmitter configured to transmit a resource allocation request message to a first device through a preset channel if there is information to be transmitted, wherein the transmitter and the receiver perform the uplink multi-channel multi-user transmission operation with the first device, and wherein the second device is included in a user group that performs the uplink multi-channel multi-user transmission operation, and the preset channel is a channel used by one or more other second devices in the user group.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith,"0 as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
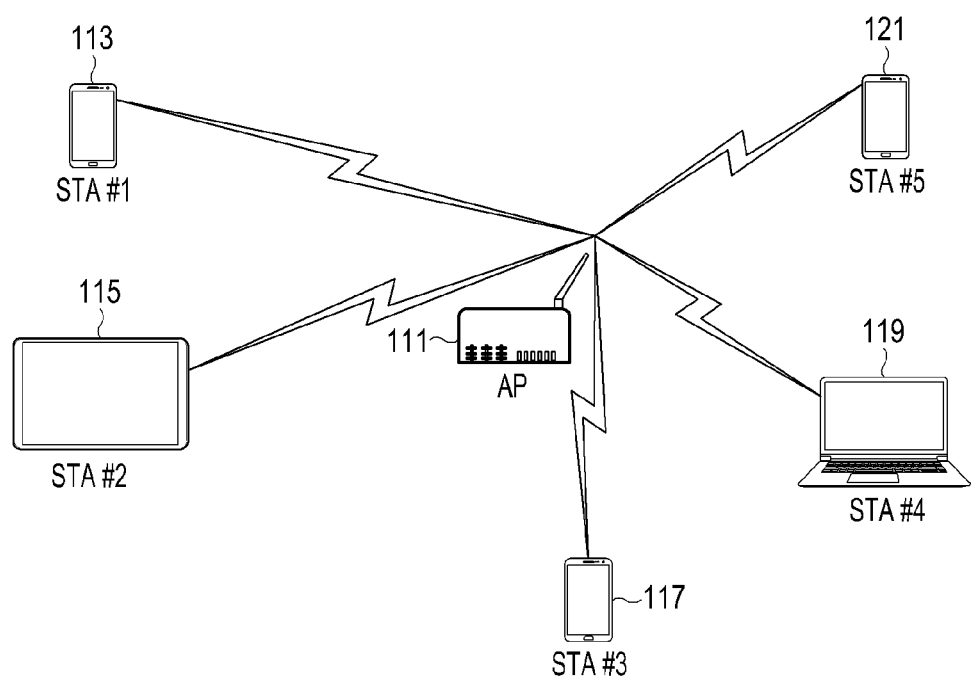
FIG. 1 schematically illustrates a structure of a conventional WLAN system supporting a multi-user transmission scheme.
Figure 2:
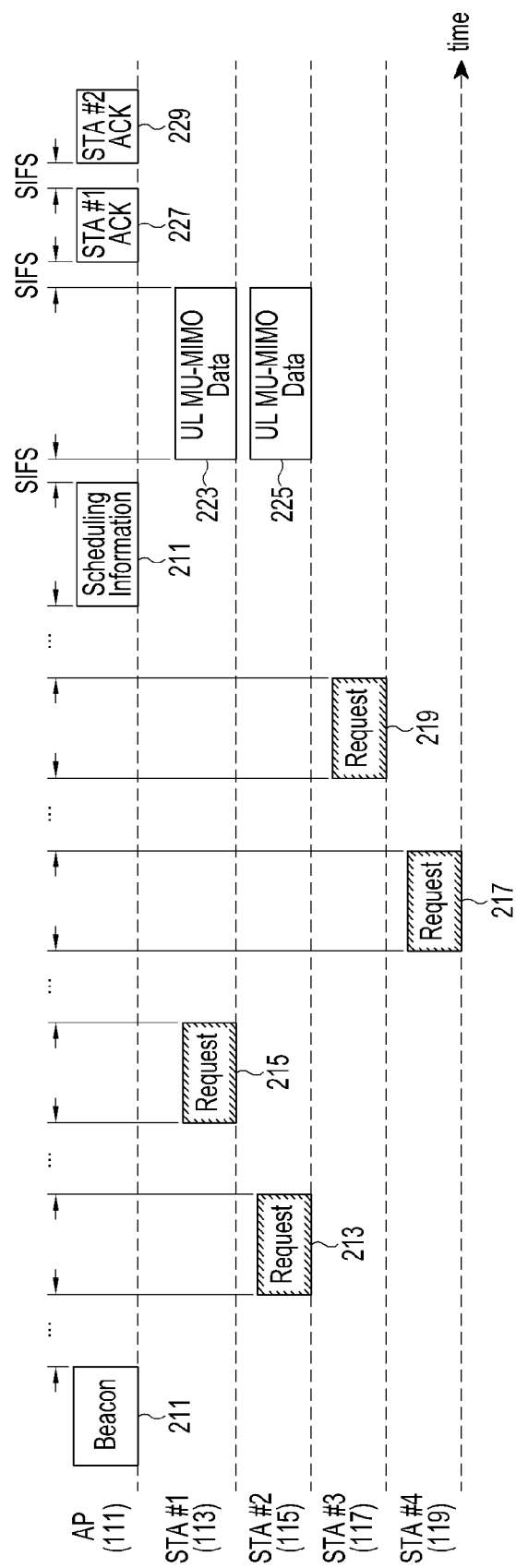
FIG. 2 schematically illustrates a resource operating process performed in a conventional WLAN system supporting a multi-user transmission scheme.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a digital video disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a station (STA) may be an electronic device.

According to various embodiments of the present disclosure, for example, an STA may operate as a signal transmitting apparatus and a signal receiving apparatus, and an access point (AP) may operate as a signal transmitting apparatus and a signal receiving apparatus.

According to various embodiments of the present disclosure, for example, an AP may operate as a resource operating apparatus.

An embodiment of the present disclosure proposes an apparatus and method for operating a resource in a wireless local area network (WLAN) system supporting a multi-user transmission scheme.

An embodiment of the present disclosure proposes an apparatus and method for operating a resource thereby preventing a collision in a WLAN system supporting a multi-user transmission scheme.

An embodiment of the present disclosure proposes an apparatus and method for operating a resource thereby decreasing service delay in a WLAN system supporting a multi-user transmission scheme.

An embodiment of the present disclosure proposes an apparatus and method for operating a resource thereby increasing wireless resource efficiency in a WLAN system supporting a multi-user transmission scheme.

An embodiment of the present disclosure proposes an apparatus and method for operating a resource based on the number of signal receiving apparatuses which are capable of requesting resource allocation in a WLAN system supporting a multi-user transmission scheme.

An embodiment of the present disclosure proposes an apparatus and method for operating a resource based on the number of antennas used in a signal transmitting apparatus in a WLAN system supporting a multi-user transmission scheme.

A method and apparatus proposed in various embodiments of the present disclosure may be applied to various communication systems such as an institute of electrical and electronics engineers (IEEE) 802.11 communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate Packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system and/or the like.

In an embodiment of the present disclosure, it will be assumed that the WLAN system supports a multi-user transmission scheme. In an embodiment of the present disclosure, it will be assumed that the WLAN system supports a multi-channel.

Further, it will be assumed that a WLAN system supporting a multi-user transmission scheme and a multi-channel according to an embodiment of the present disclosure has the same structure as a WLAN system as described in FIG. 1. For example, it will be assumed that the WLAN system supporting the multi-user transmission scheme and the multi-channel according to an embodiment of the present disclosure includes an access point (AP) 111, and a plurality of stations (STAs), e.g., five STAs, i.e., an STA#1 113, an STA#2 115, an STA#3 117, an STA#4 119, and an STA#5 121.

An example of a resource operating process performed in a WLAN system supporting a multi-user transmission scheme according to an embodiment of the present disclosure will be described with reference to FIG. 3.

Figure 3:
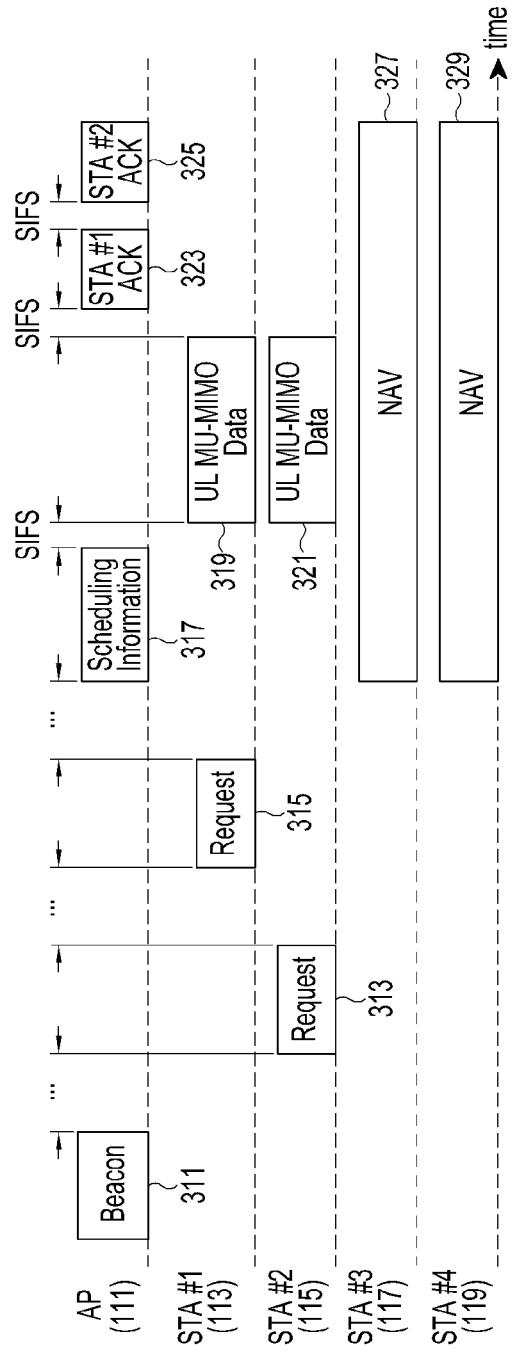
FIG. 3 schematically illustrates an example of a resource operating process performed in a WLAN system supporting a multi-user transmission scheme according to an embodiment of the present disclosure.

FIG. 3 schematically illustrates an example of a resource operating process performed in a WLAN system supporting a multi-user transmission scheme according to an embodiment of the present disclosure.

Specifically, FIG. 3 schematically illustrates a resource operating process based on a contention-based scheme.

An AP 111 transmits a beacon signal at operation 311. The beacon signal includes a resource allocation request count $N_{req}$ determined by the AP 111, and an operation of determining the resource allocation request count $N_{req}$ will be described below. The resource allocation request count $N_{req}$ denotes a number of resource allocation request messages that are acceptable at a timing point based on various parameters, e.g., the number of antennas that the AP 111 uses to communicate. The AP may allocate a resource to a STA that transmits the resource allocation request message upon receiving a resource allocation request message. Specifically, the AP 111 may allocate a resource to a STA that transmits a related resource allocation request message based on the resource allocation request count $N_{req}$.

The beacon signal may include information on a time interval by which the AP 111 intends to receive a resource allocation request message, information on a frequency band at which the AP 111 intends to receive the resource allocation request message, an access category (AC) specifying a kind of traffic which the AP 111 intends to receive from each STA, a traffic characteristic such as a quality of service (QoS), delay, and the like, information on load of a network as well as information related to the resource allocation request count $N_{req}$. At this time, if the AP 111 requests to receive an AC through the beacon signal, each STA transmits a resource allocation request message for traffic included in the AC.

Meanwhile, each of STA#1 113, STA#2 115, STA#3 117, and STA#4 119 monitors the beacon signal to detect the resource allocation request count $N_{req}$, and monitors signals that other STAs transmit. Upon detecting a signal is to be transmitted while performing a monitoring operation, each of STA#1 113, STA#2 115, STA#3 117, and STA#4 119 is allocated a resource from the AP 111 for transmitting a related signal, such that each of STA#1 113, STA#2 115, STA#3 117, STA#4 119 may transmit a resource allocation request message of requesting resource allocation to the AP 111.

However, in an embodiment of the present disclosure, all STAs that may transmit a signal do not transmit resource allocation request messages, but STAs which determine that a resource allocation request message may be transmitted based on the resource allocation request count $N_{req}$ transmit resource allocation request messages. A process of determining that a resource allocation request message may be transmitted based on the resource allocation request count $N_{req}$ in an arbitrary STA will be described below.

In FIG. 3, it will be assumed that STA#1 113, STA#2 115, STA#3 117, and STA#4 119 detect that a signal is to be transmitted. STA#1 113 and STA#2 115 transmit resource allocation request messages at operations 313 and 315, respectively. In FIG. 3, it will be noted that a resource allocation request message is illustrated as 'Request' at operations 313 and 315.

Further, it will be assumed that the AP 111 uses a plurality of antennas, e.g., two antennas, and the resource allocation request count $N_{req}$ is set to 2. STA#1 113 and STA#2 115 transmit resource allocation request messages, such that remaining STAs, i.e., STA#3 117 and STA#4 119 may detect that resource allocation request messages of which the number is greater than or equal to the resource allocation request count $N_{req}$ are transmitted, set a network allocation vector (NAV), and waits until receiving ACK signals at operations 327 and 329.

The AP 111 allocates a resource to the two STAs from which the AP 111 receives the resource allocation message, i.e., STA#2 115 and STA#1 113, and transmits information, for example, scheduling information, on the allocated resource at operation 317. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The AP 111 receives an uplink signal from each of STA#1 113 and STA#2 115 after a preset time, e.g., a short interframe space (SIFS) at operations 319 and 321. The preset time may be one of other various interframe spaces (IFSs) which the communication system may support, e.g., a distributed coordination function (DCF) IFS (DIFS), a point coordination function (PCF) interframe spaces (PIFS), an extended interframe spaces (EIFS), an arbitration interframe spaces (AIFS) as well as the SIFS, and the like, and may be a contention-based interval. In FIG. 3, it will be noted that an uplink signal is illustrated as 'UL MU-MIMO Data'.

Upon receiving the uplink signal from each of STA#1 113 and STA#2 115, the AP 111 transmits an acknowledgement (ACK) signal for the uplink signal received from each of STA#1 113 and STA#2 115 at operations 323 and 325. In FIG. 3, the AP 111 transmits the ACK signal for the uplink signal received from each of STA#1 113 and STA#2 115. However, it will be understood by those of ordinary skill in the art that the AP 111 transmits a group ACK signal for the uplink signal received from each of STA#1 113 and STA#2 115.

In FIG. 3, a plurality of SIFSs are used. Here, each of the plurality of SIFSs may be substituted with other IFSs such as a DIFS, a PIFS, an AIFS, and the like, or a contention-based interval.

An example of a resource operating process performed in a WLAN system supporting a multi-user transmission scheme according to an embodiment of the present disclosure has been described with reference to FIG. 3, and an operating process of an AP in a WLAN system supporting a multi-user transmission scheme according to an embodiment of the present disclosure will be described with reference to FIG. 4.

Figure 4:
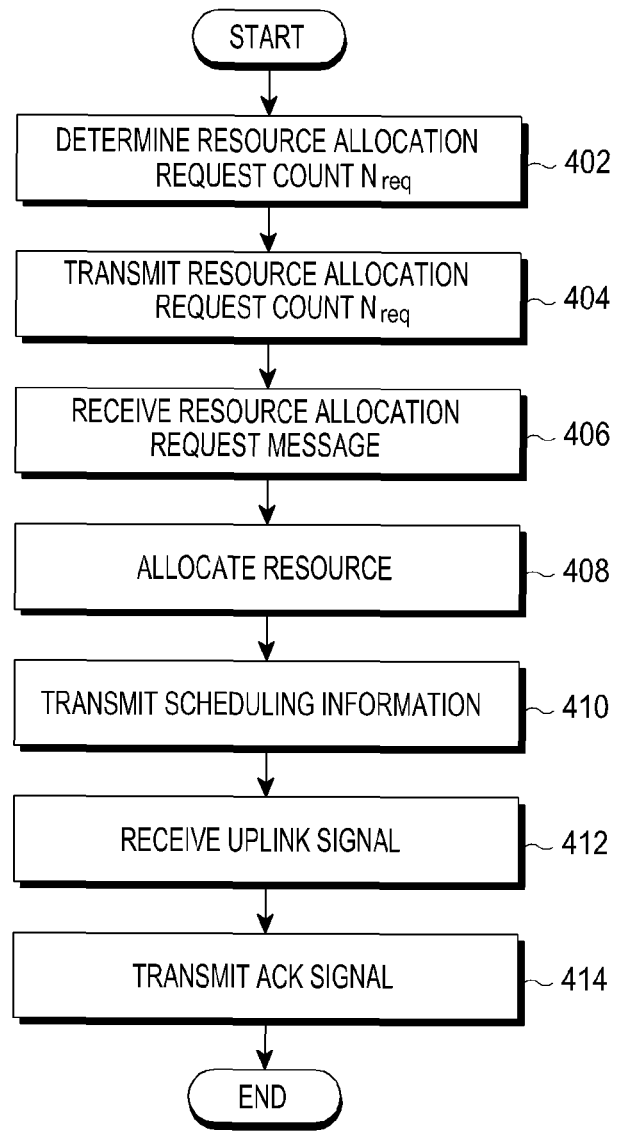
FIG. 4 schematically illustrates an operating process of an AP in a WLAN system supporting a multi-user transmission scheme according to an embodiment of the present disclosure.

FIG. 4 schematically illustrates an operating process of an AP in a WLAN system supporting a multi-user transmission scheme according to an embodiment of the present disclosure.

Referring to FIG. 4, it will be noted that an AP operates as a resource operating apparatus in the WLAN system.

Referring to FIG. 4, the AP determines a resource allocation request count $N_{req}$ at operation 402. A process of determining the resource allocation request count $N_{req}$ will be described below.

Firstly, the AP may determine the resource allocation request count $N_{req}$ as the number of reception antennas which the AP uses.

Secondly, the AP may determine the resource allocation request count $N_{req}$ based on at least one of the number of STAs included in a basic service set (BSS), a transmission probability of each of the STAs, a traffic model, a collision probability of a channel, and the number of reception antennas $N_{rx}$. That is, the resource allocation request count $N_{req}$ may be determined by a function of which a variable is one of the number of STAs which belongs to the groups included in the BSS, the transmission probability of each STA, the traffic model, the collision probability of the channel, and the number of reception antennas $N_{rx}$. The collision probability of the channel may be detected by measuring an actual collision, or may be estimated based on an uplink traffic characteristic, a downlink traffic characteristic, and the transmission probability of each STA. If the collision probability of the channel increases, the resource allocation request count $N_{req}$ may increase. This is why the AP maintains the number of resource allocation request messages which the AP normally receives since the increase of the collision probability of the channel means that a probability that resource allocation request messages transmitted from STAs are not normally received in the AP increases due to a channel collision. That is, the increase of the resource allocation request count $N_{req}$ may be preferable since the AP needs to maintain the number of resource allocation request messages which the AP normally receives even though the collision probability of the channel increases. On the other hand, if the collision probability of the channel decreases, the resource allocation request count $N_{req}$ may also decrease.

Thirdly, the AP may determine the resource allocation request count $N_{req}$ as an arbitrary number between 1 and the number of reception antennas $N_{rx}$.

Fourthly, the AP may determine the resource allocation request count $N_{req}$ as an arbitrary number which is greater than 1 and the number of reception antennas $N_{rx}$.

As described above, it will be understood that the AP may determine the resource allocation request count $N_{req}$ by considering various parameters.

The AP broadcasts the determined resource allocation request count $N_{req}$ to STAs at operation 404. Here, a process of transmitting the resource allocation request count $N_{req}$ to the STAs will be described below.

Firstly, the AP transmits the resource allocation request count $N_{req}$ through a beacon signal, e.g., a beacon medium access control (MAC) protocol data unit (MPDU). For example, the AP may include the resource allocation request count $N_{req}$ into every beacon MPDU, or into a beacon MPDU by a preset period. For another example, the AP may include the resource allocation request count $N_{req}$ into a beacon MPDU. A format of a beacon MPDU in which the resource allocation request count $N_{req}$ is included will be described with reference to FIG. 5.

Secondly, the AP transmits the resource allocation request count $N_{req}$ through one of frames used for transmitting/receiving a signal based on a multi-user transmission scheme. Here, the frames used for transmitting/receiving the signal based on the multi-user transmission scheme may include a power save multi-poll (PSMP) frame, a clear-to-send (CTS)-to-self frame, a modified request to send (RTS) frame, and the like. For example, the AP may include the resource allocation request count $N_{req}$ into every PSMP frame, or may include the resource allocation request count $N_{req}$ into a PSMP frame by a period. For another example, the AP may include the resource allocation request count $N_{req}$ into a PSMP frame. For still another example, the AP may include the resource allocation request count $N_{req}$ into every CTS-to-self frame, or may include the resource allocation request count $N_{req}$ into a CTS-to-self frame by a period. For still another example, the AP may include the resource allocation request count $N_{req}$ into a CTS-to-self frame. For still another example, the AP may include the resource allocation request count $N_{req}$ into every RTS frame, or may include the resource allocation request count $N_{req}$ into an RTS frame by a period. For still another example, the AP may include the resource allocation request count $N_{req}$ into a RTS frame. A format of a PSMP frame in which the resource allocation request count $N_{req}$ is included will be described with reference to FIG. 6. Further, a format of a CTS-to-self frame in which the resource allocation request count $N_{req}$ is included will be described with reference to FIG. 7.

A process of transmitting the resource allocation request count $N_{req}$ to the STAs to which the AP provides the service has been described above, however, it will be understood by those of ordinary skill in the art that the AP may transmit a value which is obtained by subtracting the number of resource allocation messages which the AP already receives from the resource allocation request count $N_{req}$ not the resource allocation request count $N_{req}$ at a related timing point to the STAs to which the AP provides the service. That is, the AP may transmit the number of messages which the AP may additionally receive not the resource allocation request count $N_{req}$ to the STAs to which the AP provides the service.

The resource allocation request count $N_{req}$ may be transmitted through a message at operation 404. The message may include information on a time interval by which the AP intends to receive a resource allocation request message, information on a frequency band at which the AP intends to receive the resource allocation request message, an AC specifying a kind of traffic which the AP intends to receive from each STA, a traffic characteristic such as a QoS, delay, and the like, information on load of a network as well as information related to the resource allocation request count $N_{req}$. At this time, if the AP requests to receive an AC through the message, each STA may transmit a resource allocation request message for traffic included in the AC.

The AP receives resource allocation request messages from the STAs to which the AP provides the service at operation 406. The AP allocates resources to the STAs from which the AP receives the resource allocation request messages at operation 408. Here, it will be understood by those of ordinary skill in the art that the resource allocation may be performed for the STAs from which the AP normally receives the resource allocation request messages.

The AP transmits scheduling information including information on the allocated resource at operation 410. For example, the scheduling information may be transmitted through any broadcast frame in which information is transmitted to all STAs at the same time. For another example, the scheduling information may be transmitted through any multicast frame in which information is transmitted to STAs at the same time. For still another example, the scheduling information may be transmitted through any frame in which information is sequentially transmitted to each of the STAs. The scheduling information may include information on a frequency resource and a time resource which each STA may use, information on a resource which each of the STAs may use at the same time, e.g., the number of data streams which each of the STAs may receive at the same time, information on a channel which each of the STAs may use at the same time, information on a frequency band which each of the STAs may use at the same time, and the like, a timing point at which a downlink transmission and an uplink transmission are completed, and the like.

The AP receives uplink signals from the STAs to which the AP allocates the resources at operation 412. The AP transmits ACK signals to the received uplink signals at operation 414. Here, the AP may transmit an ACK signal to each of the received uplink signals one to one. Alternatively, the AP may transmit a group ACK signal to the received uplink signals.

Although FIG. 4 illustrates an operating process of an AP in a WLAN system supporting a multi-user transmission scheme according to an embodiment of the present disclosure, various changes could be made to FIG. 4. For example, although shown as a series of operations, various operations in FIG. 4 could overlap, occur in parallel, occur in a different order, or occur multiple times.

An operating process of an AP in a WLAN system supporting a multi-user transmission scheme according to an embodiment of the present disclosure has been described with reference to FIG. 4, and a format of a beacon MPDU in a WLAN system supporting a multi-user transmission scheme according to an embodiment of the present disclosure will be described with reference to FIG. 5.

Figure 5:
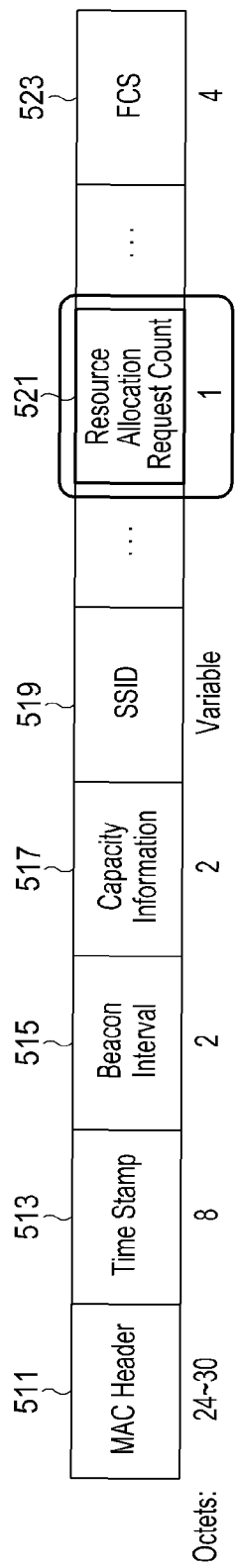
FIG. 5 schematically illustrates a format of a beacon MPDU in a WLAN system supporting a multi-user transmission scheme according to an embodiment of the present disclosure.

FIG. 5 schematically illustrates a format of a beacon MPDU in a WLAN system supporting a multi-user transmission scheme according to an embodiment of the present disclosure.

Referring to FIG. 5, the beacon MPDU includes a MAC header field 511, a time stamp field 513, a beacon interval field 515, a capacity information field 517, a service set identifier (SSID) field 519, a resource allocation request count field 521, and a frame check sequence (FCS) field 523. In some embodiments, the MAC header field 511, the time stamp field 513, the beacon interval field 515, the capacity information field 517, the SSID field 519, and the FCS field 523 conform to IEEE 802.11 standards.

The resource allocation request count field 521 may be implemented with one octet, and includes a resource allocation request number $N_{req}$.

In FIG. 5, the resource allocation request count field 521 is located between the SSID field 519 and the FCS field 523, however, it will be understood by those of ordinary skill in the art that the resource allocation request count field 521 may be located anywhere within the beacon MPDU.

A format of a beacon MPDU in a WLAN system supporting a multi-user transmission scheme according to an embodiment of the present disclosure has been described with reference to FIG. 5, and a format of a PSMP frame in a WLAN system supporting a multi-user transmission scheme according to an embodiment of the present disclosure will be described with reference to FIG. 6.

Figure 6:
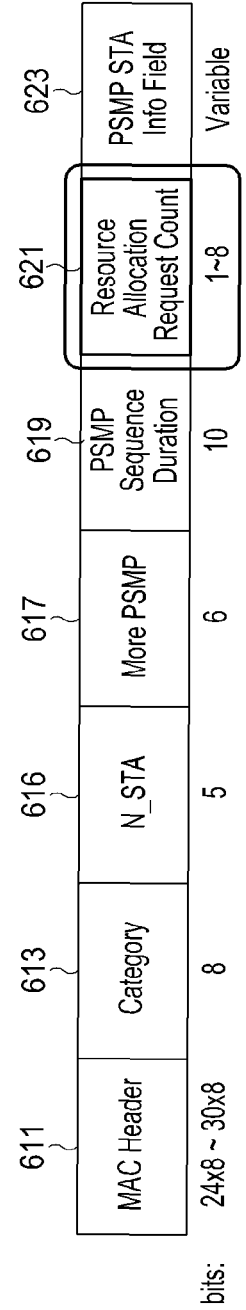
FIG. 6 schematically illustrates a format of a power save multi-poll (PSMP) frame in a WLAN system supporting a multi-user transmission scheme according to an embodiment of the present disclosure.

FIG. 6 schematically illustrates a format of a PSMP frame in a WLAN system supporting a multi-user transmission scheme according to an embodiment of the present disclosure.

Referring to FIG. 6, the PSMP frame includes a MAC header field 611, a category field 613, an N_STA field 615, a more PSMP field 617, a PSMP sequence duration field 619, a resource allocation request count field 621, and a PSMP STA info field 623.

In the embodiment shown, the MAC header field 611, the category field 613, the N_STA field 615, the more PSMP field 617, the PSMP sequence duration field 619, and the PSMP STA info field 623 generally confirm to IEEE 802.11 standards.

The resource allocation request count field 621 is a field which is newly proposed in an embodiment of the present disclosure, for example, may be implemented with one to eight bits, and includes a resource allocation request count $N_{req}$.

In FIG. 6, the resource allocation request count field 621 is located between the PSMP sequence duration field 619 and the PSMP STA info field 623, however, it will be understood by those of ordinary skill in the art that the resource allocation request count field 621 may be located anywhere within the PSMP frame.

A format of a PSMP frame in a WLAN system supporting a multi-user transmission scheme according to an embodiment of the present disclosure has been described with reference to FIG. 6, and a format of a CTS-to-self frame in a WLAN system supporting a multi-user transmission scheme according to an embodiment of the present disclosure will be described with reference to FIG. 7.

Figure 7:
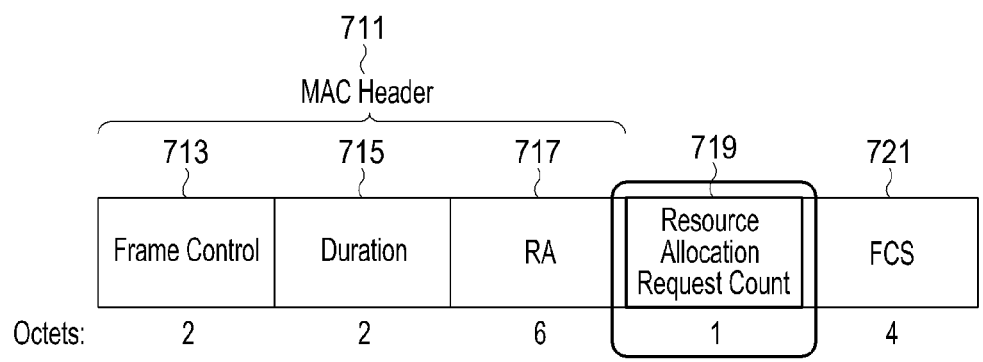
FIG. 7 schematically illustrates a format of a clear-to-send (CTS)-to-self frame in a WLAN system supporting a multi-user transmission scheme according to an embodiment of the present disclosure.

FIG. 7 schematically illustrates a format of a CTS-to-self frame in a WLAN system supporting a multi-user transmission scheme according to an embodiment of the present disclosure.

Referring to FIG. 7, the CTS-to-self frame includes a MAC header field 711, a resource allocation request count field 719, and an FCS field 721. The MAC header field 711 includes a frame control field 713, a duration field 715, and a receiver address (RA) field 717.

The MAC header field 711 and the FCS field 721 generally conform to IEEE 802.11 standards.

The resource allocation request count field 719 is a field which is newly proposed in an embodiment of the present disclosure, for example, may be implemented with one octet, and includes a resource allocation request count $N_{req}$.

In the embodiment as shown in FIG. 7, the resource allocation request count field 719 is located next to the MAC header field 711. Alternatively, the resource allocation request count field 719 may be located anywhere within the CTS-to-self frame.

A format of a CTS-to-self frame in a WLAN system supporting a multi-user transmission scheme according to an embodiment of the present disclosure has been described with reference to FIG. 7, and an operating process of an STA in a WLAN system supporting a multi-user transmission scheme according to an embodiment of the present disclosure will be described with reference to FIG. 8.

Figure 8:
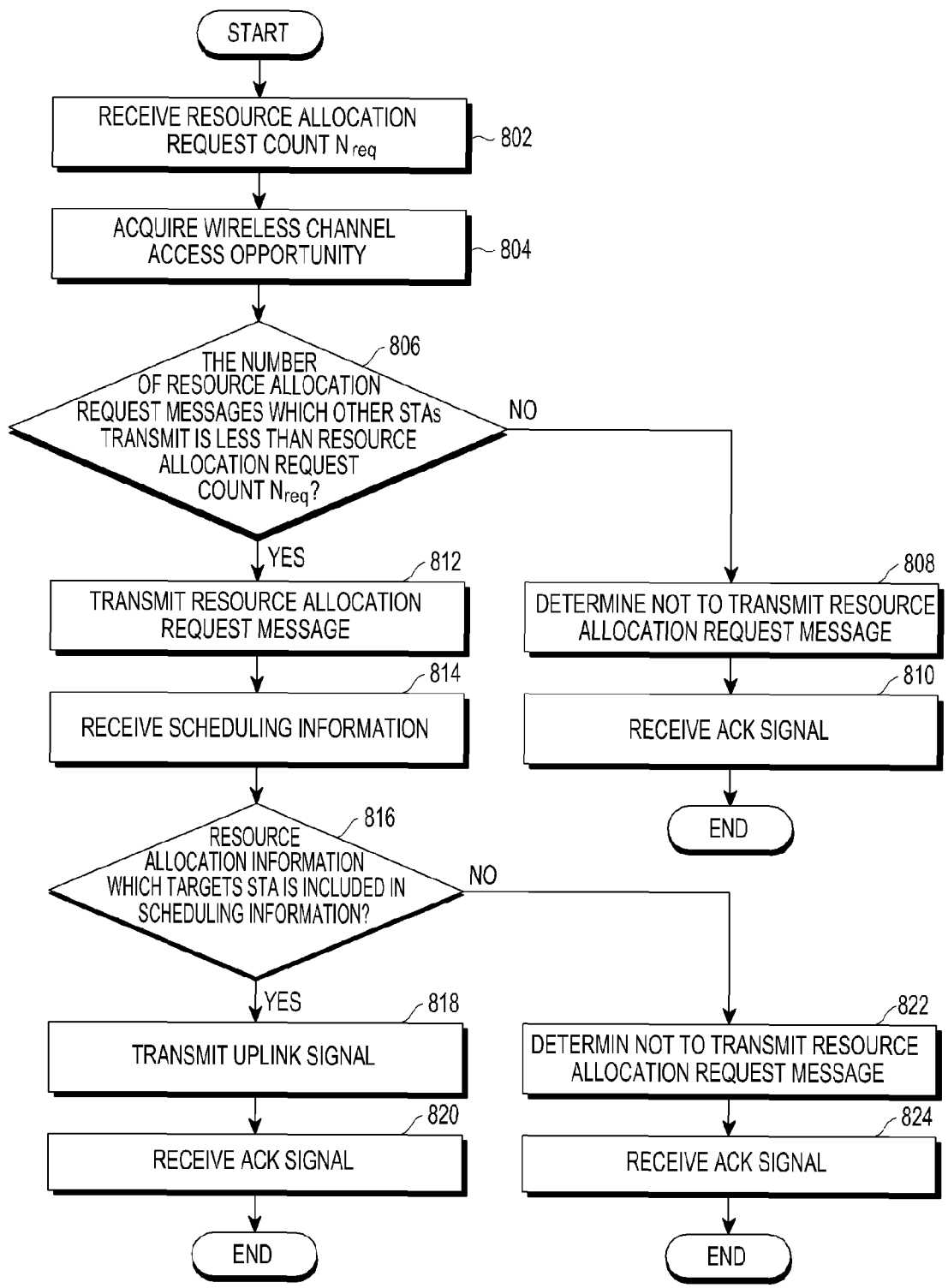
FIG. 8 schematically illustrates an operating process of an STA in a WLAN system supporting a multi-user transmission scheme according to an embodiment of the present disclosure.

FIG. 8 schematically illustrates an operating process of an STA in a WLAN system supporting a multi-user transmission scheme according to an embodiment of the present disclosure.

Referring to FIG. 8, an STA receives a resource allocation request count $N_{req}$ from an AP at operation 802. The STA receives the resource allocation request count $N_{req}$ from the AP through a message. The message may include information on a time interval by which the AP intends to receive a resource allocation request message, information on a frequency band at which the AP intends to receive the resource allocation request message, an AC specifying a kind of traffic which the AP intends to receive from each STA, a traffic characteristic such as a QoS, delay, and the like, information on load of a network as well as information related to the resource allocation request count $N_{req}$. At this time, if the AP requests to receive an AC through the message, STAs may transmit a resource allocation request message for traffic included in the AC.

The STA acquires a wireless channel access opportunity based on the received resource allocation request count $N_{req}$ at operation 804. The STA determines whether the number of resource allocation request messages which other STAs transmit up to now is less than the resource allocation request count $N_{req}$ based on the result of monitoring the other STAs at operation 806.

If the number of resource allocation request messages which the other STAs transmit is not less than the resource allocation request count $N_{req}$, that is, the number of resource allocation request messages which the other STAs transmit is greater than or equal to the resource allocation request count $N_{req}$, the STA determines not to transmit a resource allocation request message to the AP since the other STAs already transmit resource allocation request messages of which the number is greater than or equal to the resource allocation request count $N_{req}$ at operation 808. The STA sets an NAV since the STA determines not to transmit a resource allocation request message. The STA performs a monitoring operation for other STAs to receive an ACK signal and performs a remaining operation at operation 810. The remaining operation may be an operation from operation 804, i.e., an operation for transmitting a resource allocation request message.

If the number of resource allocation request messages which the other STAs transmit is less than the resource allocation request count $N_{req}$ at operation 806, the STA transmits a resource allocation request message to the AP at operation 812. The resource allocation request message may operate as an indicator indicating that the STA may perform an uplink transmitting operation with the AP to transmit information to the AP. In other embodiments, the resource allocation request message may include an indicator indicating that the STA may perform an uplink transmitting operation with the AP to transmit information to the AP. The resource allocation request message may include at least one of amount of information which the STA intends to transmit, e.g., a size of information which is expressed by a bit or byte, information on time which is required for transmitting uplink information based on a characteristic of a channel which the STA intends to transmit, e.g., channel quality information (CQI), a modulation and coding scheme (MCS) level which the STA may apply to a transmission, a signal to interference and noise ratio (SINR), a received signal strength indicator (RSSI), reference signal received power (RSRP), transmit power (Tx power), and the like. The resource allocation request message may include all or a part of information for an actual characteristic of a channel which the STA measures.

The STA receives scheduling information from the AP at operation 814. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The STA determines whether resource allocation information that targets the STA, i.e., scheduling information is included in the scheduling information at operation 816. If the scheduling information which targets the STA is included in the scheduling information, the STA transmits an uplink signal corresponding to the scheduling information at operation 818. The STA receives an ACK signal from the AP at operation 820.

If the scheduling information which targets the STA is not included in the scheduling information at operation 816, the STA determines not to transmit an uplink signal since the scheduling information which targets the STA is not included in the scheduling information at operation 822. The STA sets an NAV since the STA determines not to transmit the uplink signal. The STA performs a monitoring operation for other STAs to receive an ACK signal and performs a remaining operation at operation 824. The remaining operation may be an operation from operation 804, i.e., an operation for transmitting a resource allocation request message.

Although FIG. 8 illustrates an operating process of an STA in a WLAN system supporting a multi-user transmission scheme according to an embodiment of the present disclosure, various changes could be made to FIG. 8. For example, although shown as a series of operations, various operations in FIG. 8 could overlap, occur in parallel, occur in a different order, or occur multiple times.

An operating process of an STA in a WLAN system supporting a multi-user transmission scheme according to an embodiment of the present disclosure has been described with reference to FIG. 8, and another example of a resource operating process performed in a WLAN system supporting a multi-user transmission scheme according to an embodiment of the present disclosure will be described with reference to FIG. 9.

Figure 9:
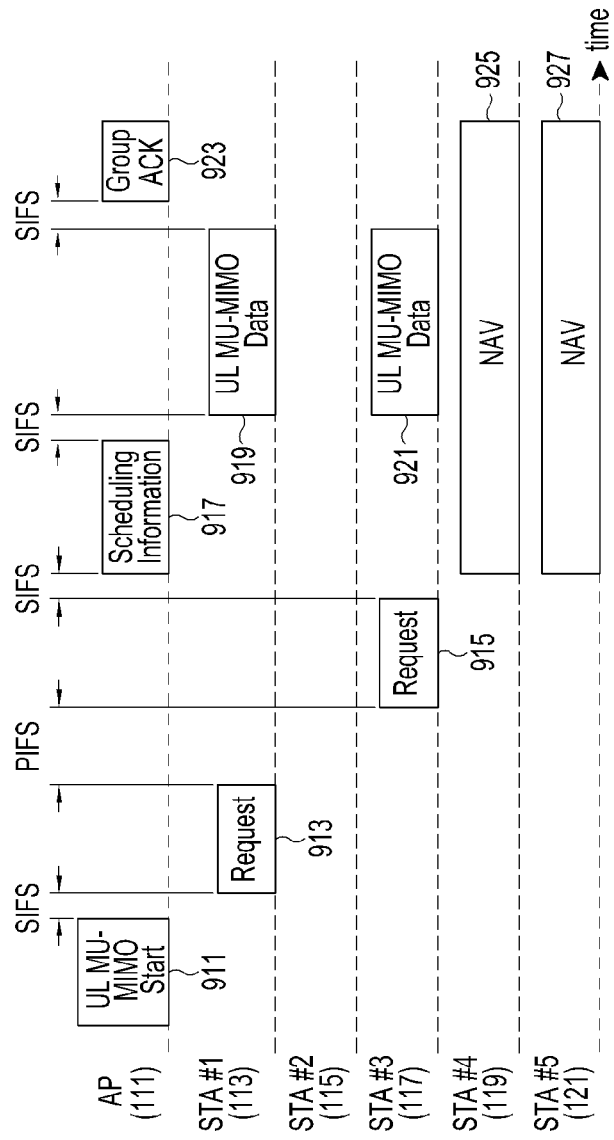
FIG. 9 schematically illustrates another example of a resource operating performed in a WLAN system supporting a multi-user transmission scheme according to an embodiment of the present disclosure.

FIG. 9 schematically illustrates another example of a resource operating performed in a WLAN system supporting a multi-user transmission scheme according to an embodiment of the present disclosure.

Referring to FIG. 9, it will be assumed that a resource operating process in FIG. 9 is a resource operating process which is based on a contention-free scheme.

Referring to FIG. 9, an AP 111 transmits a start frame signal at operation 911. The start frame signal includes one of a beacon frame, a PSMP frame, a CTS-to-self, a modified RTS frame, and the like. In FIG. 9, it will be noted that the start frame signal is illustrated as 'UL MU-MIMO start'. A resource allocation request count $N_{req}$ which the AP 111 determines is included in the start frame signal. An operation of determining the resource allocation request count $N_{req}$ in the AP 111 has been described above. The start frame signal includes information on STAs which may transmit a resource allocation request message along with the resource allocation request count $N_{req}$. For example, the information on the STAs may be an STA ID. In FIG. 9, it will be assumed that the resource allocation request count $N_{req}$ is set to 3. As such, the information on the STAs which may transmit the resource allocation request message includes a STA ID of each of STA#1 113, STA#2 115, and STA#3 117.

The start frame signal in operation 911 may include information on a time interval by which the AP intends to receive a resource allocation request message, information on a frequency band at which the AP intends to receive the resource allocation request message, an AC specifying a kind of traffic which the AP intends to receive from each STA, a traffic characteristic such as a QoS, delay, and the like, information on load of a network as well as information related to the resource allocation request count $N_{req}$. At this time, if the AP requests to receive an AC through the start frame signal, each STA may transmit a resource allocation request message for traffic included in the AC. The start frame signal in operation 911 may be transmitted thereby all STAs which exist within a network may transmit resource allocation request messages, or a part of all STAs which exist within a network may transmit resource allocation request messages. In order for the part of all STAs to transmit the resource allocation request messages, the start frame signal in operation 911 may include an ID which may designate the part of all STAs such as an association ID (AID), a MAC address, a physical (PHY) address, and the like. Meanwhile, if there is a group in which STAs are included, the start frame signal in operation 911 includes a group ID (GID) of the group to designate the part of all STAs.

If each of STA#1 113, STA#2 115, STA#3 117, STA#4 119, and STA#5 121 monitors the start frame signal to detect the resource allocation request count $N_{req}$. Upon detecting that an uplink signal is to be transmitted, STA#1 113, STA#2 115, and STA#3 117 may transmit a resource allocation request message for allocating a resource to the AP 111. In a case that the start frame signal specifies an STA by including an STA ID, or specifies a related group by including a GID, and STAs sequentially perform a resource allocation request message transmitting operation as described in FIG. 9, order in which the STAs transmit resource allocation request messages may be based on order of STA IDs included in the start frame signal. For example, the order in which the STAs transmit the request allocation request messages may be the order of the STA IDs included in the start frame signal, inverse order of the STA IDs included in the start frame signal, order of STA IDs included in a group which corresponds to a GID included in the start frame signal, or inverse order of the STA IDs included in the group which corresponds to the GID included in the start frame signal. As a result, the order in which the STAs transmit the resource allocation request message may be any order that may distinguish order of STAs which is generated based on the parameters included in the start frame signal.

In FIG. 9, STA#1 113 and STA#3 117 may transmit a resource allocation request message to the AP 111, and STA#2 115 may not transmit a resource allocation request message since STA#2 115 may not transmit an uplink signal at operations 913 and 915. STA#3 117 monitors a channel during a PIFS interval to detect that STA#2 115 does not transmit the resource allocation request message, and transmits a resource allocation request message at operation 915. It will be noted that the resource allocation request message is illustrated as 'Request'.

So, the AP 111 allocates a resource to two STAs from which the AP 111 receives the resource allocation request message, for example, STA#1 113 and STA#3 117, and transmits information on the allocated resource, i.e., scheduling information at operation 917. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 receives an uplink signal from each of STA#1 113 and STA#3 117 at operations 919 and 921, respectively. In FIG. 9, it will be noted that an uplink signal transmitted from an STA is illustrated as 'UL MU-MIMO Data'.

Figure 12:
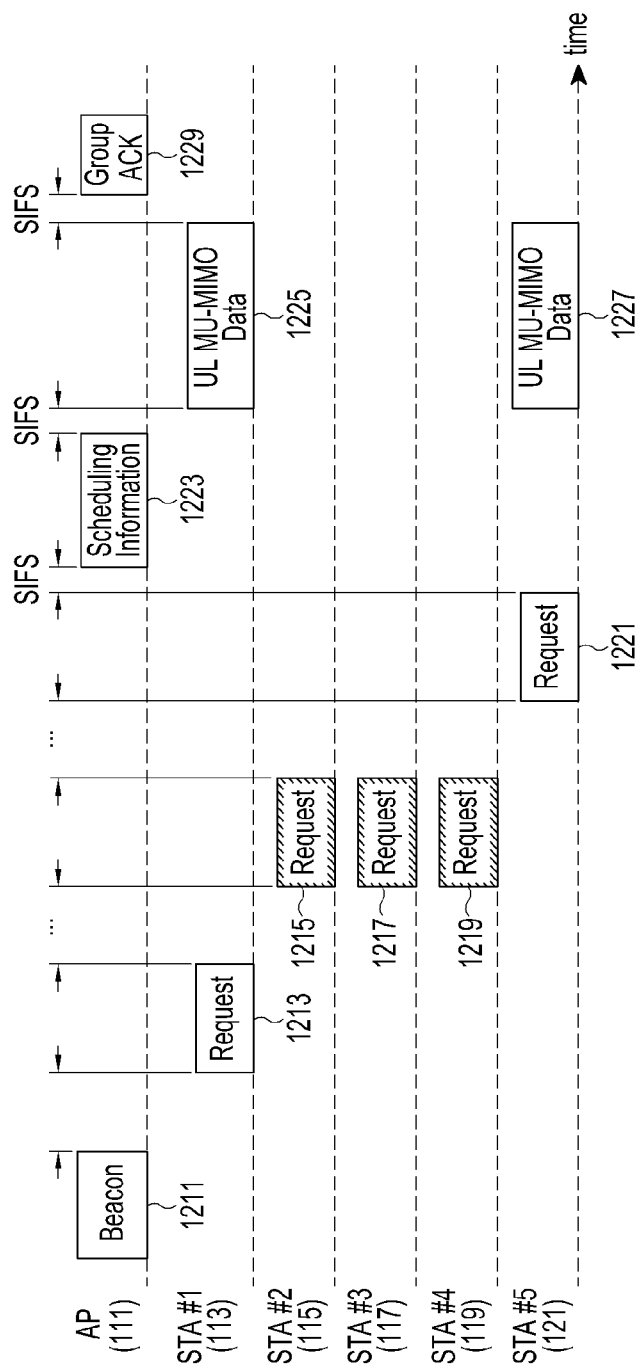
FIG. 12 schematically illustrates still another example of a resource operating process performed in a WLAN system supporting a multi-user transmission scheme according to an embodiment of the present disclosure.

Upon receiving the uplink signal from each of STA#1 113 and STA#3 117, the AP 111 transmits group ACK signal for the uplink signal which is received from each of STA#1 113 and STA#3 117 at operation 923. In FIG. 12, the AP 111 transmits the group ACK signal for the uplink signal which is received from each of STA#1 113 and STA#3 117. Further, the AP 111 transmits an ACK signal for the uplink signal which is received from each of STA#1 113 and STA#3 117.

Meanwhile, remaining STAs except for STA#1 113, STA#2 115, and STA#3 117, i.e., STA#4 119 and STA#5 119 set an NAV, and wait until receiving a group ACK signal at operations 925 and 927, respectively.

In FIG. 9, a plurality of SIFSs are used. Here, each of the plurality of SIFSs may be changed to one of various IFSs such as a DIFS, a PIFS, an AIFS, and the like, or a contention-based interval.

Another example of a resource operating process performed in a WLAN system supporting a multi-user transmission scheme according to an embodiment of the present disclosure has been described with reference to FIG. 9, and still another example of a resource operating process performed in a WLAN system supporting a multi-user transmission scheme according to an embodiment of the present disclosure will be described with reference to FIG. 10.

Figure 10:
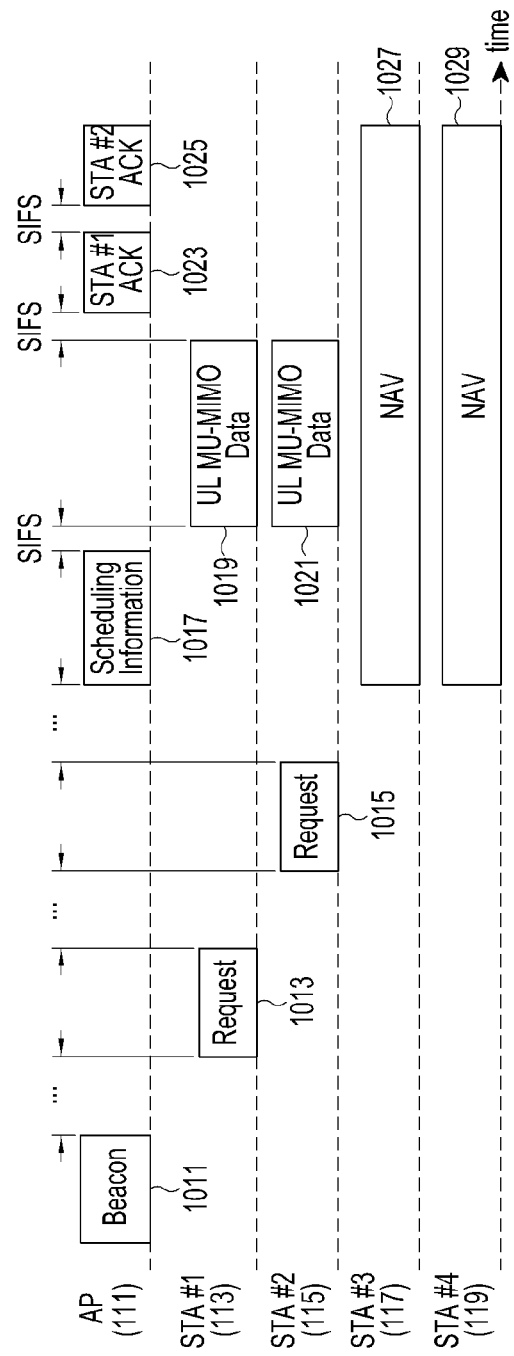
FIG. 10 schematically illustrates still another example of a resource operating process performed in a WLAN system supporting a multi-user transmission scheme according to an embodiment of the present disclosure.

FIG. 10 schematically illustrates and still another example of a resource operating process performed in a WLAN system supporting a multi-user transmission scheme according to an embodiment of the present disclosure.

Referring to FIG. 10, a resource operating process in FIG. 10 is a resource operating process which is based on a contention-based scheme. The resource operating process in FIG. 10 includes: a process of broadcasting a beacon signal in an AP, a process of transmitting resource allocation request messages to the AP based on a contention-based scheme in STAs, a process of transmitting scheduling information in the AP, and a process of performing an uplink signal transmitting operation based on the scheduling information in the STAs, and this will be described below.

Firstly, an AP 111 transmits a beacon signal at operation 1011. The beacon signal may include an indicator indicating that a plurality of STAs which have traffic which may be transmitted in an uplink may transmit a resource allocation request message for an uplink transmission within a beacon period. Alternatively, even though the beacon signal does not include the indicator, STAs which may allocate a resource for an uplink transmission may transmit a resource allocation request message based on a contention based scheme. The beacon signal may be transmitted thereby all STAs which exist within a network may transmit a resource allocation request message, or thereby a part of STAs which exist within a network may transmit a resource allocation request message. The beacon signal may include a resource allocation request count $N_{req}$, information on a timing point at which the AP 111 may terminate a reception for a resource allocation request message, information on STAs to which may transmit a resource allocation request message, e.g., a group ID (GID) of a STA group, or ID which may specify STAs such as an access ID (AID), a MAC address, a PHY address, and the like of STAs. The beacon signal may include information on a timing point at which the AP 111 may terminate a reception of a resource allocation request message. The information on the timing point at which the AP 111 may terminate the reception of the resource allocation request message may be expressed with an absolute time form which may be specific and objective, or with a relative time form to timing information of the AP 111 and transmission time for a frame. An operation of determining the resource allocation request count $N_{req}$ in the AP 111 has been described above, and a description thereof will be omitted herein.

The beacon signal may include information related to time at which the AP 111 intends to receive a resource allocation request message, information on a frequency band at which the AP 111 intends to receive the resource allocation request message, an AC specifying a kind of traffic which the AP 111 intends to receive from each STA within a related beacon period, a traffic characteristic such as a QoS, delay, and the like, load of a network, a parameter for a carrier sense multiple access/collision avoidance (CSMA/CA) scheme for avoiding a collision in a contention based scheme, e.g., a parameter such as CWmin, CWmax, Retry Limit, and the like, or a parameter for a MAC scheme of other contention based scheme, e.g., a Slotted ALOHA protocol, e.g., CPmax, CPmin, and the like as well as information related to the resource allocation request count $N_{req}$. At this time, if the AP 111 requests to receive an AC through a message, each STA transmits a resource allocation request message for traffic included in the AC. In FIG. 10, it will be noted that the resource allocation request message is illustrated as 'Request'.

Each of STA#1 113, STA#2 115, STA#3 117, and STA#4 119 monitors the beacon signal, and determines whether there is a need of an uplink transmission. If there is the need of the uplink transmission, each of STA#1 113, STA#2 115, STA#3 117, and STA#4 119 follows a contention-based MAC scheme, e.g., a CSMA/CA scheme, or a Slotted ALOHA protocol and intends to occupy a channel in order to transmit a resource allocation request message. At this time, if a parameter which is applied to the CSMA/CA scheme or the Slotted ALOHA protocol is included in the beacon signal, each of STA#1 113, STA#2 115, STA#3 117, and STA#4 119 intends to occupy a channel based on the parameter which is applied to the CSMA/CA scheme or the Slotted ALOHA protocol is included in the beacon signal. In FIG. 10, it will be assumed that STA#1 113, STA#2 115, STA#3 117, and STA#4 119 determine a need of uplink transmission, and STA#1 113 and STA#2 115 succeeded in transmitting a resource allocation request message based on a contention-based scheme at operations 1013 and 1015.

In FIG. 10, an ACK message is not transmitted for the resource allocation request messages which have been successfully received at operations 1013 and 1015, however, it will be understood by those of ordinary skill in the art that the AP 111 may transmit the ACK message for the resource allocation request messages which have been successfully received.

In FIG. 10, for example, the resource allocation request count $N_{req}$ is set to 2. STA#1 113 and STA#2 115 successfully transmit the resource allocation request message based on the contention-based scheme, and STA#1 113, STA#2 115, STA#3 117, and STA#4 119 detect that the resource allocation request number reaches the resource allocation request count $N_{req}$. As such, STA#1 113, STA#2 115, STA#3 117, and STA#4 119 may not transmit a resource allocation request message. Upon detecting that the number of received resource allocation request messages reaches the resource allocation request count $N_{req}$ according that the two resource allocation request messages are successfully received, the AP may not receive a resource allocation request message even though the AP may not reach a timing point at which the AP 111 may terminate a reception for a resource allocation request message. At this time, the AP 111 may transmit a frame signal including information indicating that the AP 111 may not receive a resource allocation request message to all STAs.

Alternatively, even though the number of received resource allocation request messages does not reach the resource allocation request count $N_{req}$, the AP 111 and STAs terminate a resource allocation request message reception interval if it reaches a timing point at which the AP 111 may terminate a reception for a resource allocation request message. At this time, the AP 111 may transmit a frame signal including information indicating that the AP 111 may not receive a resource allocation request message to all STAs.

The AP 111 allocates a resource to two STAs from which the AP 111 receives the resource allocation request message, i.e., STA#2 115 and STA#1 113, receives a resource allocation request message from STA#1 113, occupies a channel based on a contention-based scheme, and transmits information on the allocated resource, i.e., scheduling information at operation 1017. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After transmitting the last resource allocation request message without a contention, the AP 111 may transmit scheduling information to perform an uplink multi-transmission operation after a preset time at operation 1017.

After the preset time, e.g., an SIFS elapses, the AP 111 receives an uplink signal from each of STA#1 113 and STA#5 121 at operations 1019 and 1021, respectively. In FIG. 10, it will be noted that an uplink signal which is transmitted from an STA is illustrated as 'UL MU-MIMO Data'.

Upon receiving the uplink signal from each of STA#1 113 and STA#5 121, the AP 111 transmits an ACK signal for the uplink signal received from each of STA#1 113 and STA#5 121 after a preset time, e.g., an SIFS at operation 1023 and 1025. In FIG. 10, the AP 111 transmits the ACK signal for the uplink signal received from each of STA#1 113 and STA#5 121. In some embodiments, the AP 111 may transmit a group ACK signal for the uplink signal which is received from each of STA#1 113 and STA#5 121.

In FIG. 10, a plurality of SIFSs are used. In some embodiments, each of the plurality of SIFSs may be substituted with one of various IFSs such as a DIFS, a PIFS, an AIFS, and the like.

Still another example of a resource operating process performed in a WLAN system supporting a multi-user transmission scheme according to an embodiment of the present disclosure has been described with reference to FIG. 10. Yet another example of a resource operating process performed in a WLAN system supporting a multi-user transmission scheme according to an embodiment of the present disclosure will be described with reference to FIG. 11.

Figure 11:
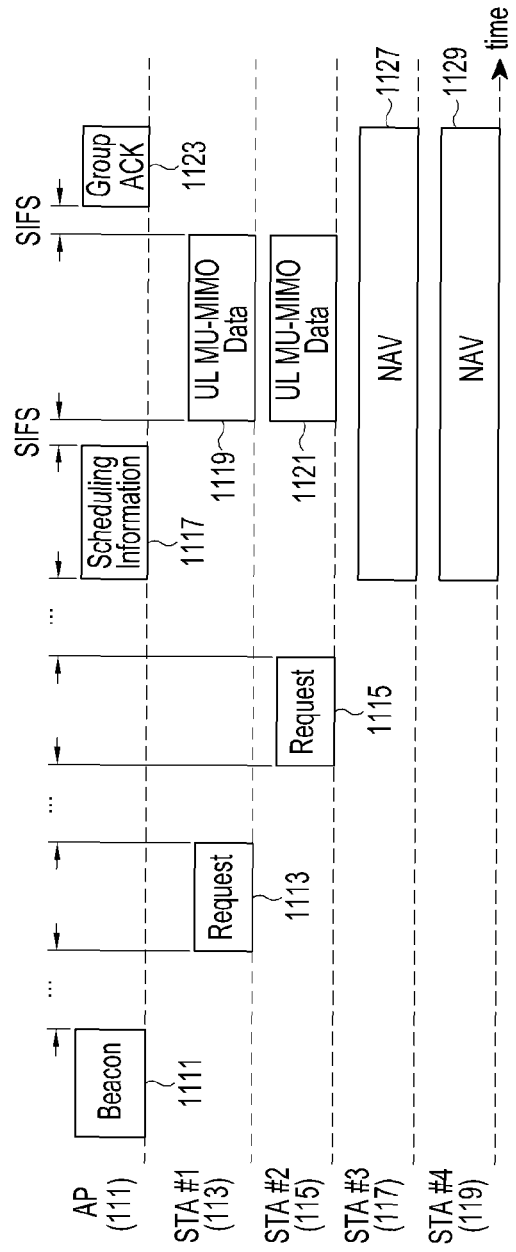
FIG. 11 schematically illustrates yet another example of a resource operating process performed in a WLAN system supporting a multi-user transmission scheme according to an embodiment of the present disclosure.

FIG. 11 schematically illustrates still another example of a resource operating process performed in a WLAN system supporting a multi-user transmission scheme according to an embodiment of the present disclosure.

Referring to FIG. 11, it will be understood that a resource operating process in FIG. 11 is the same as a resource operating process in FIG. 10 except for a process of transmitting an ACK signal (that is, operations 1011 to 1021 in FIG. 10 are the same as operations 1111 to 1121 in FIG. 11, and operations 1027 and 1029 in FIG. 10 are the same as operations 1121 and 1129 in FIG. 11). That is, in the resource operating process in FIG. 10, an AP transmits an ACK signal for uplink signals which STAs transmit one to one (at operations 1023 and 1025), however, in the resource operating process in FIG. 11, an AP transmits a group ACK signal for uplink signals which STAs transmit (at operation 1123).

Still another example of a resource operating process performed in a WLAN system supporting a multi-user transmission scheme according to an embodiment of the present disclosure has been described with reference to FIG. 11. Yet another example of a resource operating process performed in a WLAN system supporting a multi-user transmission scheme according to an embodiment of the present disclosure will be described with reference to FIG. 12.

FIG. 12 schematically illustrates yet another example of a resource operating process performed in a WLAN system supporting a multi-user transmission scheme according to an embodiment of the present disclosure.

Referring to FIG. 12, a resource operating process in FIG. 12 is a resource operating process which is based on a contention-based scheme. The resource operating process in FIG. 12 includes: a process of broadcasting a resource allocation request count $N_{req}$ through a beacon signal in an AP, a process of transmitting resource allocation request messages to the AP based on a contention-based scheme in STAs, a process of broadcasting scheduling information based on the contention-based scheme in the AP, and a process of performing an uplink signal transmitting operation based on the scheduling information in the STAs. In FIG. 12, it will be assumed that a collision occurs while the STAs transmit resource allocation request messages to the AP based on the contention-based scheme, this will be described below.

Firstly, an AP 111 transmits a beacon signal at operation 1211. A resource allocation request count $N_{req}$ which the AP 111 determines is included in the beacon signal, and an operation of determining the resource allocation request count $N_{req}$ in the AP 111 has been described above.

The beacon signal in operation 1211 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the beacon signal, each STA may transmit a resource allocation request message for traffic included in the AC. The beacon signal in operation 1211 may be transmitted thereby all STAs which exist within a network transmit a resource allocation request message, or a part of STAs which exists within a network transmit a resource allocation request message. In order that the part of the STAs transmits the resource allocation request message, the beacon signal in operation 1211 may include ID which may designate the part of the STAs, e.g., an AID, a MAC address, a PHY address, and the like. If there is a group in which STAs are included, the beacon signal in operation 1211 may include a GID of the group to designate the part of the STAs.

Meanwhile, each of an STA#1 113, an STA#2 115, an STA#3 117, an STA#4 119, and an STA#5 121 monitors the beacon signal to detect the resource allocation request count $N_{req}$, and monitors signals which other STAs transmit.

It will be assumed that STA#1 113, STA#2 115, STA#3 117, STA#4 119, and STA#5 121 detect a need of transmitting a signal while performing the monitoring operation, and transmit a resource allocation request message at operations 1213, 1215, 1217, 1219, and 1221. As described above, STA#1 113, STA#2 115, STA#3 117, STA#4 119, and STA#5 121 transmit the resource allocation request message based on the resource allocation request count $N_{req}$. In FIG. 12, STA#2 115, STA#3 117, STA#4 119 detect that the number of resource allocation request messages which other STAs transmit is less than the resource allocation request count $N_{req}$ at the same time, transmit a resource allocation request message at the same time, resulting in a collision. In FIG. 12, it will be noted that the resource allocation request message is illustrated as 'Request'.

Meanwhile, it will be assumed that the AP 111 uses a plurality of antennas, e.g., two antennas, and the resource allocation request count $N_{req}$ is set to a preset value, e.g., 2. In FIG. 12, even though each of STA#1 113, STA#2 115, STA#3 117, STA#4 119, and STA#5 121 transmits the resource allocation request message, the AP 111 may not normally receive the resource allocation request message which each of STA#2 115, STA#3 117, and STA#4 119 transmits. So, the AP 111 allocates a resource to STA#1 113 and STA#5 121, and transmits information on the allocated resource, i.e., scheduling information at operation 1223. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 receives an uplink signal from each of STA#1 113 and STA#5 121 at operations 1225 and 1227, respectively. In FIG. 12, it will be noted that an uplink signal transmitted from an STA is illustrated as 'UL MU-MIMO Data'.

Upon receiving the uplink signal from each of STA#1 113 and STA#5 121, the AP 111 transmits a group ACK signal for the uplink signal received from each of STA#1 113 and STA#5 121 after a preset time, e.g., an SIFS at operation 1229.

Meanwhile, the AP 111, and STA#1 113, STA#2 115, STA#3 117, STA#4 119, and STA#5 121 may count occurrence of a collision or a resource allocation request message which is normally received as a reception of a resource allocation request message. In FIG. 12, if the AP 111, and STA#1 113, STA#2 115, STA#3 117, STA#4 119, and STA#5 121 count the occurrence of the collision as the reception of the resource allocation request message, it is determined that a reception of a resource allocation request message has occurred three times. Alternatively, in FIG. 12, if the AP 111, and STA#1 113, STA#2 115, STA#3 117, STA#4 119, and STA#5 121 count the resource allocation request message which is normally received as the reception of the resource allocation request message, it is determined that a reception of a resource allocation request message has occurred twice.

As described above, the AP 111 may operate a resource by broadcasting a value which is generated by subtracting the number of the resource allocation request messages which have been already received from the resource allocation request count $N_{req}$ at a related timing point not the resource allocation request count $N_{req}$ to STAs. As such, the AP 111 may differently operate a resource based on a scheme of counting the number of receptions of resource allocation request message.

In FIG. 12, a plurality of SIFSs are used. Here, each of the plurality of SIFSs may be changed to one of various IFSs such as a DIFS, a PIFS, an AIFS, and the like.

In FIG. 12, the AP 111 transmits the group ACK signal for the uplink signal which is received from each of STA#1 113 and STA#5 121. In some embodiments, the AP 111 may transmit an ACK signal for the uplink signal which is received from each of STA#1 113 and STA#5 121.

Still another example of a resource operating process performed in a WLAN system supporting a multi-user transmission scheme according to an embodiment of the present disclosure has been described with reference to FIG. 12. Yet another example of a resource operating process performed in a WLAN system supporting a multi-user transmission scheme according to an embodiment of the present disclosure will be described with reference to FIG. 13.

Figure 13:
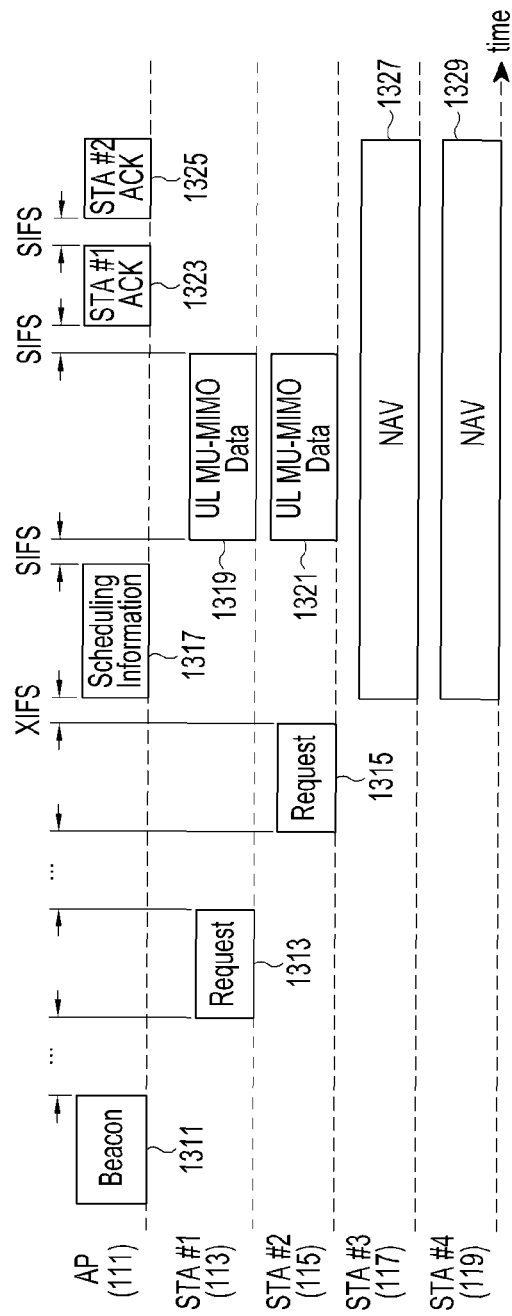
FIG. 13 schematically illustrates yet another example of a resource operating process performed in a WLAN system supporting a multi-user transmission scheme according to an embodiment of the present disclosure.

FIG. 13 schematically illustrates still another example of a resource operating process performed in a WLAN system supporting a multi-user transmission scheme according to an embodiment of the present disclosure.

Referring to FIG. 13, a resource operating process in FIG. 13 is a resource operating process which is based on a contention-based scheme. The resource operating process in FIG. 13 includes: a process of broadcasting a resource allocation request count $N_{req}$ through a beacon signal in an AP, a process of transmitting resource allocation request messages to the AP based on a contention-based scheme in STAs, a process of immediately broadcasting scheduling information in the AP, and a process of performing an uplink signal transmitting operation based on the scheduling information in the STAs, and this will be described below.

Firstly, an AP 111 transmits a beacon signal at operation 1311. A resource allocation request count $N_{req}$ which the AP 111 determines is included in the beacon signal, and an operation of determining the resource allocation request count $N_{req}$ in the AP 111 has been described above.

The beacon signal in operation 1311 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the beacon signal, each STA may transmit a resource allocation request message for traffic included in the AC.

The beacon signal in operation 1311 may be transmitted thereby all STAs which exist within a network transmit a resource allocation request message, or a part of STAs which exist within a network transmits a resource allocation request message. In order that the part of the STAs transmits the resource allocation request message, the beacon signal in operation 1311 may include ID which may designate the part of the STAs, e.g., an AID, a MAC address, a PHY address, and the like. If there is a group in which STAs are included, the beacon signal in operation 1311 may include a GID of the group to designate the part of the STAs.

Meanwhile, each of STA#1 113, STA#2 115, STA#3 117, and STA#4 119 monitors the beacon signal to detect the resource allocation request count $N_{req}$, and monitors signals which other STAs transmit.

It will be assumed that STA#1 113, STA#2 115, STA#3 117, and STA#4 119 detect that a signal is to be transmitted while performing the monitoring operation, and STA#1 113 and STA#2 115 transmit a resource allocation request message at operations 1313 and 1315, respectively. STA#1 113 and STA#2 115 may transmit the resource allocation request message based on the resource allocation request count $N_{req}$ has been described above. It will be noted that the resource allocation request message is illustrated as 'Request'.

Meanwhile, it will be assumed that the AP 111 uses a plurality of antennas, e.g., two antennas, and the resource allocation request count $N_{req}$ is set to a preset value, e.g., 2. As such, STA#1 113 and STA#2 115 may transmit the resource allocation request message, and remaining STAs, i.e., STA#3 117 and STA#4 119 may set an NAV and wait until normally receiving an ACK signal since STA#3 117 and STA#4 119 may detect that resource allocation request messages of which the number is greater than or equal to the resource allocation request count $N_{req}$ have been transmitted to the AP 111 at operations 1327 and 1329.

The AP 111 immediately allocates a resource to two STAs from which the AP 111 receives the request allocation request message, i.e., STA#2 115 and STA#1 113, that is, the AP 111 allocates the resource to STA#2 115 and STA#1 113 after a preset time, e.g., an XIFS after receiving the request allocation request message from STA#1 113, and transmits information on the allocated resource, i.e., scheduling information at operation 1317. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The XIFS denotes an arbitrary IFS. That is, XIFS includes one of various IFSs such as an SIFS, a DIFS, a PIFS, an AIFS, and the like.

After a preset time, e.g., an SIFS, the AP 111 receives an uplink signal from each of STA#1 113 and STA#2 115 at operations 1319 and 1321, respectively. In FIG. 13, it will be noted that an uplink signal transmitted from an STA is illustrated as 'UL MU-MIMO Data'.

Upon receiving the uplink signal from each of STA#1 113 and STA#2 115, the AP 111 transmits an ACK signal for the uplink signal received from each of STA#1 113 and STA#2 115 after a preset time, e.g., an SIFS at operations 1323 and 1325.

In FIG. 13, a plurality of SIFSs are used. In some embodiments, each of the plurality of SIFSs may be substituted with one of various IFSs such as a DIFS, a PIFS, an AIFS, and the like.

Still another example of a resource operating process performed in a WLAN system supporting a multi-user transmission scheme according to an embodiment of the present disclosure has been described with reference to FIG. 13. Yet another example of a resource operating process performed in a WLAN system supporting a multi-user transmission scheme according to an embodiment of the present disclosure will be described with reference to FIG. 14.

Figure 14:
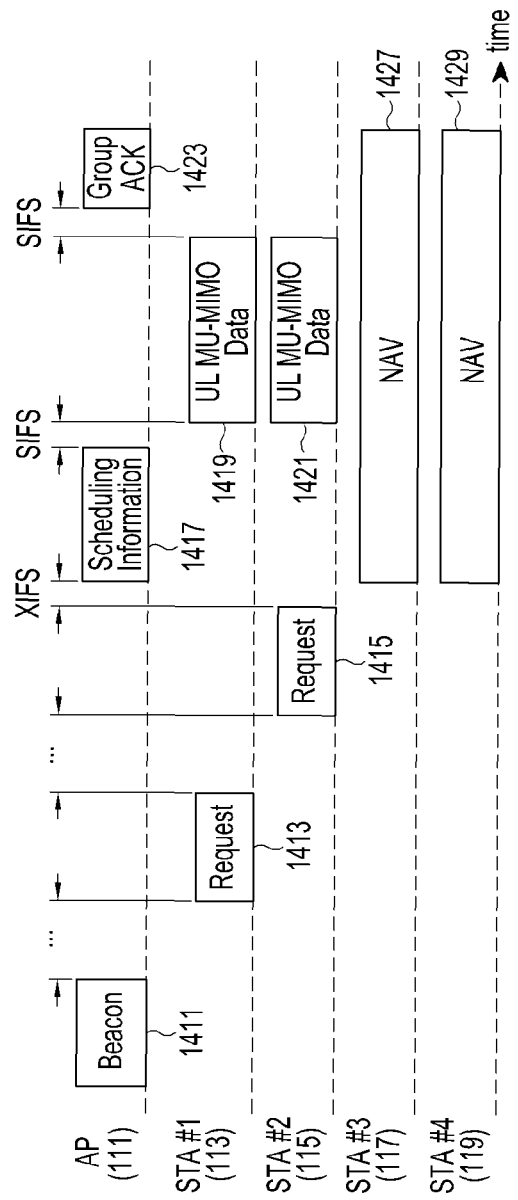
FIG. 14 schematically illustrates still another example of a resource operating process performed in a WLAN system supporting a multi-user transmission scheme according to an embodiment of the present disclosure.

FIG. 14 schematically illustrates still another example of a resource operating process performed in a WLAN system supporting a multi-user transmission scheme according to an embodiment of the present disclosure.

Referring to FIG. 14, it will be understood that a resource operating process in FIG. 14 is the same as a resource operating process in FIG. 13 except for a process of transmitting an ACK signal (that is, operations 1311 to 1321 in FIG. 13 are the same as operations 1411 to 1421 in FIG. 14, and operations 1327 and 1329 in FIG. 13 are the same as operations 1421 and 1429 in FIG. 14). That is, in the resource operating process in FIG. 13, an AP transmits an ACK signal for uplink signals which STAs transmit one to one (at operations 1323 and 1325), however, in the resource operating process in FIG. 14, an AP transmits a group ACK signal for uplink signals which STAs transmit (at operation 1423).

Still another example of a resource operating process performed in a WLAN system supporting a multi-user transmission scheme according to an embodiment of the present disclosure has been described with reference to FIG. 14. Yet another example of a resource operating process performed in a WLAN system supporting a multi-user transmission scheme according to an embodiment of the present disclosure will be described with reference to FIG. 15.

Figure 15:
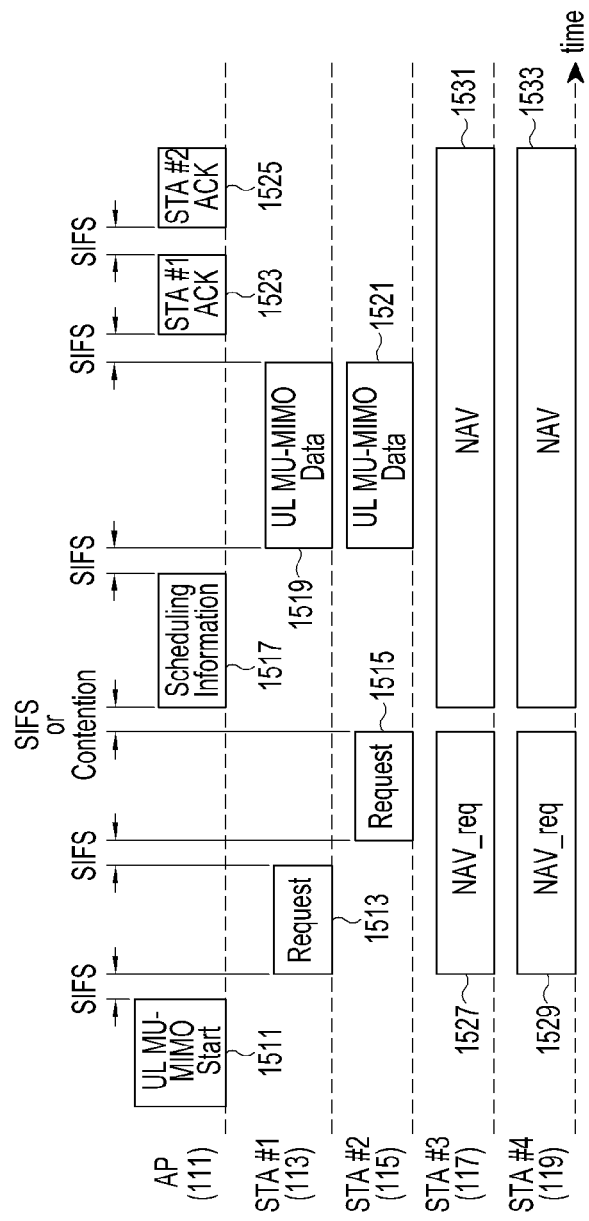
FIG. 15 schematically illustrates yet another example of a resource operating process performed in a WLAN system supporting a multi-user transmission scheme according to an embodiment of the present disclosure.

FIG. 15 schematically illustrates still another example of a resource operating process performed in a WLAN system supporting a multi-user transmission scheme according to an embodiment of the present disclosure.

Referring to FIG. 15, a resource operating process in FIG. 15 is a resource operating process which is a contention-free scheme. The resource operating process in FIG. 15 includes: a process of broadcasting a resource allocation request count $N_{req}$ and information on STAs which may transmit a resource allocation request message through a start frame signal in the AP, a process of transmitting resource allocation request messages to the AP in the STAs related to the request information, a process of immediately broadcasting scheduling information in the AP, and a process of performing an uplink signal transmitting operation based on the scheduling information in the STAs, and this will be described below.

Firstly, an AP 111 transmits a start frame signal at operation 1511. The start frame signal includes one of various frames such as a beacon frame, a PSMP frame, a CTS-to-self frame, a modified RTS frame, and the like. In FIG. 15, it will be noted that the start frame signal is illustrated as 'UL MU-MIMO start'. A resource allocation request count $N_{req}$ which the AP 111 determines and information on STAs which may transmit a resource allocation request message are included in the start frame signal, an operation of determining the resource allocation request count $N_{req}$ in the AP 111 has been described above, and a description thereof will be omitted herein. In FIG. 15, it will be assumed that the resource allocation request count $N_{req}$ is set to 2. As such, the information on the STAs to which the AP 111 may transmit the resource allocation request message includes an STA ID of each of STA#1 113 and STA#2 115.

The start frame signal in operation 1511 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the start frame signal, each STA may transmit a resource allocation request message for traffic included in the AC.

The start frame signal in operation 1511 may be transmitted thereby all STAs which exist within a network transmit a resource allocation request message, or a part of STAs which exist within a network transmits a resource allocation request message. In order that the part of the STAs transmits the resource allocation request message, the start frame signal in operation 1511 may include ID which may designate the part of the STAs, e.g., an AID, a MAC address, a PHY address, and the like. If there is a group in which STAs are included, the start frame signal in operation 1511 may include a GID of the group to designate the part of the STAs.

If each of STA#1 113, STA#2 115, STA#3 117, and STA#4 119 monitors the start frame signal to detect the resource allocation request count $N_{req}$ and information on STAs which may transmit a resource allocation request message. Upon detecting that an uplink signal is to be transmitted, STA#1 113 and STA#2 115 may transmit a resource allocation request message for allocating a resource to the AP 111. In a case that the start frame signal specifies an STA by including an ID of the STA, or specifies a related group by including a GID, and STAs sequentially perform a resource allocation request message transmitting operation as described in FIG. 15, order in which the STAs transmit resource allocation request messages may be based on order of IDs of STAs included in the start frame signal. For example, the order in which the STAs transmit the request allocation request messages may be the order of the STAs included in the start frame signal, inverse order of the STAs included in the start frame signal, order of IDs of STAs included in a group which corresponds to a GID included in the start frame signal, or inverse order of the IDs of the STAs included in the group which corresponds to the GID included in the start frame signal. As a result, the order in which the STAs transmit the resource allocation request message may be any order that may distinguish order of STAs which is generated based on the parameters included in the start frame signal.

In FIG. 15, STA#1 113 and STA#2 115 transmit a resource allocation request message to the AP 111 at operations 1513 and 1515. In FIG. 15, it will be noted that the resource allocation request message is illustrated as 'Request'.

So, the AP 111 immediately allocates a resource to two STAs from which the AP 111 receives the request allocation request message, i.e., STA#1 113 and STA#2 115, that is, the AP 111 allocates the resource to STA#1 113 and STA#2 115 after a preset time, e.g., an XIFS or a contention-based interval after receiving the request allocation request message from STA#2 115, and transmits information on the allocated resource, i.e., scheduling information at operation 1517. The XIFS denotes an arbitrary IFS. As such, an XIFS may include one of various IFSs such as an SIFS, a DIFS, a PIFS, an AIFS, and the like. The scheduling information may include information on a frequency resource and a time resource which each STA will use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 receives an uplink signal from each of STA#1 113 and STA#2 115 at operations 1519 and 1521. In FIG. 15, it will be noted that an uplink signal transmitted from an STA is illustrated as 'UL MU-MIMO Data'.

Upon receiving the uplink signal from each of STA#1 113 and STA#2 115, the AP 111 transmits an ACK signal for the uplink signal received from each of STA#1 113 and STA#2 115 at operations 1523 and 1525.

Remaining STAs except for STA#1 113 and STA#2 115, i.e., STA#3 117 and STA#4 119 set an NAV, and waits until receiving a group ACK signal at operations 1527, 1529, 1531, and 1533. The STA#3 117 and STA#4 119 may not transmit an uplink signal. As such, STA#3 117 and STA#4 119 immediately set an NAV after receiving the start frame signal.

In FIG. 15, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 15, and still another example of a resource operating process performed in a WLAN system supporting a multi-user transmission scheme according to an embodiment of the present disclosure will be described with reference to FIG. 16.

Figure 16:
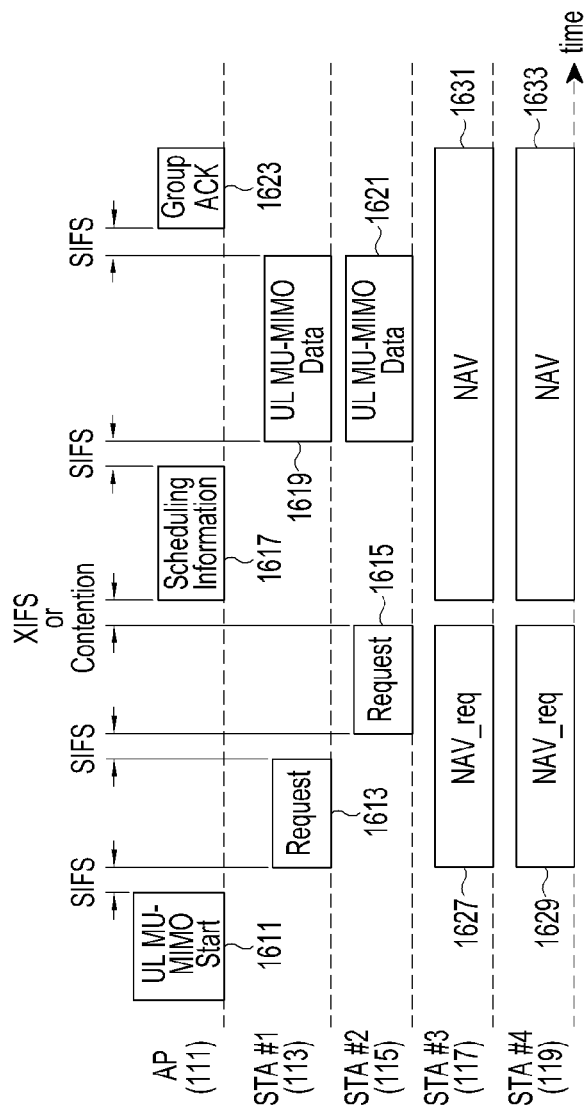
FIG. 16 schematically illustrates still another example of a resource operating process performed in a WLAN system supporting a multi-user transmission scheme according to an embodiment of the present disclosure.

FIG. 16 schematically illustrates still another example of a resource operating process performed in a WLAN system supporting a multi-user transmission scheme according to an embodiment of the present disclosure.

Referring to FIG. 16, it will be understood that a resource operating process in FIG. 16 is the same as a resource operating process in FIG. 15 except for a process of transmitting an ACK signal (that is, operations 1511 to 1521 in FIG. 15 are the same as operations 1611 to 1621 in FIG. 16, and operations 1527 and 1533 in FIG. 15 are the same as operations 1627 and 1633 in FIG. 16). That is, in the resource operating process in FIG. 15, an AP transmits an ACK signal for uplink signals which STAs transmit one to one (at operations 1523 and 1525), however, in the resource operating process in FIG. 16, an AP transmits a group ACK signal for uplink signals which STAs transmit (at operation 1623).

Still another example of a resource operating process performed in a WLAN system supporting a multi-user transmission scheme according to an embodiment of the present disclosure has been described with reference to FIG. 16, and still another example of a resource operating process performed in a WLAN system supporting a multi-user transmission scheme according to an embodiment of the present disclosure will be described with reference to FIG. 17.

Figure 17:
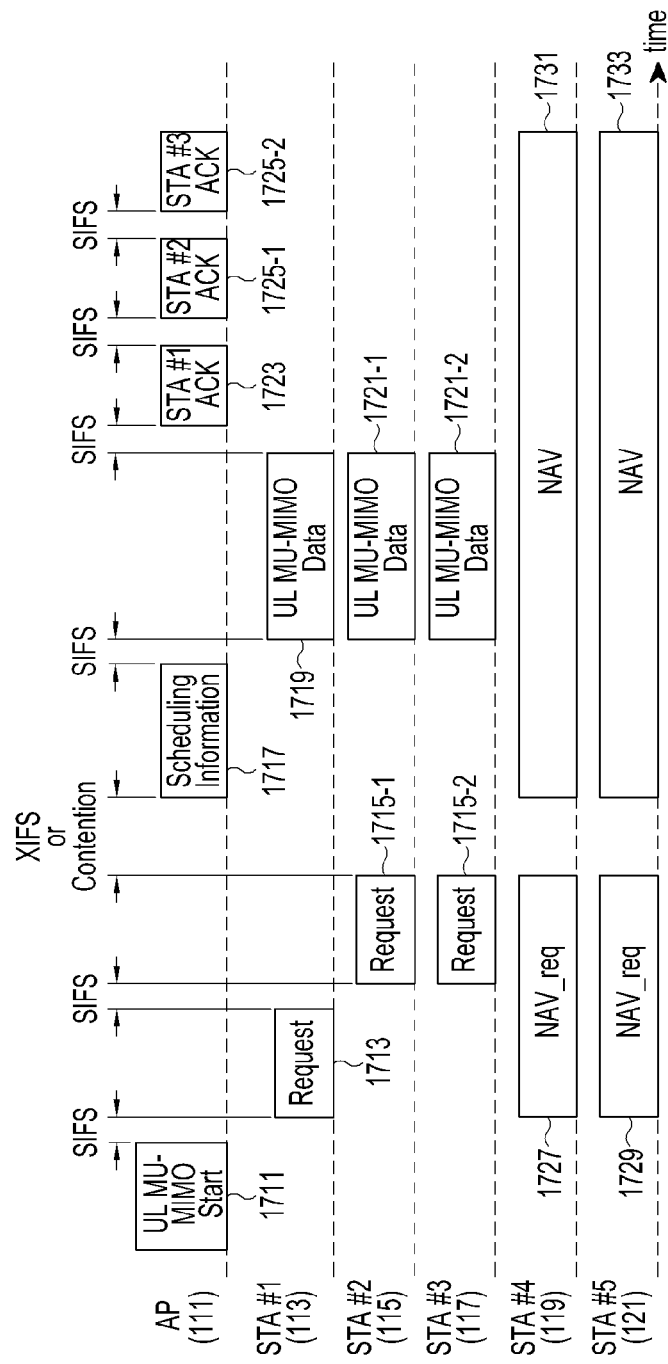
FIG. 17 schematically illustrates yet another example of a resource operating process performed in a WLAN system supporting a multi-user transmission scheme according to an embodiment of the present disclosure.

FIG. 17 schematically illustrates still another example of a resource operating process performed in a WLAN system supporting a multi-user transmission scheme according to an embodiment of the present disclosure.

Referring to FIG. 17, a resource operating process in FIG. 17 is a resource operating process which is based on a contention-free scheme. The resource operating process in FIG. 17 includes: a process of broadcasting a resource allocation request count $N_{req}$ and information on STAs which may transmit a resource allocation request message through a start frame signal in the AP, a process of transmitting resource allocation request messages to the AP with an overlap form in the STAs related to the information, a process of immediately broadcasting scheduling information in the AP, and a process of performing an uplink signal transmitting operation based on the scheduling information in the STAs, and this will be described below.

Firstly, an AP 111 transmits a start frame signal at operation 1711. The start frame signal includes one of various frames such as a beacon frame, a PSMP frame, a CTS-to-self frame, a modified RTS frame, and the like. In FIG. 17, it will be noted that the start frame signal is illustrated as 'UL MU-MIMO start'. A resource allocation request count $N_{req}$ which the AP 111 determines and information on STAs which may transmit a resource allocation request message are included in the start frame signal, an operation of determining the resource allocation request count $N_{req}$ in the AP 111 has been described above, and a description thereof will be omitted herein. In FIG. 17, it will be assumed that the resource allocation request count $N_{req}$ is set to 3. As such, the information on the STAs to which the AP 111 may transmit the resource allocation request message may include an STA ID of each of STA#1 113, STA#2 115, and STA#3 117.

The start frame signal in operation 1711 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the start frame signal, each STA may transmit a resource allocation request message for traffic included in the AC.

The start frame signal in operation 1711 may be transmitted thereby all STAs which exist within a network transmit a resource allocation request message, or a part of STAs which exist within a network transmits a resource allocation request message. In order that the part of the STAs transmits the resource allocation request message, the start frame signal in operation 1711 may include ID which may designate the part of the STAs, e.g., an AID, a MAC address, a PHY address, and the like. If there is a group in which STAs are included, the start frame signal in operation 1711 may include a GID of the group to designate the part of the STAs.

If each of STA#1 113, STA#2 115, STA#3 117, STA#4 119, and STA#5 121 monitors the start frame signal to detect the resource allocation request count $N_{req}$ and information on STAs which may transmit a resource allocation request message. Upon detecting that an uplink signal is to be transmitted, STA#1 113, STA#2 115, and STA#3 117 may transmit a resource allocation request message for allocating a resource to the AP 111. In a case that the start frame signal specifies an STA by including an ID of the STA, or specifies a related group by including a GID, and STAs sequentially perform a resource allocation request message transmitting operation as described in FIG. 17, order in which the STAs transmit resource allocation request messages may be based on order of IDs of STAs included in the start frame signal. For example, the order in which the STAs transmit the request allocation request messages may be the order of the STAs included in the start frame signal, inverse order of the STAs included in the start frame signal, order of IDs of STAs included in a group which corresponds to a GID included in the start frame signal, or inverse order of the IDs of the STAs included in the group which corresponds to the GID included in the start frame signal. As a result, the order in which the STAs transmit the resource allocation request message may be any order that may distinguish order of STAs which is generated based on the parameters included in the start frame signal.

In FIG. 17, STA#1 113, STA#2 115, and STA#3 117 transmit a resource allocation request message to the AP 111 at operations 1713, 1715-1, and 1715-2. In FIG. 17, it will be assumed that the AP 111 may detect resource allocation request messages transmitted with an overlap form even though the resource allocation request messages are transmitted with the overlap form at the same time. In FIG. 17, it will be noted that the resource allocation request message is illustrated as 'Request'.

So, the AP 111 immediately allocates a resource to three STAs from which the AP 111 receives the request allocation request message, i.e., STA#1 113, STA#2 115, and STA#3 117, that is, the AP 111 allocates the resource to STA#1 113, STA#2 115, and STA#3 117 after a preset time, e.g., an XIFS or a contention-based interval after receiving the request allocation request message from STA#2 115 and STA#3 117, and transmits information on the allocated resource, i.e., scheduling information at operation 1717. The XIFS denotes an arbitrary IFS. As such, an XIFS may include one of various IFSs such as an SIFS, a DIFS, a PIFS, an AIFS, and the like.

The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 receives an uplink signal from each of STA#1 113, STA#2 115, and STA#3 117 at operations 1719, 1721-1, and 1721-2. In FIG. 17, it will be noted that an uplink signal transmitted from an STA is illustrated as 'UL MU-MIMO Data'.

Upon receiving the uplink signal from each of STA#1 113, STA#2 115, and STA#3 117, the AP 111 transmits an ACK signal for the uplink signal received from each of STA#1 113, STA#2 115, and STA#3 117 at operations 1723, 1725-1, and 1725-2.

Remaining STAs except for STA#1 113, STA#2 115, and STA#3 117, i.e., STA#4 119 and STA#5 121 set an NAV, and waits until receiving a group ACK signal at operations 1727, 1729, 1731, and 1733. The STA#4 119 and STA#5 121 may not transmit an uplink signal, and immediately set the NAV after receiving the start frame signal.

In FIG. 17, a plurality of SIFSs are used. Here, each of the plurality of SIFSs may be changed to one of various IFS s such as a DIFS, a PIFS, an AIFS, and the like.

In FIG. 17, the STAs transmit the resource allocation request messages to the AP with the overlap form. In a case that the STAs and the AP may use a plurality of channels at the same time, e.g., a case that the STAs and the AP operate based on an orthogonal frequency division multiple access (OFDMA) scheme, channels through which the STAs transmit the resource allocation request messages may be different.

Still another example of a resource operating process performed in a WLAN system supporting a multi-user transmission scheme according to an embodiment of the present disclosure has been described with reference to FIG. 17, and still another example of a resource operating process performed in a WLAN system supporting a multi-user transmission scheme according to an embodiment of the present disclosure will be described with reference to FIG. 18.

Figure 18:
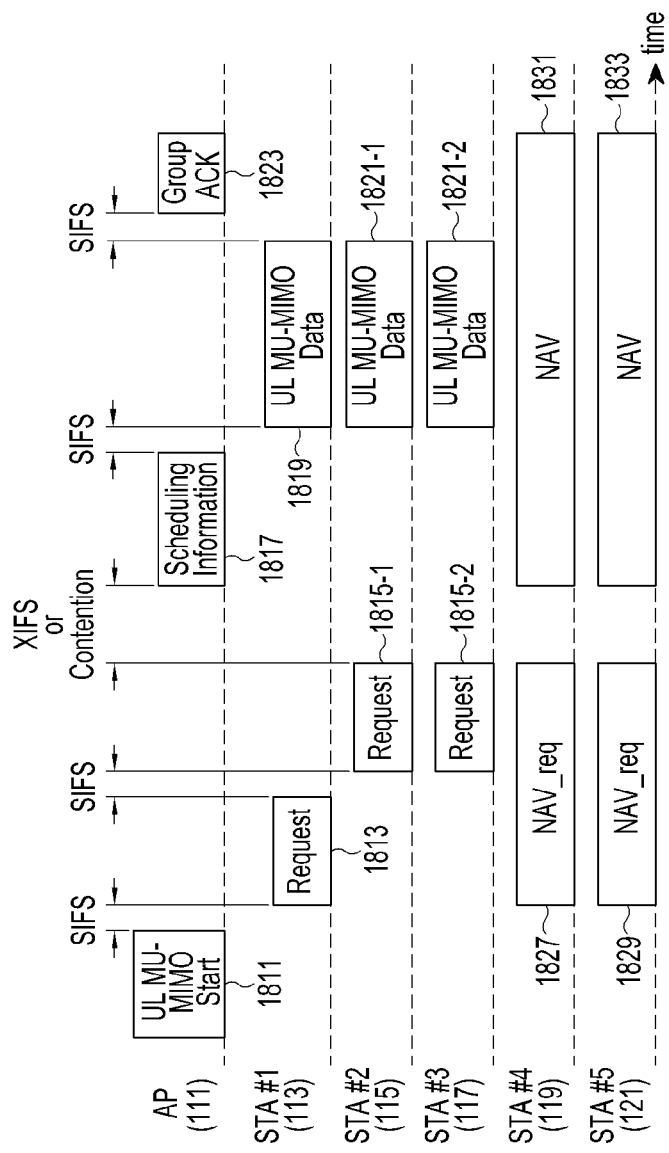
FIG. 18 schematically illustrates still another example of a resource operating process performed in a WLAN system supporting a multi-user transmission scheme according to an embodiment of the present disclosure.

FIG. 18 schematically illustrates still another example of a resource operating process performed in a WLAN system supporting a multi-user transmission scheme according to an embodiment of the present disclosure.

Referring to FIG. 18, it will be understood that a resource operating process in FIG. 18 is the same as a resource operating process in FIG. 17 except for a process of transmitting an ACK signal (that is, operations 1711 to 1721-2 in FIG. 17 are the same as operations 1811 to 1821-2 in FIG. 18, and operations 1727 and 1733 in FIG. 17 are the same as operations 1827 and 1833 in FIG. 18). That is, in the resource operating process in FIG. 17, an AP transmits an ACK signal for uplink signals which STAs transmit one to one (at operations 1723, 1725-1, and 1725-2), however, in the resource operating process in FIG. 18, an AP transmits a group ACK signal for uplink signals which STAs transmit (at operation 1823).

Still another example of a resource operating process performed in a WLAN system supporting a multi-user transmission scheme according to an embodiment of the present disclosure has been described with reference to FIG. 18, and still another example of a resource operating process performed in a WLAN system supporting a multi-user transmission scheme according to an embodiment of the present disclosure will be described with reference to FIG. 19.

Figure 19:
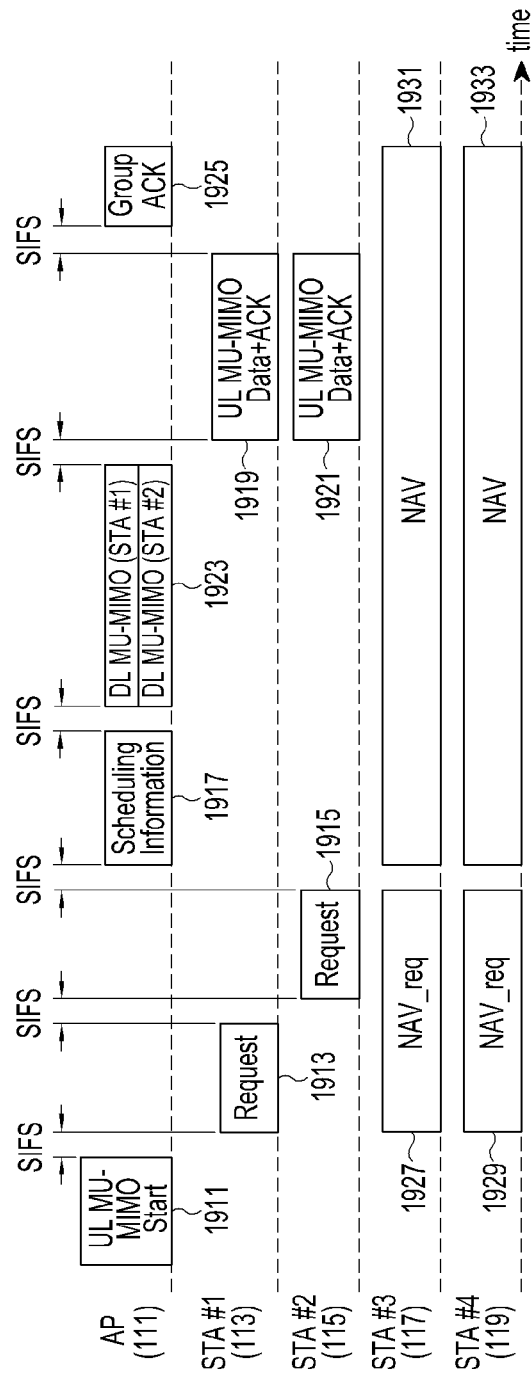
FIG. 19 schematically illustrates yet another example of a resource operating process performed in a WLAN system supporting a multi-user transmission scheme according to an embodiment of the present disclosure.

FIG. 19 schematically illustrates still another example of a resource operating process performed in a WLAN system supporting a multi-user transmission scheme according to an embodiment of the present disclosure.

Referring to FIG. 19, a resource operating process in FIG. 19 is a resource operating process which is based on a contention-free scheme. The resource operating process in FIG. 19 includes: a process of broadcasting a resource allocation request count $N_{req}$ and information on STAs which may transmit a resource allocation request message through a start frame signal in the AP, a process of transmitting resource allocation request messages to the AP in the STAs related to the information, a process of immediately broadcasting scheduling information in the AP, a process of performing a downlink signal transmitting operation based on the scheduling information in the AP, and a process of performing an uplink signal transmitting operation based on the scheduling information in the STAs, and this will be described below.

Firstly, an AP 111 transmits a start frame signal at operation 1911. The start frame signal includes one of various frames such as a beacon frame, a PSMP frame, a CTS-to-self frame, a modified RTS frame, and the like. In FIG. 19, it will be noted that the start frame signal is illustrated as 'UL MU-MIMO start'. A resource allocation request count $N_{req}$ which the AP 111 determines and information on STAs which may transmit a resource allocation request message are included in the start frame signal, an operation of determining the resource allocation request count $N_{req}$ in the AP 111 has been described above, and a description thereof will be omitted herein.

The start frame signal in operation 1911 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the start frame signal, each STA may transmit a resource allocation request message for traffic included in the AC.

The start frame signal in operation 1911 may be transmitted thereby all STAs which exist within a network transmit a resource allocation request message, or a part of STAs which exist within a network transmits a resource allocation request message. In order that the part of the STAs transmits the resource allocation request message, the start frame signal in operation 1911 may include ID which may designate the part of the STAs, e.g., an AID, a MAC address, a PHY address, and the like. If there is a group in which STAs are included, the start frame signal in operation 1911 may include a GID of the group to designate the part of the STAs.

In FIG. 19, it will be assumed that the resource allocation request count $N_{req}$ is set to 2. As such, the information on the STAs to which the AP 111 may transmit the resource allocation request message includes an STA ID of each of STA#1 113 and STA#2 115.

If each of STA#1 113, STA#2 115, STA#3 117, and STA#4 119 monitors the start frame signal to detect the resource allocation request count $N_{req}$ and information on STAs which may transmit a resource allocation request message. Upon detecting an uplink signal is to be transmitted, STA#1 113 and STA#2 115 may transmit a resource allocation request message for allocating a resource to the AP 111. In a case that the start frame signal specifies an STA by including an ID of the STA, or specifies a related group by including a GID, and STAs sequentially perform a resource allocation request message transmitting operation as described in FIG. 19, order in which the STAs transmit resource allocation request messages may be based on order of IDs of STAs included in the start frame signal. For example, the order in which the STAs transmit the request allocation request messages may be the order of the STAs included in the start frame signal, inverse order of the STAs included in the start frame signal, order of IDs of STAs included in a group which corresponds to a GID included in the start frame signal, or inverse order of the IDs of the STAs included in the group which corresponds to the GID included in the start frame signal. As a result, the order in which the STAs transmit the resource allocation request message may be any order that may distinguish order of STAs which is generated based on the parameters included in the start frame signal.

In FIG. 19, STA#1 113 and STA#2 115 transmit a resource allocation request message to the AP 111 at operations 1913 and 1915. In FIG. 19, it will be noted that the resource allocation request message is illustrates as 'Request'.

So, the AP 111 immediately allocates a resource to two STAs from which the AP 111 receives the request allocation request message, i.e., STA#1 113 and STA#2 115, that is, the AP 111 allocates the resource to STA#1 113 and STA#2 115 after a preset time, e.g., an XIFS or a contention-based interval after receiving the request allocation request message from STA#2 115, and transmits information on the allocated resource, i.e., scheduling information at operation 1917. The XIFS denotes an arbitrary IFS. As such, an XIFS may include one of various IFSs such as an SIFS, a DIFS, a PIFS, an AIFS, and the like. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 transmits a downlink signal to each of STA#1 113 and STA#2 115 at operation 1923. After a preset time, e.g., an SIFS, the AP 111 receives an uplink signal from each of STA#1 113 and STA#2 115 at operations 1919 and 1921. In FIG. 19, it will be noted that a downlink signal transmitted from an AP is illustrated as 'DL MU-MIMO', and an uplink signal transmitted from an STA is illustrated as 'UL MU-MIMO Data'.

Upon receiving the uplink signal from each of STA#1 113 and STA#2 115, the AP 111 transmits a group ACK signal for the uplink signal received from each of STA#1 113 and STA#2 115 at operation 1925. In FIG. 19, the AP 111 transmits a group ACK signal for the uplink signal received from each of STA#1 113 and STA#2 115, however, it will be understood by those of ordinary skill in the art that the AP 111 may transmit an ACK signal for the uplink signal received from each of STA#1 113 and STA#2 115 one to one.

Remaining STAs except for STA#1 113 and STA#2 115, i.e., STA#3 117 and STA#4 119 set an NAV, and waits until receiving a group ACK signal at operations 1927, 1929, 1931, and 1933. The STA#3 117 and STA#4 119 may not transmit an uplink signal, and immediately set the NAV after receiving the start frame signal.

In FIG. 19, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 19, and still another example of a resource operating process performed in a WLAN system supporting a multi-user transmission scheme according to an embodiment of the present disclosure will be described with reference to FIG. 20.

Figure 20:
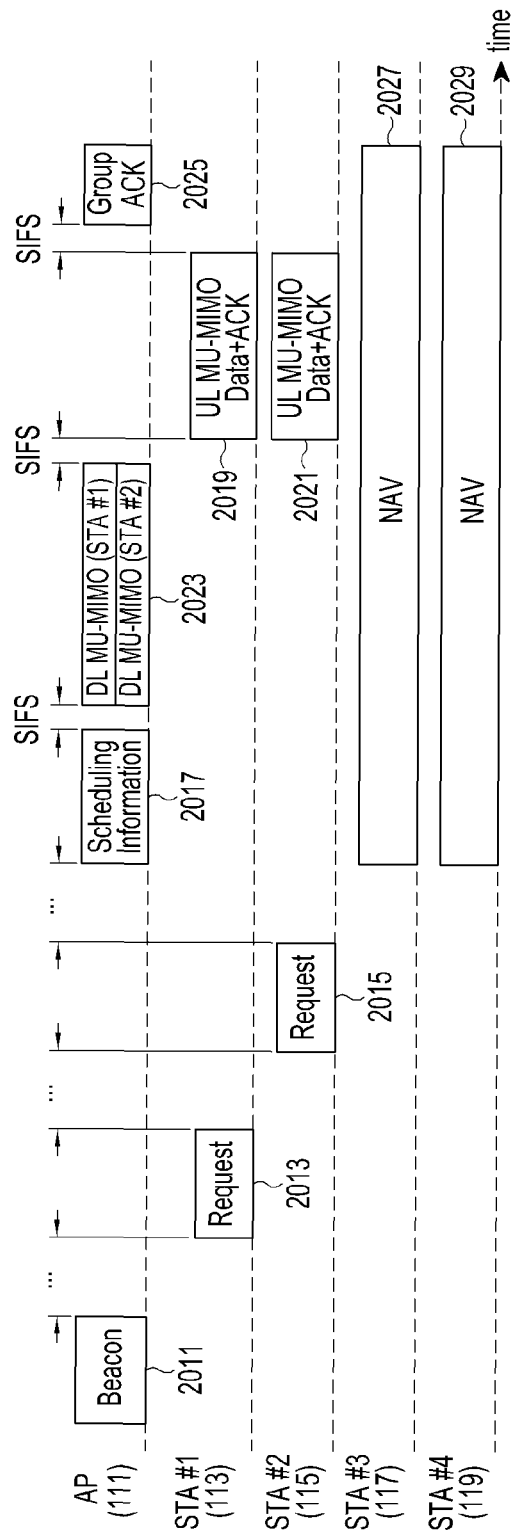
FIG. 20 schematically illustrates still another example of a resource operating process performed in a WLAN system supporting a multi-user transmission scheme according to an embodiment of the present disclosure.

FIG. 20 schematically illustrates still another example of a resource operating process performed in a WLAN system supporting a multi-user transmission scheme according to an embodiment of the present disclosure.

Referring to FIG. 20, a resource operating process in FIG. 20 is a resource operating process which is based on a contention-based scheme. The resource operating process in FIG. 20 includes: a process of broadcasting a resource allocation request count $N_{req}$ through a beacon signal in an AP, a process of transmitting resource allocation request messages to the AP based on a contention-based scheme in STAs, a process of immediately broadcasting scheduling information in the AP based on the contention-based scheme in the AP, a process of performing a downlink signal transmitting operation based on the scheduling information in the AP, and a process of performing an uplink signal transmitting operation based on the scheduling information in the STAs, and this will be described below.

Firstly, an AP 111 transmits a beacon signal at operation 2011. The beacon signal includes a resource allocation request count $N_{req}$ which the AP 111 determines, an operation of determining the resource allocation request count $N_{req}$ in the AP 111 has been described above, and a description thereof will be omitted herein.

The beacon signal in operation 2011 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the beacon signal, each STA may transmit a resource allocation request message for traffic included in the AC.

The beacon signal in operation 2011 may be transmitted thereby all STAs which exist within a network transmit a resource allocation request message, or a part of STAs which exist within a network transmits a resource allocation request message. In order that the part of the STAs transmits the resource allocation request message, the beacon signal in operation 2011 may include ID which may designate the part of the STAs, e.g., an AID, a MAC address, a PHY address, and the like. If there is a group in which STAs are included, the beacon signal in operation 2011 may include a GID of the group to designate the part of the STAs.

Meanwhile, each of STA#1 113, STA#2 115, STA#3 117, and STA#4 119 monitors the beacon signal to detect the resource allocation request message $N_{req}$ and monitors signals which other STAs transmit.

It will be assumed that STA#1 113, STA#2 115, STA#3 117, and STA#4 119 detect that a signal is to be transmitted while performing the monitoring operation, and STA#1 113 and STA#2 115 transmit a resource allocation request message at operations 2013 and 2015. The STA#1 113 and STA#2 115 transmit the resource allocation request message based on the resource allocation request count $N_{req}$, this has been described above. In FIG. 20, it will be noted that the resource allocation request message is illustrated as 'Request'.

Meanwhile, it will be assumed that the AP 111 uses a plurality of antennas, e.g., two antennas, and the resource allocation request count $N_{req}$ is set to a preset value, e.g., 2. So, STA#1 113 and STA#2 115 transmit the resource allocation request message, and remaining STAs, i.e., STA#3 117 and STA#4 119 set an NAV and wait until normally receiving an ACK signal since STA#3 117 and STA#4 119 may detect that resource allocation request messages of which the number is greater than or equal to the resource allocation request count $N_{req}$ have been transmitted to the AP 111 at operations 2027 and 2029.

So, the AP 111 allocates a resource to two STAs from which the AP 111 receives the request allocation request message, i.e., STA#1 113 and STA#2 115 based on a contention-based scheme, that is, the AP 111 allocates the resource to STA#1 113 and STA#2 115 after receiving the request allocation request message from STA#2 115 and performing an additional procedure, and transmits information on the allocated resource, i.e., scheduling information at operation 2017. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 transmits a downlink signal to each of STA#1 113 and STA#2 115 at operation 2023. After a preset time, e.g., an SIFS, the AP 111 receives an uplink signal from each of STA#1 113 and STA#2 115 at operations 2019 and 2021. In FIG. 20, it will be noted that a downlink signal transmitted from an AP is illustrated as 'DL MU-MIMO', and an uplink signal transmitted from an STA is illustrated as 'UL MU-MIMO Data'.

Upon receiving the uplink signal from each of STA#1 113 and STA#2 115, the AP 111 transmits a group ACK signal for the uplink signal received from each of STA#1 113 and STA#2 115 at operation 2025. In FIG. 20, the AP 111 transmits a group ACK signal for the uplink signal received from each of STA#1 113 and STA#2 115, however, it will be understood by those of ordinary skill in the art that the AP 111 may transmit an ACK signal for the uplink signal received from each of STA#1 113 and STA#2 115 one to one.

In FIG. 20, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 20, and still another example of a resource operating process performed in a WLAN system supporting a multi-user transmission scheme according to an embodiment of the present disclosure will be described with reference to FIG. 21.

Figure 21:
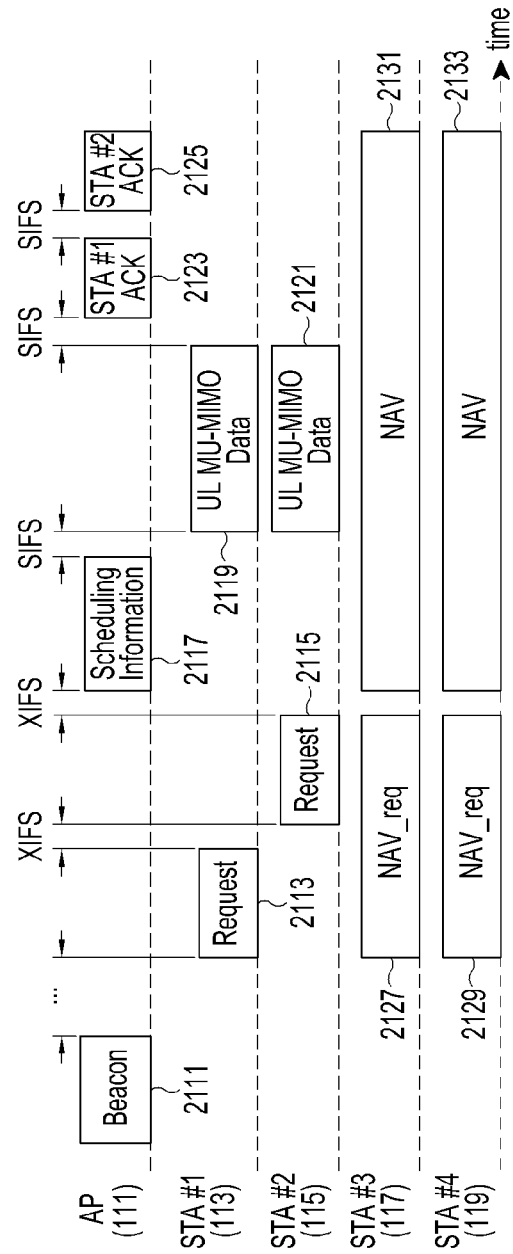
FIG. 21 schematically illustrates yet another example of a resource operating process performed in a WLAN system supporting a multi-user transmission scheme according to an embodiment of the present disclosure.

FIG. 21 schematically illustrates still another example of a resource operating process performed in a WLAN system supporting a multi-user transmission scheme according to an embodiment of the present disclosure.

Referring to FIG. 21, a resource operating process in FIG. 21 is a resource operating process which is based on a contention-based scheme. The resource operating process in FIG. 21 includes: a process of broadcasting a resource allocation request count $N_{req}$ through a beacon signal in an AP, a process of transmitting resource allocation request messages to the AP based on a contention-based scheme by a relatively short interval, e.g., an XIFS in STAs, a process of immediately broadcasting scheduling information in the AP, and a process of performing an uplink signal transmitting operation based on the scheduling information in the STAs, and this will be described below.

Firstly, an AP 111 transmits a beacon signal at operation 2111. The beacon signal includes a resource allocation request count $N_{req}$ which the AP 111 determines, an operation of determining the resource allocation request count $N_{req}$ in the AP 111 has been described above, and a description thereof will be omitted herein.

The beacon signal in operation 2111 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the beacon signal, each STA may transmit a resource allocation request message for traffic included in the AC.

The beacon signal in operation 2111 may be transmitted thereby all STAs which exist within a network transmit a resource allocation request message, or a part of STAs which exist within a network transmits a resource allocation request message. In order that the part of the STAs transmits the resource allocation request message, the start frame signal in operation 2111 may include ID which may designate the part of the STAs, e.g., an AID, a MAC address, a PHY address, and the like. If there is a group in which STAs are included, the beacon signal in operation 2111 may include a GID of the group to designate the part of the STAs.

Meanwhile, each of STA#1 113, STA#2 115, STA#3 117, and STA#4 119 monitors the beacon signal to detect the resource allocation request message $N_{req}$, and monitors signals which other STAs transmit.

It will be assumed that STA#1 113 and STA#2 115 detect that a signal is to be transmitted while performing the monitoring operation, and transmit a resource allocation request message at operations 2113 and 2115.

In a case that the beacon signal specifies an STA by including an ID of the STA, or specifies a related group by including a GID, and STAs sequentially perform a resource allocation request message transmitting operation as described in FIG. 21, order in which the STAs transmit resource allocation request messages may be based on order of IDs of STAs included in the beacon signal. For example, the order in which the STAs transmit the request allocation request messages may be the order of the STAs included in the beacon signal, inverse order of the STAs included in the beacon signal, order of IDs of STAs included in a group which corresponds to a GID included in the beacon signal, or inverse order of the IDs of the STAs included in the group which corresponds to the GID included in the beacon signal. As a result, the order in which the STAs transmit the resource allocation request message may be any order that may distinguish order of STAs which is generated based on the parameters included in the beacon signal.

The STA#1 113 and STA#2 115 transmit a resource allocation request message based on the resource allocation request count $N_{req}$, this has been described above, and a description thereof will be omitted herein. In FIG. 21, it will be assumed that STAs transmit the resource allocation request message by a relatively short interval, e.g., an XIFS. The XIFS denotes an arbitrary IFS. As such, an XIFS may include one of various IFSs such as an SIFS, a DIFS, a PIFS, an AIFS, and the like. In FIG. 21, it will be noted that the resource allocation request message is illustrated as 'Request'.

Meanwhile, it will be assumed that the AP 111 uses a plurality of antennas, e.g., two antennas, and the resource allocation request count $N_{req}$ is set to a preset value, e.g., 2. So, the AP 111 immediately allocates a resource to two STAs from which the AP 111 receives the request allocation request message, i.e., STA#1 113 and STA#2 115, that is, the AP 111 allocates the resource to STA#1 113 and STA#2 115 after a preset time, e.g., an XIFS after receiving the request allocation request message from STA#2 115, and transmits information on the allocated resource, i.e., scheduling information at operation 2117. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 receives an uplink signal from each of STA#1 113 and STA#2 115 at operations 2119 and 2121. In FIG. 21, it will be noted that an uplink signal transmitted from an STA is illustrated as 'UL MU-MIMO Data'.

Upon receiving the uplink signal from each of STA#1 113 and STA#2 115, the AP 111 transmits an ACK signal for the uplink signal received from each of STA#1 113 and STA#2 115 at operations 2123 and 2125. In FIG. 21, the AP 111 transmits an ACK signal for the uplink signal received from each of STA#1 113 and STA#2 115 one to one, however, it will be understood by those of ordinary skill in the art that the AP 111 transmits a group ACK signal for the uplink signal which is received from each of STA#1 113 and STA#2 115.

Remaining STAs except for STA#1 113 and STA#2 115, i.e., STA#3 117 and STA#4 119 set an NAV, and waits until receiving a group ACK signal at operations 2127, 2129, 2131, and 2133. The STA#3 117 and STA#4 119 do not transmit an uplink signal, and immediately set the NAV after receiving the beacon signal.

In FIG. 21, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 21, and still another example of a resource operating process performed in a WLAN system supporting a multi-user transmission scheme according to an embodiment of the present disclosure will be described with reference to FIG. 22.

Figure 22:
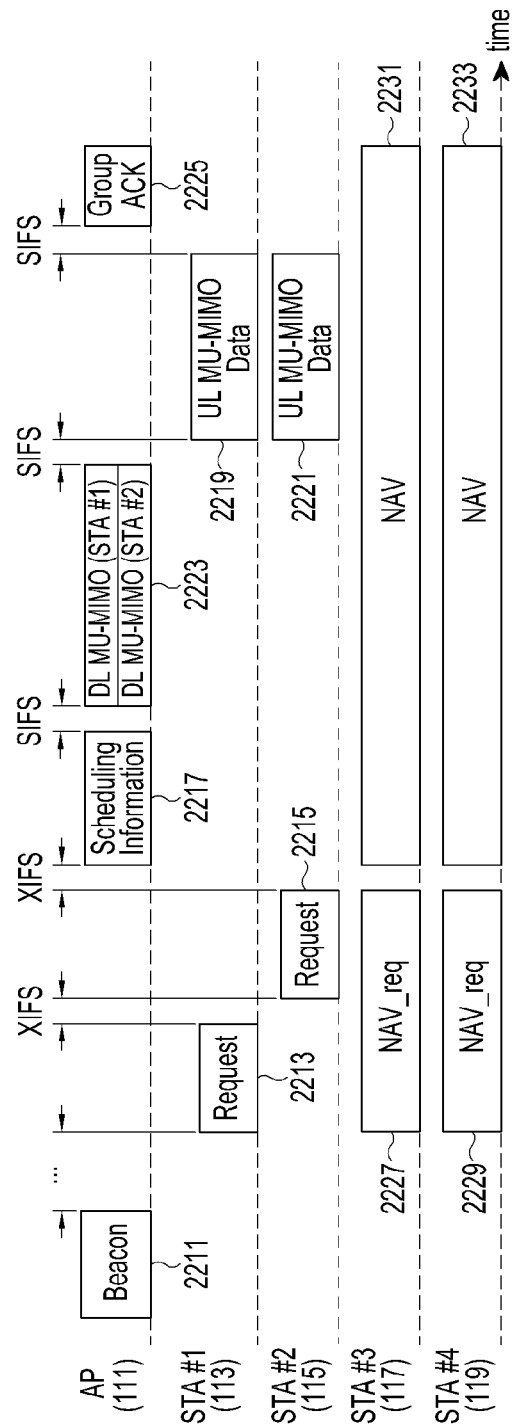
FIG. 22 schematically illustrates still another example of a resource operating process performed in a WLAN system supporting a multi-user transmission scheme according to an embodiment of the present disclosure.

FIG. 22 schematically illustrates still another example of a resource operating process performed in a WLAN system supporting a multi-user transmission scheme according to an embodiment of the present disclosure.

Referring to FIG. 22, a resource operating process in FIG. 22 is a resource operating process which is based on a contention-based scheme. The resource operating process in FIG. 22 includes: a process of broadcasting a resource allocation request count $N_{req}$ through a beacon signal in an AP, a process of transmitting resource allocation request messages to the AP based on a contention-based scheme by a relatively short interval, e.g., an XIFS in STAs, a process of immediately broadcasting scheduling information in the AP, a process of performing a downlink signal transmitting operation based on the scheduling information in the AP, and a process of performing an uplink signal transmitting operation based on the scheduling information in the STAs, and this will be described below.

Firstly, an AP 111 transmits a beacon signal at operation 2211. The beacon signal includes a resource allocation request count $N_{req}$ which the AP 111 determines, an operation of determining the resource allocation request count $N_{req}$ in the AP 111 has been described above, and a description thereof will be omitted herein.

The beacon signal in operation 2211 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the beacon signal, each STA may transmit a resource allocation request message for traffic included in the AC.

The beacon signal in operation 2211 may be transmitted thereby all STAs which exist within a network transmit a resource allocation request message, or a part of STAs which exist within a network transmits a resource allocation request message. In order that the part of the STAs transmits the resource allocation request message, the beacon signal in operation 2211 may include ID which may designate the part of the STAs, e.g., an AID, a MAC address, a PHY address, and the like. If there is a group in which STAs are included, the beacon signal in operation 2211 may include a GID of the group to designate the part of the STAs.

Meanwhile, each of STA#1 113, STA#2 115, STA#3 117, and STA#4 119 monitors the beacon signal to detect the resource allocation request message $N_{req}$, and monitors signals which other STAs transmit.

It will be assumed that STA#1 113 and STA#2 115 among STA#1, STA#2 115, STA#3 117, and STA#4 119 detect that an uplink signal is to be transmitted while performing the monitoring operation, and transmit a resource allocation request message at operations 2213 and 2215.

In a case that the beacon signal specifies an STA by including an ID of the STA, or specifies a related group by including a GID, and STAs sequentially perform a resource allocation request message transmitting operation as described in FIG. 22, order in which the STAs transmit resource allocation request messages may be based on order of IDs of STAs included in the beacon signal. For example, the order in which the STAs transmit the request allocation request messages may be the order of the STAs included in the beacon signal, inverse order of the STAs included in the beacon signal, order of IDs of STAs included in a group which corresponds to a GID included in the beacon signal, or inverse order of the IDs of the STAs included in the group which corresponds to the GID included in the beacon signal. As a result, the order in which the STAs transmit the resource allocation request message may be any order that may distinguish order of STAs which is generated based on the parameters included in the beacon signal.

The STA#1 113 and STA#2 115 transmit a resource allocation request message based on the resource allocation request count $N_{req}$, this has been described above, and a description thereof will be omitted herein. In FIG. 22, it will be assumed that STAs transmit the resource allocation request message by a relatively short interval, e.g., an XIFS. The XIFS denotes an arbitrary IFS. As such, an XIFS may include one of various IFSs such as an SIFS, a DIFS, a PIFS, an AIFS, and the like. In FIG. 22, it will be noted that the resource allocation request message is illustrated as 'Request'.

Meanwhile, it will be assumed that the AP 111 uses a plurality of antennas, e.g., two antennas, and the resource allocation request count $N_{req}$ is set to a preset value, e.g., 2. So, the AP 111 immediately allocates a resource to two STAs from which the AP 111 receives the request allocation request message, i.e., STA#1 113 and STA#2 115, that is, the AP 111 allocates the resource to STA#1 113 and STA#2 115 after a preset time, e.g., an XIFS after receiving the request allocation request message from STA#2 115, and transmits information on the allocated resource, i.e., scheduling information at operation 2217. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 transmits a downlink signal to each of STA#1 113 and STA#2 115 at operation 2223. After a preset time, e.g., a SIFS, the AP 111 receives an uplink signal from each of STA#1 113 and STA#2 115 at operations 2219 and 2221. In FIG. 22, it will be noted that a downlink signal transmitted from an AP is illustrated as 'DL MU-MIMO Data', and an uplink signal transmitted from an STA is illustrated as 'UL MU-MIMO Data'.

Upon receiving the uplink signal from each of STA#1 113 and STA#2 115, the AP 111 transmits a group ACK signal for the uplink signal received from each of STA#1 113 and STA#2 115 at operation 2225. In FIG. 22, the AP 111 transmits the group ACK signal for the uplink signal received from each of STA#1 113 and STA#2 115, however, it will be understood by those of ordinary skill in the art that the AP 111 transmits an ACK signal for the uplink signal which is received from each of STA#1 113 and STA#5 121 one to one.

Remaining STAs except for STA#1 113 and STA#2 115, i.e., STA#3 117 and STA#4 119 set an NAV, and waits until receiving a group ACK signal at operations 2227, 2229, 2231, and 2233. The STA#3 117 and STA#4 119 may not transmit an uplink signal, and immediately set the NAV after receiving the beacon signal.

In FIG. 22, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 22, and still another example of a resource operating process performed in a WLAN system supporting a multi-user transmission scheme according to an embodiment of the present disclosure will be described with reference to FIG. 23.

Figure 23:
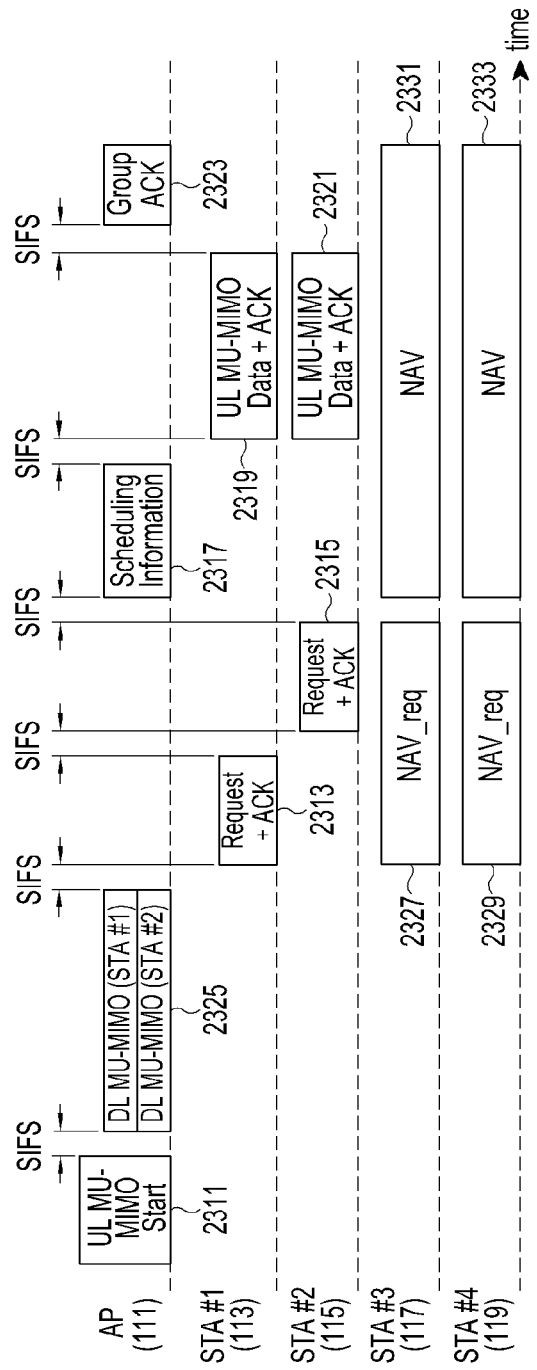
FIG. 23 schematically illustrates yet another example of a resource operating process performed in a WLAN system supporting a multi-user transmission scheme according to an embodiment of the present disclosure.

FIG. 23 schematically illustrates still another example of a resource operating process performed in a WLAN system supporting a multi-user transmission scheme according to an embodiment of the present disclosure.

Referring to FIG. 23, a resource operating process in FIG. 23 is a resource operating process which is based on a contention-free scheme. The resource operating process in FIG. 23 includes: a process of broadcasting a resource allocation request count $N_{req}$ and information on STAs which may transmit a resource allocation request message through a start frame signal in the AP, a process of performing a downlink signal transmitting operation in the AP, a process of transmitting resource allocation request messages to the AP by a relatively short interval, e.g., an XIFS in STAs related to the information, a process of immediately broadcasting scheduling information in the AP, and a process of performing an uplink signal transmitting operation based on the scheduling information in the STAs, and this will be described below.

Firstly, an AP 111 transmits a start frame signal at operation 2311. The start frame signal includes one of various frames such as a beacon frame, a PSMP frame, a CTS-to-self frame, a modified RTS frame, and the like. In FIG. 23, it will be noted that the start frame signal is illustrated as 'UL MU-MIMO start'. A resource allocation request count $N_{req}$ which the AP 111 determines and information on STAs which may transmit a resource allocation request message are included in the start frame signal, an operation of determining the resource allocation request count $N_{req}$ in the AP 111 has been described above, and a description thereof will be omitted herein. In FIG. 23, it will be assumed that the resource allocation request count $N_{req}$ is set to 2. As such, the information on the STAs to which the AP 111 may transmit the resource allocation request message includes an STA ID of each of STA#1 113 and STA#2 115.

The beacon signal in operation 2311 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the beacon signal, each STA may transmit a resource allocation request message for traffic included in the AC. The AP 111 transmits a downlink signal to each of STA#1 113 and STA#2 115 after a preset time, e.g., an SIFS at operation 2325. It will be noted that a downlink signal transmitted from an AP is illustrated as 'DL MU-MIMO'.

The start frame signal in operation 2311 may be transmitted thereby all STAs which exist within a network transmit a resource allocation request message, or a part of STAs which exist within a network transmits a resource allocation request message. In order that the part of the STAs transmits the resource allocation request message, the start frame signal in operation 2311 may include ID which may designate the part of the STAs, e.g., an AID, a MAC address, a PHY address, and the like. If there is a group in which STAs are included, the start frame signal in operation 2311 may include a GID of the group to designate the part of the STAs.

If each of STA#1 113, STA#2 115, STA#3 117, and STA#4 119 monitors the start frame signal to detect the resource allocation request count $N_{req}$ and information on STAs which may transmit a resource allocation request message. Upon detecting that an uplink signal is to be transmitted, STA#1 113 and STA#2 115 may transmit a resource allocation request message for allocating a resource to the AP 111. In a case that the start frame signal specifies an STA by including an ID of the STA, or specifies a related group by including a GID, and STAs sequentially perform a resource allocation request message transmitting operation as described in FIG. 23, order in which the STAs transmit resource allocation request messages may be based on order of IDs of STAs included in the start frame signal. For example, the order in which the STAs transmit the request allocation request messages may be the order of the STAs included in the start frame signal, inverse order of the STAs included in the start frame signal, order of IDs of STAs included in a group which corresponds to a GID included in the start frame signal, or inverse order of the IDs of the STAs included in the group which corresponds to the GID included in the start frame signal. As a result, the order in which the STAs transmit the resource allocation request message may be any order that may distinguish order of STAs which is generated based on the parameters included in the start frame signal.

In FIG. 23, STA#1 113 and STA#2 115 transmit a resource allocation request message to the AP 111 at operations 2313 and 2315. Each of STA#1 113 and STA#2 115 may transmit an ACK signal for the downlink signal received from the AP 111 along with the resource allocation request message. The STA#1 113 and STA#2 115 may not transmit the resource allocation request message since STA#1 113 and STA#2 115 may not transmit an uplink signal. In this case, STA#1 113 and STA#2 115 do not transmit the resource allocation request message and may transmit the ACK signal. Upon detecting that an uplink signal is to be transmitted, a STA which does not receive a downlink signal may transmit a resource allocation request message within the resource allocation request count $N_{req}$. In FIG. 23, it will be noted that the resource allocation request message is illustrated as 'Request'.

So, the AP 111 immediately allocates a resource to two STAs from which the AP 111 receives the request allocation request message, i.e., STA#1 113 and STA#2 115, that is, the AP 111 allocates the resource to STA#1 113 and STA#2 115 after a preset time, e.g., an SIFS after receiving the request allocation request message from STA#2 115, and transmits information on the allocated resource, i.e., scheduling information at operation 2317. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 receives an uplink signal from each of STA#1 113 and STA#2 115 at operations 2319 and 2321. In FIG. 23, it will be noted that an uplink signal transmitted from an STA is illustrated as 'UL MU-MIMO Data'. The STA#1 113 and STA#2 115 may transmit an ACK signal for the downlink signals received from the AP 111 along with an uplink signal.

Upon receiving the uplink signal from each of STA#1 113 and STA#2 115, the AP 111 transmits a group ACK signal for the uplink signal received from each of STA#1 113 and STA#2 115 at operation 2323. In FIG. 23, the AP 111 transmits a group ACK signal for the uplink signal received from each of STA#1 113 and STA#2 115, however, it will be understood by those of ordinary skill in the art that the AP 111 transmits an ACK signal for the uplink signal which is received from each of STA#1 113 and STA#5 121 one to one.

Upon detecting that an uplink signal is to be transmitted, other STA which does not receive a downlink signal may transmit the resource allocation request message within the resource allocation request message $N_{req}$.

Remaining STAs except for STA#1 113 and STA#2 115, i.e., STA#3 117 and STA#4 119 set an NAV, and waits until receiving a group ACK signal at operations 2327, 2329, 2331, and 2333. The STA#3 117 and STA#4 119 may not transmit an uplink signal, and immediately set the NAV after receiving the start frame signal.

In FIG. 23, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 23, and still another example of a resource operating process performed in a WLAN system supporting a multi-user transmission scheme according to an embodiment of the present disclosure will be described with reference to FIG. 24.

Figure 24:
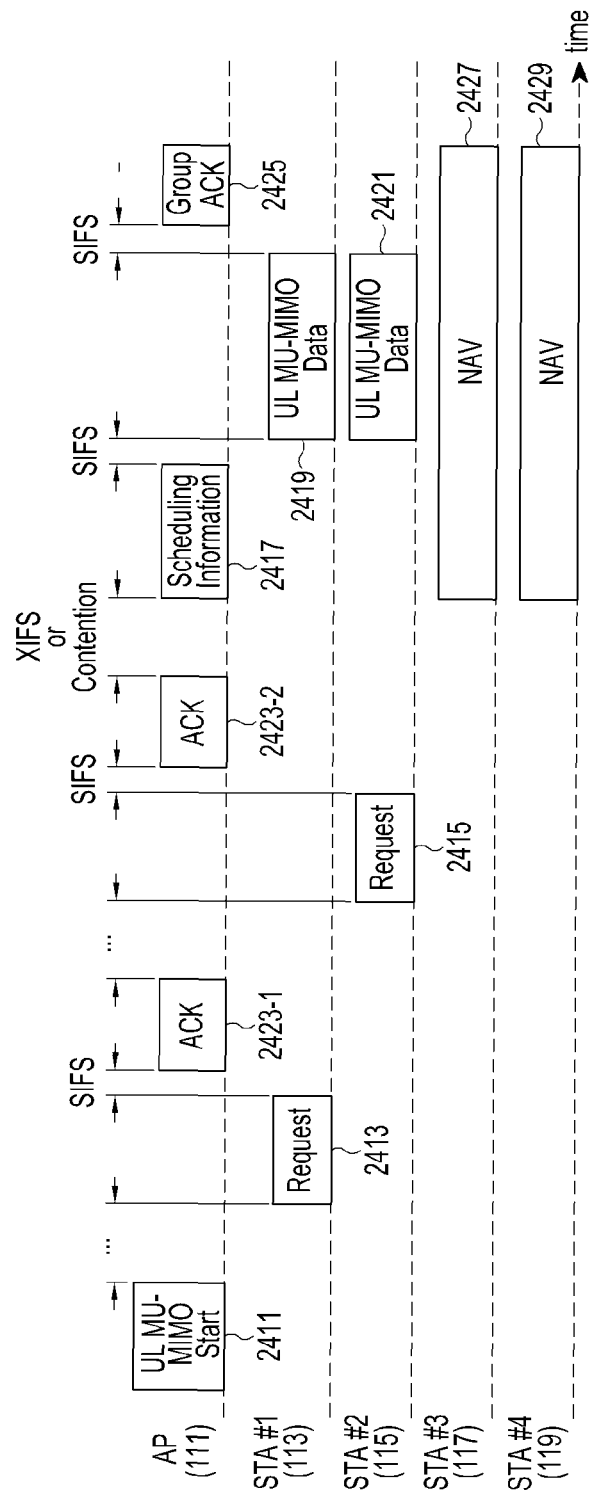
FIG. 24 schematically illustrates still another example of a resource operating process performed in a WLAN system supporting a multi-user transmission scheme according to an embodiment of the present disclosure.

FIG. 24 schematically illustrates still another example of a resource operating process performed in a WLAN system supporting a multi-user transmission scheme according to an embodiment of the present disclosure.

Referring to FIG. 24, a resource operating process in FIG. 24 is a resource operating process which is based on a contention-based scheme. The resource operating process in FIG. 24 includes: a process of broadcasting a start frame signal in an AP, a process of transmitting resource allocation request messages to the AP based on a contention-based scheme in STAs, a process of transmitting an ACK signal for the resource allocation request messages in the AP, a process of broadcasting scheduling information in the AP, and a process of performing an uplink signal transmitting operation based on the scheduling information in the STAs, and this will be described below.

Firstly, an AP 111 transmits a start frame signal at operation 2411. The start frame signal may include an indicator indicating that a plurality of STAs which have traffic which may be transmitted in an uplink may transmit a resource allocation request message for an uplink transmission within a resource allocation request interval. Alternatively, even though the start frame signal does not include the indicator, STAs which may be allocated a resource for an uplink transmission may transmit a resource allocation request message based on a contention-based scheme. The start frame signal may be transmitted thereby all STAs which exist within a network may transmit a resource allocation request message, or thereby a part of STAs which exist within a network may transmit a resource allocation request message. The start frame signal may include a resource allocation request count $N_{req}$, information on a timing point at which the AP 111 may terminate a reception for a resource allocation request message, information on STAs which may transmit a resource allocation request message, e.g., a GID of a STA group, or an ID which may specify STAs such as an AID, a MAC address, a PHY address, and the like of STAs. The start frame signal may include information on a timing point at which the AP 111 may terminate a reception of a resource allocation request message. The information on the timing point at which the AP 111 may terminate the reception of the resource allocation request message may be expressed with an absolute time form which may be specific and objective, or with a relative time form to timing information of the AP 111 and transmission time for a frame. An operation of determining the resource allocation request count $N_{req}$ in the AP 111 has been described above.

The start frame signal may include information indicating time at which the AP 111 may terminate a reception for a resource allocation request message, information related to time at which the AP 111 intends to receive a resource allocation request message, information on a frequency band at which the AP 111 intends to receive the resource allocation request message, an AC specifying a kind of traffic which the AP 111 intends to receive from each STA within a start frame period, a traffic characteristic such as a QoS, delay, and the like, load of a network, a parameter for a CSMA/CA scheme for avoiding a collision in a contention-based scheme, e.g., a parameter such as CWmin, CWmax, Retry Limit, and the like, or a parameter for a MAC scheme of other contention-based scheme, e.g., a Slotted ALOHA protocol, e.g., CPmax, CPmin, and the like as well as information related to the resource allocation request count $N_{req}$. At this time, if the AP 111 requests to receive an AC through a message, each STA may transmit a resource allocation request message for traffic included in the AC. In FIG. 24, it will be noted that the resource allocation request message is illustrated as 'Request'.

Each of STA#1 113, STA#2 115, STA#3 117, and STA#4 119 which receives the start frame signal may occupy a channel using a contention-based scheme and transmit a resource allocation request message base on the CSMA/CA scheme for avoiding the collision included in the start frame signal and a known parameter, a parameter for a general CSMA/CA scheme, a parameter for a CSMA/CA scheme for requesting to allocate a pre-promised resource, a Slotted ALOHA scheme and a known parameter, a parameter for a general Slotted ALOHA scheme, or a parameter for pre-promised Slotted ALOHA scheme. At this time, in a resource allocation request message transmission interval which is occupied through the start frame signal, a general data transmission may not be performed, and a contention and transmission between resource allocation request messages may be allowed.

Each of STA#1 113, STA#2 115, STA#3 117, and STA#4 119 monitors the start frame signal, and determines whether there is a need of an uplink transmission. If there is the need of the uplink transmission, each of STA#1 113, STA#2 115, STA#3 117, and STA#4 119 follows a contention-based MAC scheme, e.g., a CSMA/CA scheme, or a Slotted ALOHA protocol and intends to occupy a channel in order to transmit a resource allocation request message. In FIG. 24, it will be assumed that each of STA#1 113, STA#2 115, STA#3 117, and STA#4 119 determines a need of uplink transmission, and STA#1 113 and STA#2 115 succeeded in transmitting a resource allocation request message based on a contention-based scheme at operations 2413 and 2415.

In FIG. 24, an ACK message is not transmitted for the resource allocation request message which has been successfully received at operations 2413 and 2415, however, it will be understood by those of ordinary skill in the art that the AP 111 may transmit the ACK signal for the resource allocation request message which has been successfully received.

In FIG. 24, for example, the resource allocation request count $N_{req}$ is set to 2. According that STA#1 113 and STA#2 115 successfully transmit the resource allocation request message based on the contention-based scheme, STA#1 113, STA#2 115, STA#3 117, and STA#4 119 detect that the resource allocation request number reaches the resource allocation request count $N_{req}$. As such, STA#1 113, STA#2 115, STA#3 117, and STA#4 119 do not transmit a resource allocation request message any more.

Upon detecting that the number of received resource allocation request messages reaches the resource allocation request count $N_{req}$ according that the two resource allocation request messages are successfully received, the AP 111 does not receive a resource allocation request message even though it does not reach a timing point at which the AP 111 may terminate a reception for a resource allocation request message. At this time, the AP 111 may transmit a frame start signal including information indicating that the AP 111 may not receive a resource allocation request message any more to all STAs.

Alternatively, even though the number of received resource allocation request messages does not reach the resource allocation request count $N_{req}$, the AP 111 and STAs terminate a resource allocation request message reception interval if it reaches a timing point at which the AP 111 may terminate a reception for a resource allocation request message. At this time, the AP 111 may transmit a frame start signal including information indicating that the AP 111 may not receive a resource allocation request message any more to all STAs.

The AP 111 allocates a resource to two STAs from which the AP 111 receives the resource allocation request message, i.e., STA#1 113 and STA#2 115, receives a resource allocation request message from STA#1 113, occupies a channel based on a contention-based scheme, and transmits information on the allocated resource, i.e., scheduling information at operation 2417. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After transmitting the last resource allocation request frame signal without a contention, the AP 111 may transmit scheduling information to perform an uplink multi-transmission operation after a preset time at operation 2417.

After a preset time, e.g., an SIFS, the AP 111 receives an uplink signal from each of STA#1 113 and STA#2 115 at operations 2419 and 2421. In FIG. 24, it will be noted that an uplink signal which is transmitted from an STA is illustrated as 'UL MU-MIMO Data'.

Upon receiving the uplink signal from each of STA#1 113 and STA#2 115, the AP 111 transmits a group ACK signal for the uplink signal received from each of STA#1 113 and STA#2 115 after a preset time, e.g., an SIFS at operation 2425. In FIG. 24, the AP 111 transmits one group ACK signal for the uplink signal received from each of STA#1 113 and STA#2 115, however, it will be understood by those of ordinary skill in the art that the AP 111 transmits an ACK signal for the uplink signal which is received from each of STA#1 113 and STA#5 121. A detailed description of the ACK signal will be omitted herein.

In FIG. 24, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 24, and still another example of a resource operating process performed in a WLAN system supporting a multi-user transmission scheme according to an embodiment of the present disclosure will be described with reference to FIG. 25.

Figure 25:
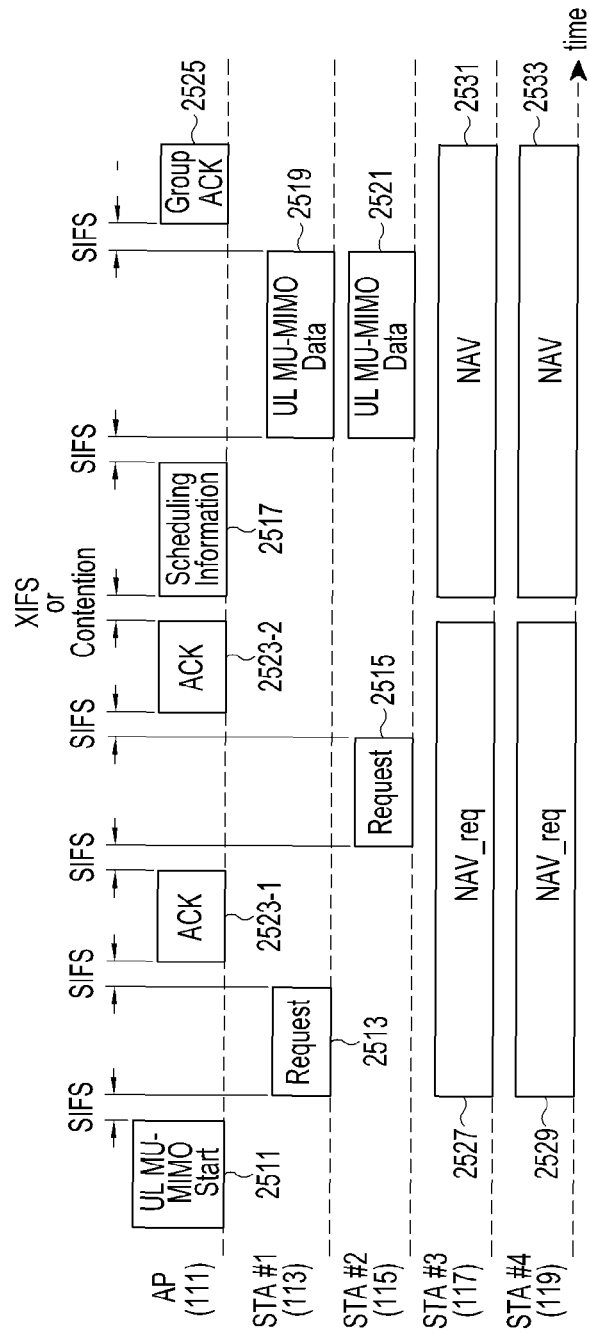
FIG. 25 schematically illustrates yet another example of a resource operating process performed in a WLAN system supporting a multi-user transmission scheme according to an embodiment of the present disclosure.

FIG. 25 schematically illustrates still another example of a resource operating process performed in a WLAN system supporting a multi-user transmission scheme according to an embodiment of the present disclosure.

Referring to FIG. 25, a resource operating process in FIG. 25 is a resource operating process which is based on a contention-free scheme. The resource operating process in FIG. 25 includes: a process of broadcasting a resource allocation request count $N_{req}$ and information on STAs which may transmit a resource allocation request message through a start frame signal in the AP, a process of transmitting resource allocation request messages to the AP in STAs related to the information, a process of transmitting an ACK signal for the resource allocation request messages in the AP, a process of broadcasting scheduling information in the AP, and a process of performing an uplink signal transmitting operation based on the scheduling information in the STAs, and this will be described below.

Firstly, an AP 111 transmits a start frame signal at operation 2511. The start frame signal includes one of various frames such as a beacon frame, a PSMP frame, a CTS-to-self frame, a modified RTS frame, and the like. In FIG. 25, it will be noted that the start frame signal is illustrated as 'UL MU-MIMO start'. A resource allocation request count $N_{req}$ which the AP 111 determines and information on STAs to which the AP 111 may transmit a resource allocation request message are included in the start frame signal.

The start frame signal in operation 2511 may include information on a time interval by which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as information related to the resource allocation request count $N_{req}$. At this time, if the AP 111 requests to receive an AC through the beacon signal, each STA may transmit a resource allocation request message for traffic included in the AC. An operation of determining the resource allocation request count $N_{req}$ in the AP 111 has been described above, and a description thereof will be omitted herein. In FIG. 25, it will be assumed that the resource allocation request count $N_{req}$ is set to 2. As such, the information on the STAs which may transmit the resource allocation request message includes an STA ID of each of STA#1 113 and STA#2 115.

The start frame signal in operation 2511 may be transmitted thereby all STAs which exist within a network transmit a resource allocation request message, or a part of STAs which exist within a network transmits a resource allocation request message. In order that the part of the STAs transmits the resource allocation request message, the start frame signal in operation 2511 may include ID which may designate the part of the STAs, e.g., an AID, a MAC address, a PHY address, and the like. If there is a group in which STAs are included, the start frame signal in operation 2511 may include a GID of the group to designate the part of the STAs.

If each of STA#1 113, STA#2 115, STA#3 117, and STA#4 119 monitors the start frame signal to detect the resource allocation request count $N_{req}$ and information on STAs which may transmit a resource allocation request message. Upon detecting that an uplink signal is to be transmitted, STA#1 113 and STA#2 115 may transmit a resource allocation request message for allocating a resource to the AP 111. In a case that the start frame signal specifies an STA by including an ID of the STA, or specifies a related group by including a GID, and STAs sequentially perform a resource allocation request message transmitting operation as described in FIG. 15, order in which the STAs transmit resource allocation request messages may be based on order of IDs of STAs included in the start frame signal. For example, the order in which the STAs transmit the request allocation request messages may be the order of the STAs included in the start frame signal, inverse order of the STAs included in the start frame signal, order of IDs of STAs included in a group which corresponds to a GID included in the start frame signal, or inverse order of the IDs of the STAs included in the group which corresponds to the GID included in the start frame signal. As a result, the order in which the STAs transmit the resource allocation request message may be any order that may distinguish order of STAs which is generated based on the parameters included in the start frame signal.

In FIG. 25, STA#1 113 and STA#2 115 transmit a resource allocation request message to the AP 111 at operation 2513 and 2515. In FIG. 25, it will be noted that the resource allocation request message is illustrated as 'Request'.

Upon detecting the resource allocation request message from STA#1 113 and STA#2 115, the AP 111 transmits an ACK signal to each of STA#1 113 and STA#2 115 at operations 2523-1 and 2523-2. So, the AP 111 allocates a resource to two STAs from which the AP 111 receives the resource allocation request message, i.e., STA#1 113 and STA#2 115, that is, the AP 111 allocates the resource to STA#1 113 and STA#2 115 after a preset time, e.g., an XIFS or a contention-based interval upon receiving a resource allocation request message from STA#2 115, and transmits information on the allocated resource, i.e., scheduling information at operation 2517. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The XIFS denotes an arbitrary IFS. As such, an XIFS may include one of various IFS s such as an SIFS, a DIFS, a PIFS, an AIFS, and the like.

After a preset time, e.g., an SIFS, the AP 111 receives an uplink signal from each of STA#1 113 and STA#5 121 at operations 2519 and 2521. In FIG. 25, it will be noted that an uplink signal which is transmitted from an STA is illustrated as 'UL MU-MIMO Data'.

Upon receiving the uplink signal from each of STA#1 113 and STA#5 121, the AP 111 transmits a group ACK signal for the uplink signal received from each of STA#1 113 and STA#5 121 at operation 2525. In FIG. 25, the AP 111 transmits the group ACK signal for the uplink signal received from each of STA#1 113 and STA#5 121, however, it will be understood by those of ordinary skill in the art that the AP 111 transmits an ACK signal for the uplink signal which is received from each of STA#1 113 and STA#5 121.

Remaining STAs except for STA#1 113 and STA#2 115, i.e., STA#3 117 and STA#4 119 set an NAV, and waits until receiving a group ACK signal at operations 2527, 2529, 2531, and 2533. The STA#3 117 and STA#4 119 may not transmit an uplink signal, and immediately set the NAV after receiving the start frame signal.

In FIG. 25, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 25, and still another example of a resource operating process performed in a WLAN system supporting a multi-user transmission scheme according to an embodiment of the present disclosure will be described with reference to FIG. 26.

Figure 26:
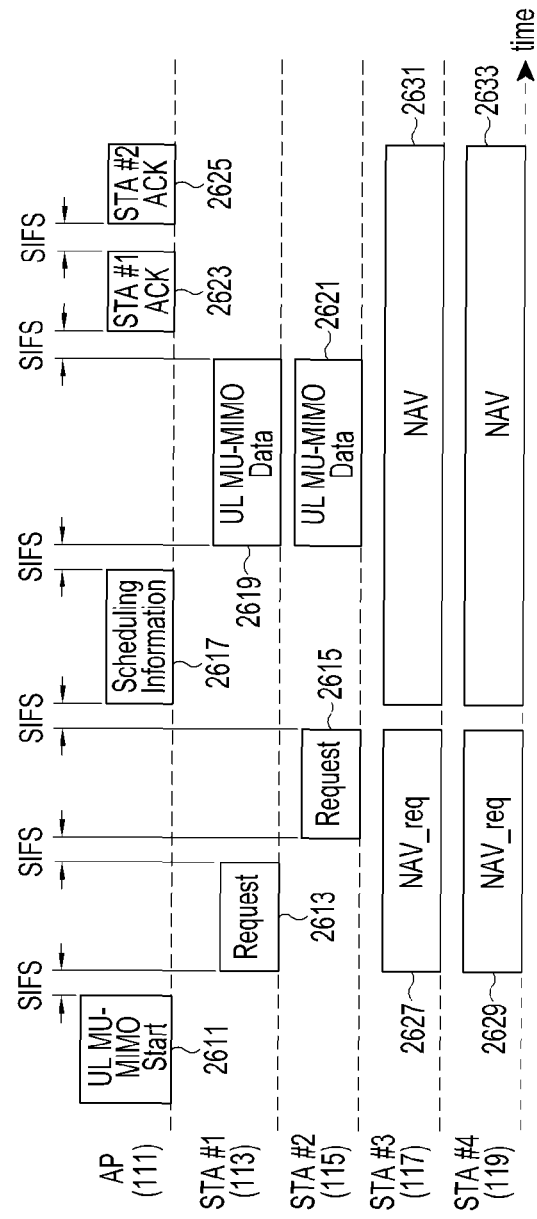
FIG. 26 schematically illustrates still another example of a resource operating process performed in a WLAN system supporting a multi-user transmission scheme according to an embodiment of the present disclosure.

FIG. 26 schematically illustrates still another example of a resource operating process performed in a WLAN system supporting a multi-user transmission scheme according to an embodiment of the present disclosure.

Referring to FIG. 26, a resource operating process in FIG. 26 is a resource operating process which is based on a contention-free scheme. The resource operating process in FIG. 26 includes: a process of performing a group polling operation for one or more STAs for which an AP intends to know whether there is a need of an uplink transmission in the AP, transmitting resource allocation request messages as a response to a polling if there is uplink traffic which the STAs intends to transmit to the AP in the STAs, a process of broadcasting scheduling information in the AP, and a process of performing an uplink signal transmitting operation based on the scheduling information in the STAs, and this will be described below.

Firstly, an AP 111 transmits a start frame signal at operation 2611. The start frame signal may include one of various frames such as a beacon frame, a PSMP frame, a CTS-to-self frame, a modified RTS frame, and the like, or may be one of newly defined frames. In FIG. 26, it will be noted that the start frame signal is illustrated as 'UL MU-MIMO start'. The start frame signal may be transmitted thereby all STAs which exist within a network may transmit a resource allocation request message, or thereby a part of STAs which exist within a network may transmit a resource allocation request message.

The start frame signal may include a resource allocation request count $N_{req}$ which the AP 111 determines, information on a timing point at which the AP 111 may terminate a reception for a resource allocation request message, information on STAs which may transmit a resource allocation request message, e.g., a GID of a STA group, or ID which may specify STAs such as an AID, a MAC address, a PHY address, and the like of STAs. An operation of determining the resource allocation request count $N_{req}$ in the AP 111 has been described above, and a description thereof will be omitted herein. The information on the timing point at which the AP 111 may terminate the reception of the resource allocation request message may be expressed with an absolute time form which may be specific and objective, or with a relative time form to timing information of the AP 111 and transmission time for a frame.

The start frame signal may be transmitted as one frame signal which informs start of a transmission of a resource allocation request message and performs a group polling for one or more than one STAs at the same time as described in FIG. 26, or may be divided into two polling frame signals to be transmitted. Here, the two polling frame signals include a polling frame signal of informing a transmission of a resource allocation request message and a polling frame signal which performs a group polling for one or more than one STAs. Each of the start frame signal and the polling frame signal may include information on a timing point at which an interval for collecting a resource allocation request message may be terminated. The information on the timing point at which the interval for collecting the resource allocation request message may be terminated may be expressed with an absolute time form which may be specific and objective, or with a relative time form to timing information of the AP 111 and transmission time for a frame.

The start frame signal and the polling frame signal may include a maximum number for resource allocation request messages which each STA may transmit, information on time at which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as the information related to the resource allocation request count $N_{req}$ and information on a timing point at which the AP 111 may terminate a reception of the resource allocation request message. At this time, if the AP 111 requests to receive an AC through the polling frame signal, each STA may transmit a resource allocation request message for traffic included in the AC.

In FIG. 26, it will be assumed that the start frame signal is a signal including an STA ID of each of an STA#1 113 and an STA#2 115 for checking whether there is traffic which requires an uplink transmission, and information on a resource such as time and frequency that each STA starts transmitting a resource allocation request message.

After receiving the start frame signal, STA#1 113 determines whether there is traffic which requires an uplink transmission, and a response to this. In FIG. 26, it will be assumed that STA#1 113 has traffic which requires an uplink transmission. So, STA#1 113 transmits a resource allocation request message at transmission start time, for example, STA#1 113 transmits the resource allocation request message after an SIFS after receiving the start frame signal at operation 2613.

If there is no traffic which requires the uplink transmission, STA#1 113 may transmit a frame signal including information indicating that STA#1 113 has no traffic which requires the uplink transmission, e.g., a QoS Null Data frame signal, a NACK frame signal, and the like. Alternatively, STA#1 113 may not transmit any frame signal. In FIG. 26, it will be noted that the resource allocation request message is illustrated as 'Request'.

After receiving the start frame signal, STA#2 115 determines whether there is traffic which requires an uplink transmission, and a response to this. In FIG. 26, it will be assumed that STA#2 115 has traffic which requires an uplink transmission. So, STA#2 115 transmits a resource allocation request message at transmission start time, for example, STA#2 115 transmits the resource allocation request message after a sum of time during which one resource allocation request message is transmitted and 2*SIFS after receiving the start frame signal at operation 2615. If there is no traffic which requires the uplink transmission, STA#2 115 may transmit a frame signal including information indicating that STA#2 115 has no traffic which requires the uplink transmission, e.g., a QoS Null Data frame signal, a NACK frame signal, and the like. Alternatively, STA#2 115 may not transmit any frame signal.

Meanwhile, the start frame signal does not include resource information such as timer or a frequency that each STA which receives a polling frame signal may transmit a resource allocation request signal, and may include order information related to how each STA may transmit a resource allocation request message in any order or an indicator indicating that each STA may transmit a resource allocation request message in order. After receiving a group polling frame signal including order in which each STA transmits a resource allocation request message, i.e., the start frame signal, STAs may transmit a resource allocation request message to the AP 111 based on the order if there is traffic which requires an uplink transmission, or may transmit a frame signal including information indicating that there is no traffic which requires an uplink transmission, e.g., a QoS Null Data frame signal, a NACK frame signal, and the like if the there is no traffic which requires the uplink transmission. Alternatively, the STAs may not transmit any frame signal.

At this time, each STA may monitor a channel to determine to start a transmission operation as described in FIG. 9, may start a transmission operation at an arbitrary timing point, or may start a transmission operation at a timing point which is determined based on an arbitrary equation, e.g. an equation which is based on a length of a resource allocation request message and an IFS such as Equation (1). At this time, it will be assumed that the length of the resource allocation request message is equal to a length of a frame in which a transmission is performed such as a QoS Null Data, and the like, and a resource allocation request message or a QoS Null Data frame signal is transmitted in the frame.

a transmission start timing point=a timing point at which a reception for a polling message is terminated+transmission order×(SIFS+a length of a resource allocation request message)+SIFS  Equation (1)

In a case that STAs sequentially perform a resource allocation request message transmitting operation as described in FIG. 26, order in which the STAs transmit resource allocation request messages may be determined based on order of STA IDs included in the start frame signal. For example, the order in which the STAs transmit the request allocation request messages may be order of the STA IDs included in the start frame signal, inverse order of the STA IDs included in the start frame signal, order of STA IDs included in a group which corresponds to a GID included in the start frame signal, or inverse order of the STA IDs included in the group which corresponds to the GID included in the start frame signal. As a result, the order in which the STAs transmit the resource allocation request message may be any order that may distinguish order of STAs which is generated based on the parameters included in the start frame signal. In FIG. 26, STA#1 113 and STA#2 115 have traffic which requires an uplink transmission. So, STA#1 113 and STA#2 115 transmit a resource allocation request message to the AP 111 at operations 2613 and 2615. In FIG. 26, it will be noted that the resource allocation request message is illustrated as 'Request'.

In FIG. 26, for example, the resource allocation request count $N_{req}$ is set to 2. So, the AP 111 receives two resource allocation request messages as a response to a group polling based on a transmission of a start frame signal which is performed for STA#1 113 and STA#2 115 at operations 2613 and 2615 to detect that it reaches the resource allocation request count $N_{req}$. So, even though it does not reach a timing point at which a reception for a resource allocation request message may be terminated, the AP 111 terminates a resource allocation request message reception interval. At this time, even though the number of received resource allocation request messages does not reach the resource allocation request count $N_{req}$, the AP 111 terminates a resource allocation request message reception interval if it reaches a timing point at which the AP 111 may terminate a reception for a resource allocation request message. At this time, the AP 111 may transmit a frame signal including information indicating that the AP 111 may not receive a resource allocation request message any more to all STAs.

After the resource allocation request message reception interval, the AP 111 allocates a resource to STAs which transmit the resource allocation request message, i.e., STA#1 113 and STA#2 115, receives a resource allocation request message from STA#2 115, and transmits information on the allocated resource, i.e., scheduling information after a preset time, e.g., an XIFS or undetermined contention-based interval at operation 2617. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The XIFS denotes an arbitrary IFS. As such, an XIFS may include one of various IFS s such as an SIFS, a DIFS, a PIFS, an AIFS, and the like.

After a preset time, e.g., an SIFS, the AP 111 receives an uplink signal from each of STA#1 113 and STA#2 115 at operations 2619 and 2621. In FIG. 26, it will be noted that an uplink signal which is transmitted from an STA is illustrated as 'UL MU-MIMO Data', and the uplink signal may be a UL OFDMA signal.

Upon receiving the uplink signal from each of STA#1 113 and STA#2 115, the AP 111 transmits an ACK signal for the uplink signal received from each of STA#1 113 and STA#2 115 at operations 2623 and 2625. In FIG. 26, the AP 111 transmits an ACK signal for the uplink signal received from each of STA#1 113 and STA#2 115 one to one, however, it will be understood by those of ordinary skill in the art that the AP 111 transmits a group ACK signal for the uplink signal which is received from each of STA#1 113 and STA#2 115. A detailed description of the group ACK signal will be omitted herein.

Remaining STAs except for STA#1 113 and STA#2 115, i.e., STA#3 117 and STA#4 119 set an NAV, and waits until receiving an ACK signal or a group ACK signal at operations 2627, 2629, 2631, and 2633. The STA#3 117 and STA#4 119 may not transmit an uplink signal, and immediately set the NAV after receiving the start frame signal.

In FIG. 26, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 26, and still another example of a resource operating process performed in a WLAN system supporting a multi-user transmission scheme according to an embodiment of the present disclosure will be described with reference to FIG. 27.

Figure 27:
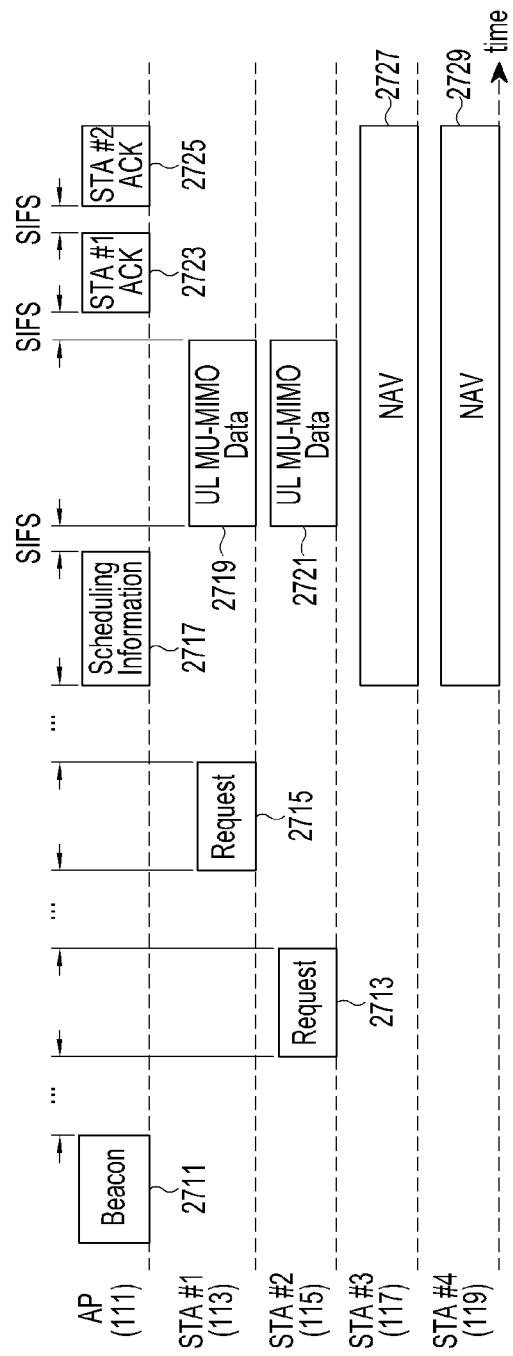
FIG. 27 schematically illustrates yet another example of a resource operating process performed in a WLAN system supporting a multi-user transmission scheme according to an embodiment of the present disclosure.

FIG. 27 schematically illustrates still another example of a resource operating process performed in a WLAN system supporting a multi-user transmission scheme according to an embodiment of the present disclosure.

Referring to FIG. 27, a resource operating process in FIG. 27 is a resource operating process which is based on a contention-based scheme. The resource operating process in FIG. 27 includes: a process of broadcasting a resource allocation request count $N_{req}$ through a beacon signal and information indicating a timing point at which the AP may terminate a reception for a resource allocation request message in an AP, a process of transmitting resource allocation request messages to the AP based on a contention-based scheme in STAs, a process of broadcasting scheduling information based on a contention-based scheme in the AP, and a process of performing an uplink signal transmitting operation based on the scheduling information in the STAs, and this will be described below.

Firstly, an AP 111 transmits a beacon signal at operation 2711. A resource allocation request count $N_{req}$ which the AP 111 determines and information indicating a timing point at which the AP 111 may terminate a reception for a resource allocation request message are included in the beacon signal, an operation of determining the resource allocation request count $N_{req}$ in the AP 111 has been described above, and a description thereof will be omitted herein.

The beacon signal in operation 2711 may include information related to a time interval during which the AP 111 intends to receive a resource allocation request message, information on a frequency band at which the AP 111 intends to receive the resource allocation request message, an AC specifying a kind of traffic which the AP 111 intends to receive from each STA within a beacon period, a traffic characteristic such as a QoS, delay, and the like, load of a network, a parameter for a CSMA/CA scheme for avoiding a collision in a contention-based scheme, e.g., a parameter such as CWmin, CWmax, Retry Limit, and the like as well as information related to the resource allocation request count $N_{req}$.

Each of STA#1 113, STA#2 115, STA#3 117, and STA#4 119 which receives the beacon signal in operation 2711 occupies a channel based on a contention-based scheme and transmit a resource allocation request message base on a parameter for a CSMA/CA scheme, a parameter for a general CSMA/CA scheme, a parameter for a CSMA/CA scheme for requesting to allocate a pre-promised resource included in the beacon signal in operation 2711. At this time, if the AP 111 requests to receive an AC through the beacon signal, each STA may transmit a resource allocation request message for traffic included in the AC. The beacon signal in operation 2711 may be transmitted thereby all STAs which exist within a network transmit a resource allocation request message, or a part of STAs which exists within a network transmit a resource allocation request message. In order that the part of the STAs transmits the resource allocation request message, the beacon signal in operation 2711 may include ID which may designate the part of the STAs, e.g., an AID, a MAC address, a PHY address, and the like. If there is a group in which STAs are included, the beacon signal in operation 2711 may include a GID of the group to designate the part of the STAs.

Meanwhile, each of an STA#1 113, an STA#2 115, an STA#3 117, and an STA#4 119 monitors the beacon signal to detect the resource allocation request count $N_{req}$ and the information indicating the timing point at which the AP 111 may terminate the reception for the resource allocation request message, and monitors signals which other STAs transmit.

It will be assumed that STA#1 113, STA#2 115, STA#3 117, and STA#4 119 detect a signal is to be transmitted while performing the monitoring operation, and STA#1 113 and STA#2 115 transmit a resource allocation request message at operations 2713 and 2715. The STA#1 113 and STA#2 115 transmit the resource allocation request message based on the resource allocation request count $N_{req}$ and the information indicating the timing point at which the AP 111 may terminate the reception for the resource allocation request message. That is, even though the AP 111 may receive a resource allocation request message from STAs based on the resource allocation request count $N_{req}$, the AP 111 does not receive the resource allocation request message from the STAs any more if it reaches a timing point which corresponds to the information indicating the timing point at which the AP 111 may terminate the reception for the resource allocation request message. So, STA#1 113 and STA#2 115 transmits the resource allocation request message based on the resource allocation request count $N_{req}$ and the information indicating the timing point at which the AP 111 may terminate the reception for the resource allocation request message. Here, the information indicating the timing point at which the AP 111 may terminate the reception for the resource allocation request message is described in FIG. 27, however, it will be understood by those of ordinary skill in the art that the information indicating the timing point at which the AP 111 may terminate the reception for the resource allocation request message may be applied to at least one of examples of a resource operating process according to an embodiment of the present disclosure. In FIG. 27, it will be noted that the resource allocation request message is illustrated as 'Request'.

Meanwhile, it will be assumed that the AP 111 uses a plurality of antennas, e.g., two antennas, and the resource allocation request count $N_{req}$ is set to a preset value, e.g., 2. So, STA#1 113 and STA#2 115 transmit the resource allocation request message, and remaining STAs, i.e., STA#3 117 and STA#4 119 set an NAV and wait until normally receiving an ACK signal since STA#3 117 and STA#4 119 may detect that resource allocation request messages of which the number is greater than or equal to the resource allocation request count $N_{req}$ have been transmitted to the AP 111 at operations 2727 and 2729.

So, the AP 111 allocates a resource to two STAs from which the AP 111 receives the request allocation request message, i.e., STA#2 115 and STA#1 113, that is, the AP 111 performs an additional procedure after receiving the request allocation request message from STA#1 113, allocates the resource to STA#2 115 and STA#1 113, and transmits information on the allocated resource, i.e., scheduling information at operation 2717. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 receives an uplink signal from each of STA#1 113 and STA#2 115 at operations 2719 and 2721. In FIG. 27, it will be noted that an uplink signal transmitted from an STA is illustrated as 'UL MU-MIMO Data'.

Upon receiving the uplink signal from each of STA#1 113 and STA#2 115, the AP 111 transmits an ACK signal to the uplink signal received from each of STA#1 113 and STA#2 115 after a preset time, e.g., an SIFS at operations 2723 and 2725.

In FIG. 27, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 27, and still another example of a resource operating process performed in a WLAN system supporting a multi-user transmission scheme according to an embodiment of the present disclosure will be described with reference to FIG. 28.

Figure 28:
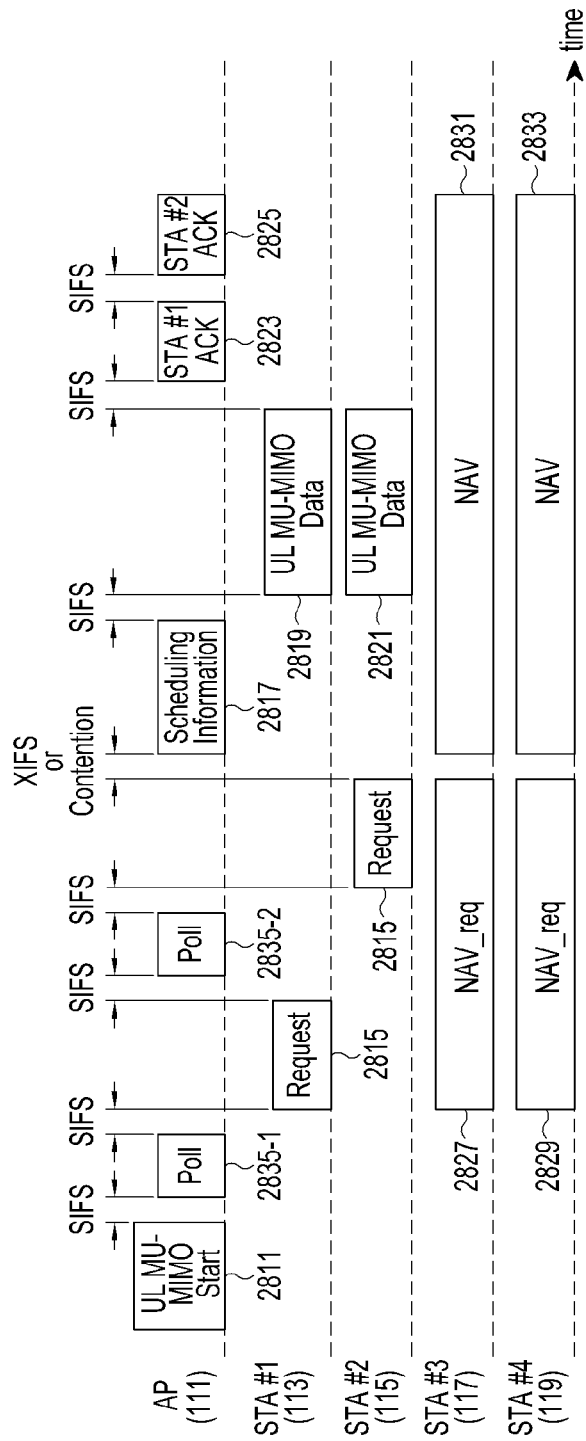
FIG. 28 schematically illustrates still another example of a resource operating process performed in a WLAN system supporting a multi-user transmission scheme according to an embodiment of the present disclosure.

FIG. 28 schematically illustrates still another example of a resource operating process performed in a WLAN system supporting a multi-user transmission scheme according to an embodiment of the present disclosure.

Referring to FIG. 28, a resource operating process in FIG. 28 is a resource operating process which is based on a contention-free scheme. The resource operating process in FIG. 28 includes: a process of performing a polling operation for each of STAs for which an AP intends to know whether there is a need of an uplink transmission in an AP, a process of transmitting resource allocation request messages as a response to the polling operation if there is uplink traffic to be transmitted to the AP in the STAs, a process of broadcasting scheduling information in the AP, and a process of performing an uplink signal transmitting operation based on the scheduling information in the STAs, and this will be described below.

Firstly, an AP 111 transmits a start frame signal at operation 2811. The start frame signal may include one of various frames such as a beacon frame, a PSMP frame, a CTS-to-self frame, a modified RTS frame, and the like, or may be one of newly defined frames. In FIG. 28, it will be noted that the start frame signal is illustrated as 'UL MU-MIMO start'. The start frame signal may include a resource allocation request count $N_{req}$, information indicating a timing point at which the AP 111 may terminate a reception for a resource allocation request message, information related to STAs which may transmit a resource allocation request message, e.g., a GID of a STA group, or an ID which may specify STAs such as an AID, a MAC address, a PHY address, and the like of STAs. The start frame signal may include information on a timing point at which the AP 111 may terminate a reception of a resource allocation request message. The information on the timing point at which the AP 111 may terminate the reception of the resource allocation request message may be expressed with an absolute time form which may be specific and objective, or with a relative time form to timing information of the AP 111 and transmission time for a frame.

The AP 111 transmits a polling frame signal to an STA#1 113 as the first STA among the STAs for which the AP 111 intends to know whether there is the need of the uplink transmission to perform a polling operation for a resource allocation request message at operation 2835-1.

Meanwhile, the start frame signal and the polling frame signal may be transmitted in different frames which are apart in time, or may be integrated as one frame thereby the one frame is transmitted one time. Alternatively, one of the start frame signal and the polling frame signal may be transmitted if the one of the start frame signal and the polling frame signal is capable of performing a function of the other. Each of the start frame signal and the polling frame signal may include information on a timing point at which an interval for collecting a resource allocation request message may be terminated. The information on the timing point at which the interval for collecting the resource allocation request message may be terminated may be expressed with an absolute time form which may be specific and objective, or with a relative time form to timing information of the AP 111 and transmission time for a frame.

The start frame signal and the polling frame signal may include a maximum number for resource allocation request messages which each STA may transmit, information on time at which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as the information related to the resource allocation request count $N_{req}$ and information on a timing point at which the AP 111 may terminate a reception of the resource allocation request message. At this time, if the AP 111 requests to receive an AC through the polling frame signal, each STA may transmit a resource allocation request message for traffic included in the AC.

After receiving the first polling frame signal, STA#1 113 determines whether there is traffic which requires an uplink transmission, and a response to this. In FIG. 28, it will be assumed that STA#1 113 has traffic which requires an uplink transmission. So, STA#1 113 transmits a resource allocation request message to the AP 111 at operation 2815. If there is no traffic which requires the uplink transmission, STA#1 113 may transmit a frame signal including information indicating that STA#1 113 has no traffic which requires the uplink transmission, e.g., a QoS Null Data frame signal, a NACK frame signal, and the like. Alternatively, STA#1 113 may not transmit any frame signal. In FIG. 28, it will be noted that the resource allocation request message is illustrated as 'Request'.

After receiving the response from the first STA, the AP 111 sequentially performs a polling operation for other STAs in order to check whether there is traffic which requires an uplink transmission. In FIG. 28, after an SIFS, the AP 111 immediately transmits a polling frame signal to STA#2 115 at operation 2835-2, and receives a resource allocation request message as a response to the polling frame signal from STA#2 115. In FIG. 28, after an SIFS, the AP 111 immediately performs a polling operation for the next STA, however, it will be understood by those of ordinary skill in the art that a time interval between a related polling operation and the next polling operation may be different, or there may be a contention-based interval in which other STAs may perform a transmitting operation.

Meanwhile, the more the number of STAs for which the AP 111 intends to know whether there is a need of an uplink transmission is, the longer a time interval for receiving a resource allocation request message through the polling operation is. Increase of the time interval for receiving the resource allocation request message may result in load for the WLAN system, and performance decrease.

In order to prevent this performance decrease, the AP 111 may restrict the time interval for the receiving the resource allocation request message by restricting the resource allocation request count $N_{req}$ or the timing point at which the AP 111 may terminate the reception for the resource allocation request message.

In FIG. 28, for example, the resource allocation request count $N_{req}$ is set to 2. So, the AP 111 receives two resource allocation request messages as a response to a polling operation which is performed for each of STA#1 113 and STA#2 115 at operation 2815 to detect that it reaches the resource allocation request count $N_{req}$. So, even though it does not reach a timing point at which a reception for a resource allocation request message may be terminated, the AP 111 terminates a resource allocation request message reception interval. At this time, even though the number of received resource allocation request messages does not reach the resource allocation request count $N_{req}$, the AP 111 terminates a resource allocation request message reception interval if it reaches a timing point at which the AP 111 may terminate a reception for a resource allocation request message. At this time, the AP 111 may transmit a frame signal including information indicating that the AP 111 may not receive a resource allocation request message any more to all STAs.

After the resource allocation request message reception interval, the AP 111 allocates a resource to STAs which transmit the resource allocation request message, i.e., STA#1 113 and STA#2 115, receives a resource allocation request message from STA#2 115, and transmits information on the allocated resource, i.e., scheduling information after a preset time, e.g., an XIFS or undetermined contention-based interval at operation 2817. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The XIFS denotes an arbitrary IFS. As such, an XIFS may include one of various IFS s such as an SIFS, a DIFS, a PIFS, an AIFS, and the like.

After a preset time, e.g., an SIFS, the AP 111 receives an uplink signal from each of STA#1 113 and STA#2 115 at operations 2819 and 2821. In FIG. 28, it will be noted that an uplink signal transmitted from an STA is illustrated as 'UL MU-MIMO Data', and an uplink signal may be a UL OFDMA signal.

Upon receiving the uplink signal from each of STA#1 113 and STA#2 115, the AP 111 transmits an ACK signal for the uplink signal received from each of STA#1 113 and STA#2 115 at operations 2823 and 2825. In FIG. 28, the AP 111 transmits an ACK signal for the uplink signal received from each of STA#1 113 and STA#2 115 one to one, however, it will be understood by those of ordinary skill in the art that the AP 111 transmits a group ACK signal for the uplink signal which is received from each of STA#1 113 and STA#2 115. A detailed description of the group ACK signal will be omitted herein.

Remaining STAs except for STA#1 113 and STA#2 115, i.e., STA#3 117 and STA#4 119 set an NAV, and waits until receiving an ACK signal or a group ACK signal at operations 2827, 2829, 2831, and 2833. The STA#3 117 and STA#4 119 may not transmit an uplink signal, and immediately set the NAV after receiving the start frame signal.

In FIG. 28, a plurality of SIFSs are used. Here, each of the plurality of SIFSs may be changed to one of various IFS s such as a DIFS, a PIFS, an AIFS, and the like.

Still another example of a resource operating process performed in a WLAN system supporting a multi-user transmission scheme according to an embodiment of the present disclosure has been described with reference to FIG. 28, and still another example of a resource operating process performed in a WLAN system supporting a multi-user transmission scheme according to an embodiment of the present disclosure will be described with reference to FIG. 29.

Figure 29:
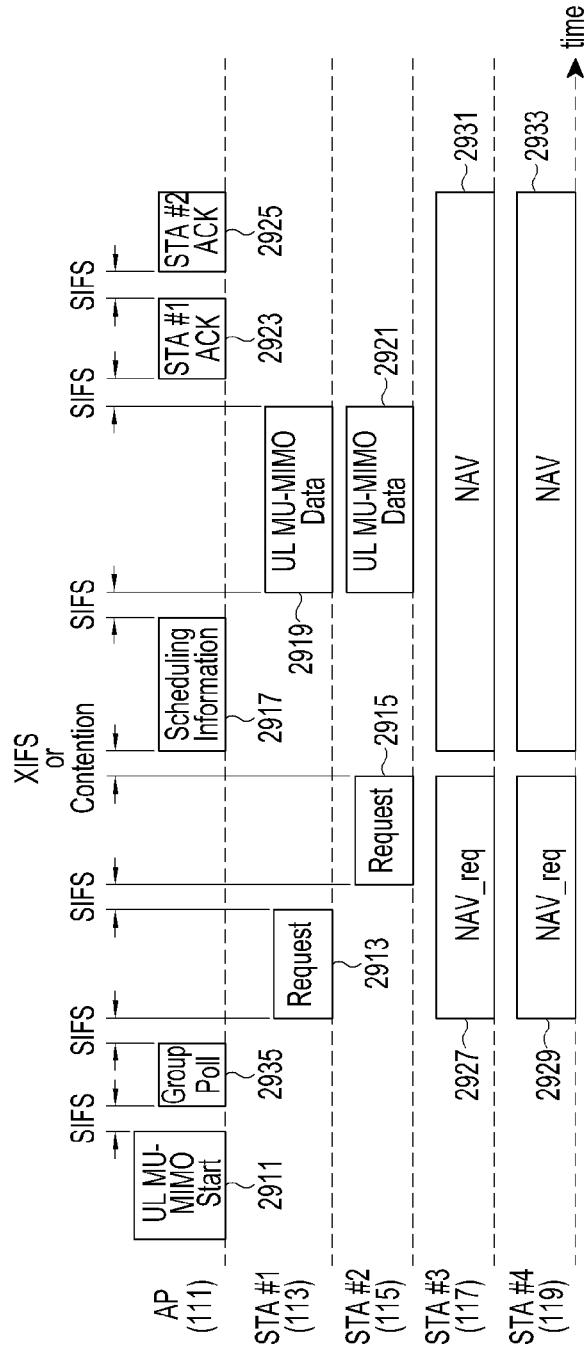
FIG. 29 schematically illustrates yet another example of a resource operating process performed in a WLAN system supporting a multi-user transmission scheme according to an embodiment of the present disclosure.

FIG. 29 schematically illustrates still another example of a resource operating process performed in a WLAN system supporting a multi-user transmission scheme according to an embodiment of the present disclosure.

Referring to FIG. 29, it will be understood that a resource operating process in FIG. 29 is the same as a resource operating process in FIG. 28 except for a process of performing a polling operation (that is, operations 2811 to 2833 in FIG. 28 are the same as operations 2911 to 2933 in FIG. 29). That is, in the resource operating process in FIG. 28, an AP 111 performs a polling operation for STAs which may transmit a resource allocation request message (at operations 2835-1 and 2835-2), however, in the resource operating process in FIG. 29, an AP 111 performs a group polling operation for STAs which may transmit a resource allocation request message (at operation 2935).

Still another example of a resource operating process performed in a WLAN system supporting a multi-user transmission scheme according to an embodiment of the present disclosure has been described with reference to FIG. 29, and still another example of a resource operating process performed in a WLAN system supporting a multi-user transmission scheme according to an embodiment of the present disclosure will be described with reference to FIG. 30.

Figure 30:
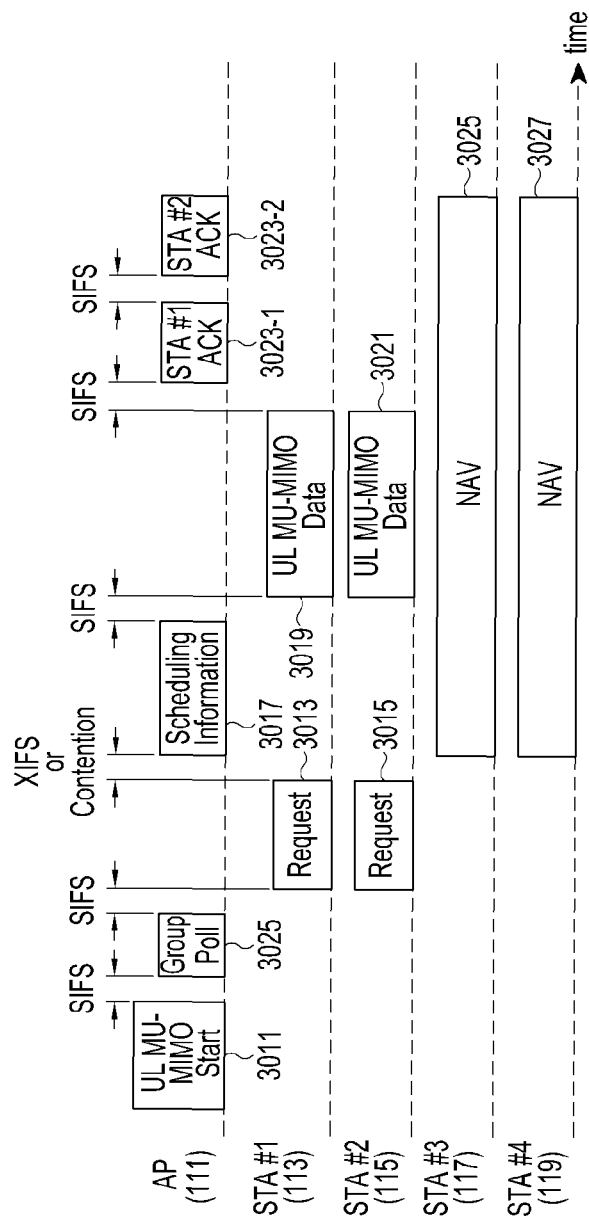
FIG. 30 schematically illustrates still another example of a resource operating process performed in a WLAN system supporting a multi-user transmission scheme according to an embodiment of the present disclosure.

FIG. 30 schematically illustrates still another example of a resource operating process performed in a WLAN system supporting a multi-user transmission scheme according to an embodiment of the present disclosure.

Referring to FIG. 30, a resource operating process in FIG. 30 is a resource operating process which is based on a contention-free scheme. The resource operating process in FIG. 30 includes: a process of performing a group polling operation for one or more STAs for which an AP intends to know whether there is a need of an uplink transmission in the AP, transmitting resource allocation request messages as a response to a polling if there is uplink traffic which the STAs intends to transmit to the AP with an overlapped time or frequency resource at the same time in the STAs, a process of broadcasting scheduling information in the AP, and a process of performing an uplink signal transmitting operation based on the scheduling information in the STAs, and this will be described below.

Firstly, an AP 111 transmits a start frame signal at operation 3011. The start frame signal may include one of various frames such as a beacon frame, a PSMP frame, a CTS-to-self frame, a modified RTS frame, and the like, or may be one of newly defined frames. In FIG. 30, it will be noted that the start frame signal is illustrated as 'UL MU-MIMO start'. The AP 111 performs a group polling operation for one or more than one STAs for which the AP 111 intends to know whether there is a need of an uplink transmission at operation 3025. The start frame signal and a group polling signal for the group polling operation may be transmitted thereby all STAs which exist within a network may transmit a resource allocation request message, or thereby a part of STAs which exist within a network may transmit a resource allocation request message.

The start frame signal and the group polling signal may include a resource allocation request count $N_{req}$ which the AP 111 determines, information on a timing point at which the AP 111 may terminate a reception for a resource allocation request message, information on STAs which may transmit a resource allocation request message, e.g., a GID of a STA group, or ID which may specify STAs such as an AID, a MAC address, a PHY address, and the like of STAs. An operation of determining the resource allocation request count $N_{req}$ in the AP 111 has been described above, and a description thereof will be omitted herein.

Meanwhile, the start frame signal and the group polling frame signal may be transmitted in different frames which are apart in time, or may be integrated as one frame thereby the one frame is transmitted one time. Alternatively, one of the start frame signal and the group polling frame signal may be transmitted if the one of the start frame signal and the group polling frame signal is capable of performing a function of the other. Each of the start frame signal and the group polling frame signal may include information on a timing point at which an interval for collecting a resource allocation request message may be terminated. The information on the timing point at which the interval for collecting the resource allocation request message may be terminated may be expressed with an absolute time form which may be specific and objective, or with a relative time form to timing information of the AP 111 and transmission time for a frame.

The start frame signal and the polling frame signal may include a maximum number for resource allocation request messages which each STA may transmit, information on time at which the AP 111 intends to receive a resource allocation request message, information on a frequency band at which the AP 111 intends to receive the resource allocation request message, an AC specifying a kind of traffic which the AP 111 intends to receive from each STA, a traffic characteristic such as a QoS, delay, and the like, information on load of a network as well as the information related to the resource allocation request count $N_{req}$ and information on a timing point at which the AP 111 may terminate a reception of the resource allocation request message. At this time, if the AP 111 requests to receive an AC through the start frame signal and the polling frame signal, each STA may transmit a resource allocation request message for traffic included in the AC.

In FIG. 30, it will be assumed that the start frame signal and the group polling frame is a signal including an STA ID of each of an STA#1 113 and an STA#2 115 for checking whether there is traffic which requires an uplink transmission, and information on a resource such as time and frequency that each STA starts transmitting a resource allocation request message.

After receiving the start frame signal and the group polling signal, STA#1 113 and STA#2 115 determines whether there is traffic which requires an uplink transmission, and a response to this. In FIG. 30, it will be assumed that STA#1 113 and STA#2 115 have traffic which requires an uplink transmission. So, STA#1 113 and STA#2 115 transmit a resource allocation request message through a frequency resource which is allocated at an allocated transmission start timing point, for example, STA#1 113 and STA#2 115 transmit the resource allocation request message after an SIFS after receiving the start frame signal at operations 3013 and 3015.

If there is no traffic which requires the uplink transmission, STA#1 113 and STA#2 115 may transmit a frame signal including information indicating that STA#1 113 and STA#2 115 have no traffic which requires the uplink transmission, e.g., a QoS Null Data frame signal, a NACK frame signal, and the like. Alternatively, STA#1 113 may not transmit any frame signal. In FIG. 30, it will be noted that the resource allocation request message is illustrated as 'Request'.

In FIG. 30, resource allocation request messages of STA#1 113 and STA#2 115 are transmitted with an overlap form. Thus, a resource allocation request message transmission interval is terminated. However, if the AP 111 allocates different frequency and time resources to a plurality of STAs through the start frame signal and the group polling signal to perform a scheduling operation on resource allocation request messages, the resource allocation request messages which are transmitted with the overlap form may be transmitted based on an OFDMA scheme and a MU-MIMO scheme using different frequency and time resources.

If a plurality of STAs transmit a plurality of resource allocation request messages, the resource allocation request message which are transmitted with the overlap form as described above may be sequentially transmitted by a time interval, e.g., an SIFS or a PIFS.

In FIG. 30, for example, the resource allocation request count $N_{req}$ is set to 2. So, the AP 111 receives two resource allocation request messages as a response to a group polling operation which is performed for each of STA#1 113 and STA#2 115 at operations 3013 and 3015 to detect that it reaches the resource allocation request count $N_{req}$. So, even though it does not reach a timing point at which a reception for a resource allocation request message may be terminated, the AP 111 terminates a resource allocation request message reception interval. At this time, even though the number of received resource allocation request messages does not reach the resource allocation request count $N_{req}$, the AP 111 terminates a resource allocation request message reception interval if it reaches a timing point at which the AP 111 may terminate a reception for a resource allocation request message. At this time, the AP 111 may transmit a frame signal including information indicating that the AP 111 may not receive a resource allocation request message any more to all STAs.

After the resource allocation request message reception interval, the AP 111 allocates a resource to STAs which transmit the resource allocation request message, i.e., STA#1 113 and STA#2 115, receives a resource allocation request message from STA#2 115, and transmits information on the allocated resource, i.e., scheduling information after a preset time, e.g., an XIFS or undetermined contention-based interval at operation 3017. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The XIFS denotes an arbitrary IFS. As such, an XIFS may include one of various IFS s such as an SIFS, a DIFS, a PIFS, an AIFS, and the like.

After a preset time, e.g., an SIFS, the AP 111 receives an uplink signal from each of STA#1 113 and STA#2 115 at operations 3019 and 3021. In FIG. 30, it will be noted that an uplink signal transmitted from an STA is illustrated as 'UL MU-MIMO Data', and an uplink signal may be a UL OFDMA signal.

Upon receiving the uplink signal from each of STA#1 113 and STA#2 115, the AP 111 transmits an ACK signal to the uplink signal received from each of STA#1 113 and STA#2 115 at operations 3023-1 and 3023-2. In FIG. 30, the AP 111 transmits an ACK signal for the uplink signal received from each of STA#1 113 and STA#2 115 one to one, however, it will be understood by those of ordinary skill in the art that the AP 111 transmits a group ACK signal to the uplink signal which is received from each of STA#1 113 and STA#2 115. A detailed description of the group ACK signal will be omitted herein.

Remaining STAs except for STA#1 113 and STA#2 115, i.e., STA#3 117 and STA#4 119 set an NAV, and waits until receiving an ACK signal or a group ACK signal at operations 3025 and 3027. The STA#3 117 and STA#4 119 may not transmit an uplink signal, and immediately set the NAV after receiving the start frame signal.

In FIG. 30, a plurality of SIFSs are used. Here, each of the plurality of SIFSs may be changed to one of various IFS s such as a DIFS, a PIFS, an AIFS, and the like.

In FIG. 30, the STAs transmit resource allocation request messages to the AP 111 with an overlap form. If the STAs and the AP 111 are capable of using a plurality of sub-channels at the same time, for example, if the STAs and the AP 111 operate based on an OFDMA scheme, sub-channels through which the STAs transmit resource allocation request messages and transmit/receive information may be different.

Still another example of a resource operating process performed in a WLAN system supporting a multi-user transmission scheme according to an embodiment of the present disclosure has been described with reference to FIG. 30, and still another example of a resource operating process performed in a WLAN system supporting a multi-user transmission scheme according to an embodiment of the present disclosure will be described with reference to FIG. 31.

Figure 31:
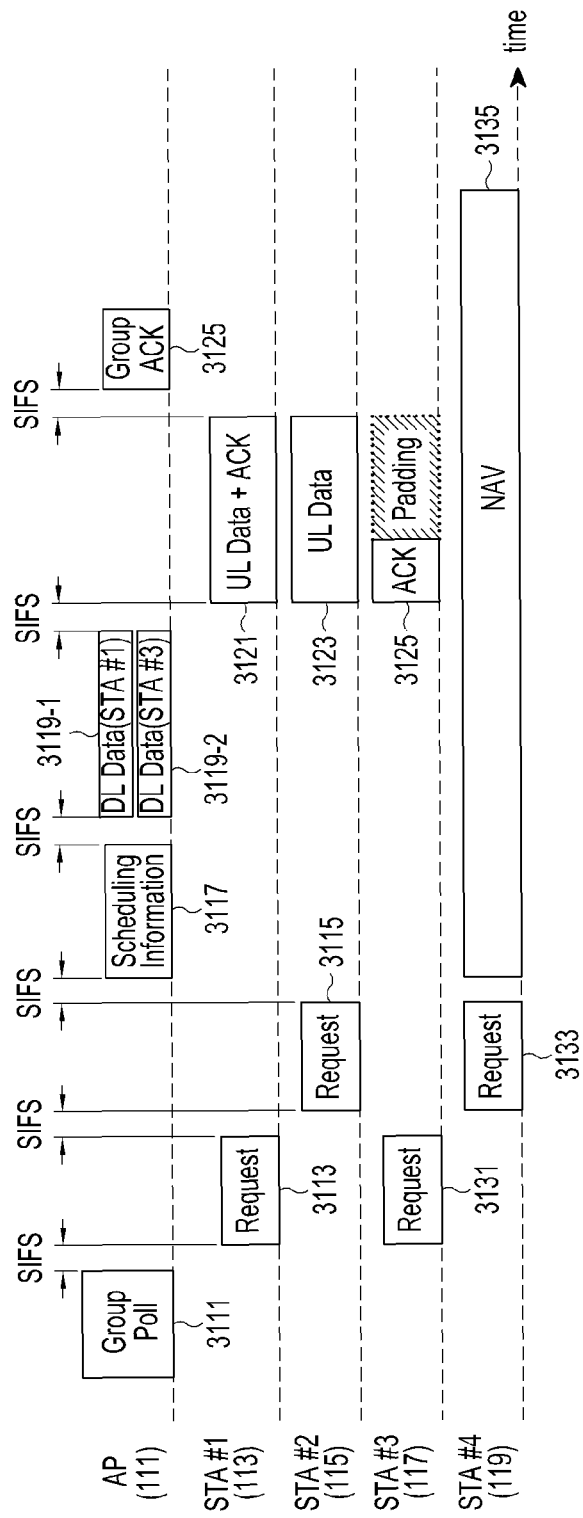
FIG. 31 schematically illustrates yet another example of a resource operating process performed in a WLAN system supporting a multi-user transmission scheme according to an embodiment of the present disclosure.

FIG. 31 schematically illustrates still another example of a resource operating process performed in a WLAN system supporting a multi-user transmission scheme according to an embodiment of the present disclosure.

Referring to FIG. 31, a resource operating process in FIG. 31 is a resource operating process which is based on a contention-free scheme. The resource operating process in FIG. 31 includes: a process of performing a polling operation for related STAs based on a resource allocation request count $N_{req}$ in an AP, a process of sequentially transmitting resource allocation request messages to the AP in the STAs, a process of immediately broadcasting scheduling information in the AP, and a process of performing an uplink signal transmitting operation based on the scheduling information in the STAs, and this will be described below.

First, an AP 111 performs a polling operation for related STAs based on a resource allocation request count $N_{req}$. In FIG. 31, the resource allocation request count $N_{req}$ is set to 2. As such, the AP 111 may poll or perform a group polling operation for STA#1 113, STA#2 115, STA#3 117, and STA#4 119 at operation 3111. In FIG. 30, an operation of transmitting a start frame signal is performed separately from a polling operation. However, in FIG. 31, a poll frame for the polling operation may be included in a start frame as one of various frames such as a beacon frame, a PSMP frame, a CTS-to-self frame, a modified RTS frame, and the like.

The group poll frame in operation 3111 may be transmitted thereby all STAs which exist within a network transmit a resource allocation request message, or a part of STAs which exist within a network transmits a resource allocation request message. In order that the part of the STAs transmits the resource allocation request message, the group poll frame in operation 3111 may include an ID which may designate the part of the STAs, e.g., an AID, a MAC address, a PHY address, and the like. If there is a group in which STAs are included, the group poll frame in operation 3111 may include a GID of the group to designate the part of the STAs.

If each of STA#1 113, STA#2 115, STA#3 117, and STA#4 119 performs a monitoring operation, and may transmit an uplink signal as a response to the polling operation of the AP 111, each of STA#1 113, STA#2 115, STA#3 117, and STA#4 119 may transmit a resource allocation request message for requesting resource allocation to the AP 111. In a case that the start frame signal specifies an STA by including an ID of the STA, or specifies a related group by including a GID, and STAs sequentially perform a resource allocation request message transmitting operation as described in FIG. 31, order in which the STAs transmit resource allocation request messages may be based on order of IDs of STAs included in the start frame signal. For example, the order in which the STAs transmit the request allocation request messages may be the order of the STAs included in the start frame signal, inverse order of the STAs included in the start frame signal, order of IDs of STAs included in a group which corresponds to a GID included in the start frame signal, or inverse order of the IDs of the STAs included in the group which corresponds to the GID included in the start frame signal. As a result, the order in which the STAs transmit the resource allocation request message may be any order that may distinguish order of STAs which is generated based on the parameters included in the start frame signal.

In FIG. 31, for example, it will be assumed that STA#1 113 and STA#3 117 simultaneously transmit a resource allocation request message at predetermined time on a polling frame at operations 3113 and 3131, and STA#2 115 and STA#4 117 simultaneously transmit a resource allocation request message at predetermined time on a polling frame at operations 3115 and 3133. Here, it will be assumed that the AP 111 may receive a plurality of resource allocation request messages at the same time. In FIG. 31, it will be noted that the resource allocation request message is illustrated as 'Request'.

The AP 111 allocates a resource to two STAs which the AP 111 receives the resource allocation request message, i.e., STA#1 113 and STA#2 115, that is, the AP 111 allocates the resource to STA#1 113 and STA#2 115 after a preset time, e.g., an XIFS or a contention-based interval after receiving the resource allocation request message from STA#1 113 and STA#2 115, and transmits information on the allocated resource, i.e., scheduling information at operation 3117. The XIFS denotes an arbitrary IFS. As such, an XIFS may include one of various IFSs such as an SIFS, a DIFS, a PIFS, an AIFS, and the like. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 transmits a downlink signal to each of STA#1 113 and STA#3 117 at operations 3119-1 and 3119-2. Here, it will be understood that the downlink signals may be transmitted with an overlap form. In FIG. 31, it will be noted that a downlink signal transmitted from an AP is illustrated as 'DL Data'.

After receiving the downlink signal from the AP 111, STA#1 113 and STA#3 117 may transmit an ACK signal for the received downlink signal. The STA#1 113 which has uplink data to be transmitted transmits an uplink signal including the uplink data and an ACK signal at operation 3121, STA#2 115 which has uplink data to be transmitted transmits the uplink data at operation 3123, and STA#3 117 which does not have uplink data to be transmitted transmits an ACK signal at operation 3125. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3117.

After a preset time, e.g., an SIFS, the AP 111 transmits a group ACK signal to STA#1 113 and STA#2 115 at operation 3125. In FIG. 31, the AP 111 transmits the group ACK signal to the uplink signal received from STA#1 113 and STA#2 115, however, it will be understood by those of ordinary skill in the art that the AP 111 may sequentially transmit ACK signals to the uplink signal received from STA#1 113 and STA#2 115 one to one.

Remaining STAs except for STA#1 113, STA#2 115, STA#3 117, i.e., STA#4 119 sets an NAV, and waits until receiving a group ACK signal at operations 3133 and 3135.

In FIG. 31, the STAs sequentially transmit resource allocation request messages to the AP 111. If the STAs and the AP 111 are capable of using a plurality of sub-channels at the same time, for example, if the STAs and the AP 111 operate based on an OFDMA scheme, sub-channels through which the STAs transmit resource allocation request messages and transmit/receive information may be different.

Still another example of a resource operating process performed in a WLAN system supporting a multi-user transmission scheme according to an embodiment of the present disclosure has been described with reference to FIG. 31, and still another example of a resource operating process performed in a WLAN system supporting a multi-user transmission scheme according to an embodiment of the present disclosure will be described with reference to FIG. 32.

Figure 32:
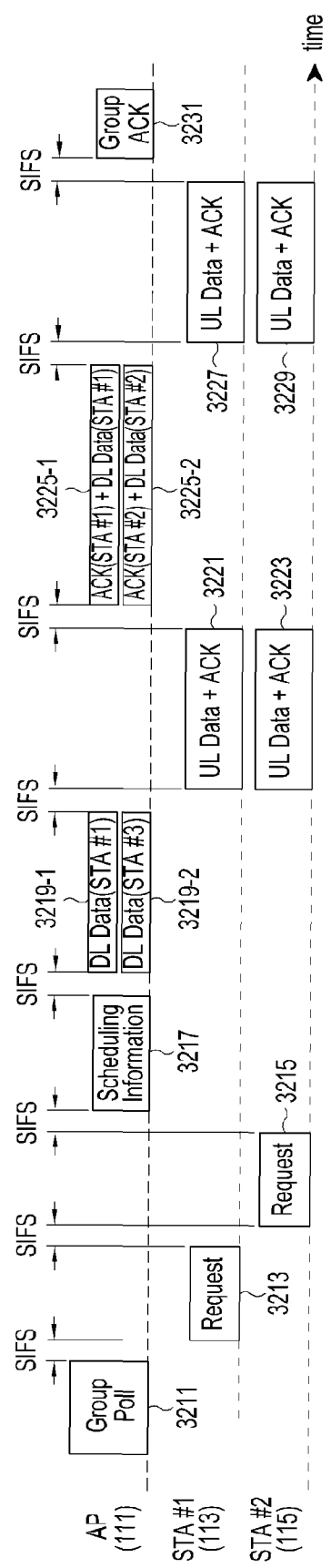
FIG. 32 schematically illustrates still another example of a resource operating process performed in a WLAN system supporting a multi-user transmission scheme according to an embodiment of the present disclosure.

FIG. 32 schematically illustrates still another example of a resource operating process performed in a WLAN system supporting a multi-user transmission scheme according to an embodiment of the present disclosure.

Referring to FIG. 32, a resource operating process in FIG. 32 is a resource operating process which is based on a contention-free scheme. The resource operating process in FIG. 32 includes: a process of performing a polling operation for related STAs based on a resource allocation request count $N_{req}$ in an AP, a process of transmitting resource allocation request messages to the AP in the STAs, a process of immediately broadcasting scheduling information in the AP, and a process of performing an uplink signal transmitting operation based on the scheduling information in the STAs, and this will be described below.

First, an AP 111 performs a polling operation for related STAs based on a resource allocation request count $N_{req}$. In FIG. 32, the resource allocation request count $N_{req}$ is set to 2. As such, the AP 111 may group poll or perform a group polling operation for each of STA#1 113 and STA#2 115 at operation 3211. In FIG. 32, a poll frame for the polling operation may be included in a start frame signal as one of various frames such as a beacon frame, a PSMP frame, a CTS-to-self frame, a modified RTS frame, and the like.

The group poll frame in operation 3211 may be transmitted thereby all STAs which exist within a network transmit a resource allocation request message, or a part of STAs which exist within a network transmits a resource allocation request message. In order that the part of the STAs transmits the resource allocation request message, the group poll frame in operation 3211 may include ID which may designate the part of the STAs, e.g., an AID, a MAC address, a PHY address, and the like. If there is a group in which STAs are included, the group poll frame in operation 3211 may include a GID of the group to designate the part of the STAs.

If each of STA#1 113 and STA#2 115 performs a monitoring operation, STA#1 113 and STA#2 115 may detect that an opportunity of transmitting a resource allocation request message is given to STA#1 113 and STA#2 115 according to the polling operation in the AP 111. Upon detecting an uplink signal is to be transmitted, STA#1 113 and STA#2 115 may transmit a resource allocation request message for allocating a resource to the AP 111. In a case that the start frame signal specifies an STA by including an ID of the STA, or specifies a related group by including a GID, and STAs sequentially perform a resource allocation request message transmitting operation as described in FIG. 32, order in which the STAs transmit resource allocation request messages may be based on order of IDs of STAs included in the start frame signal. For example, the order in which the STAs transmit the request allocation request messages may be the order of the STAs included in the start frame signal, inverse order of the STAs included in the start frame signal, order of IDs of STAs included in a group which corresponds to a GID included in the start frame signal, or inverse order of the IDs of the STAs included in the group which corresponds to the GID included in the start frame signal. As a result, the order in which the STAs transmit the resource allocation request message may be any order that may distinguish order of STAs which is generated based on the parameters included in the start frame signal.

In FIG. 32, STA#1 113 and STA#2 115 sequentially transmit a resource allocation request message to the AP 111 at operations 3213 and 3215. In FIG. 32, it will be noted that the resource allocation request message is illustrated as 'Request'.

The AP 111 allocates a resource to two STAs which the AP 111 receives the resource allocation request message, i.e., STA#1 113 and STA#2 115, that is, the AP 111 allocates the resource to STA#1 113 and STA#2 115 after a preset time, e.g., an XIFS or a contention-based interval after receiving the resource allocation request message from STA#1 113 and STA#2 115, and transmits information on the allocated resource, i.e., scheduling information at operation 3217. The XIFS denotes an arbitrary IFS. As such, an XIFS may include one of various IFSs such as an SIFS, a DIFS, a PIFS, an AIFS, and the like. Here, the scheduling information may include information on one downlink or uplink transmission which may occur within a current TXOP, or all downlink or uplink transmissions which may occur in the future. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 transmits a downlink signal to each of STA#1 113 and STA#2 115 at operations 3219-1 and 3219-2. Here, it will be understood that the downlink signals may be transmitted with an overlap form. In FIG. 32, it will be noted that a downlink signal transmitted from an AP is illustrated as 'DL Data'.

After receiving the downlink signal from the AP 111, STA#1 113 and STA#3 117 may transmit an ACK signal for the received downlink signal. The STA#1 113 which has an uplink data to be transmitted transmits an uplink signal including the uplink data and the ACK signal at operations 3221 and 3223. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3217.

After a preset time, e.g., an SIFS, the AP 111 transmits a downlink signal and an ACK signal to the uplink signal received from each of STA#1 113 and STA#2 115 at operations 3225-1 and 3225-2. Here, it will be understood that the downlink signals may be transmitted with an overlap form. In FIG. 32, it will be noted that a downlink signal transmitted from an AP is illustrated as 'DL Data'.

After receiving the downlink signal from the AP 111, STA#1 113 and STA#2 115 may transmit an ACK signal to the received downlink signal. At this time, STA#1 113 and STA#2 115 which have uplink data to be transmitted transmit an uplink signal including the uplink data and the ACK signal at operations 3227 and 3229. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3217.

After a preset time, e.g., an SIFS, the AP 111 transmits a group ACK signal to STA#1 113 and STA#2 115 at operation 3231. In FIG. 32, the AP 111 transmits the group ACK signal to the uplink signal received from STA#1 113 and STA#2 115, however, it will be understood by those of ordinary skill in the art that the AP 111 may sequentially transmit ACK signals to the uplink signal received from STA#1 113 and STA#2 115 one to one.

In FIG. 32, two downlink transmissions and two downlink transmissions are sequentially performed, however, it will be understood by those of ordinary skill in the art that this may be repetitive more than twice.

If the STAs and the AP 111 are capable of using a plurality of sub-channels at the same time, for example, if the STAs and the AP 111 operate based on an OFDMA scheme, sub-channels through which the STAs transmit resource allocation request messages and transmit/receive information may be different.

Still another example of a resource operating process performed in a WLAN system supporting a multi-user transmission scheme according to an embodiment of the present disclosure has been described with reference to FIG. 32, and still another example of a resource operating process performed in a WLAN system supporting a multi-user transmission scheme according to an embodiment of the present disclosure will be described with reference to FIG. 33.

Figure 33:
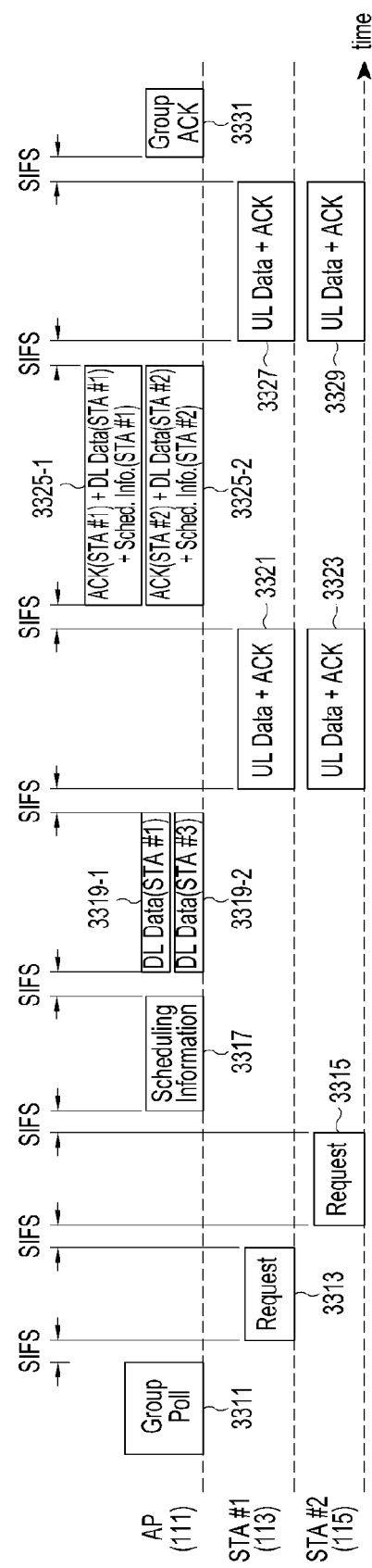
FIG. 33 schematically illustrates yet another example of a resource operating process performed in a WLAN system supporting a multi-user transmission scheme according to an embodiment of the present disclosure.

FIG. 33 schematically illustrates still another example of a resource operating process performed in a WLAN system supporting a multi-user transmission scheme according to an embodiment of the present disclosure.

Referring to FIG. 33, a resource operating process in FIG. 33 is a resource operating process which is based on a contention-free scheme. The resource operating process in FIG. 33 includes: a process of performing a polling operation for related STAs based on a resource allocation request count $N_{req}$ in an AP, a process of transmitting resource allocation request messages to the AP in the STAs, a process of immediately broadcasting scheduling information in the AP, and a process of performing an uplink signal transmitting operation based on the scheduling information in the STAs, and this will be described below.

First, an AP 111 performs a polling operation for related STAs based on a resource allocation request count $N_{req}$. In FIG. 33, the resource allocation request count $N_{req}$ is set to 2. As such, the AP 111 may group poll or perform a group polling operation for each of STA#1 113 and STA#2 115 at operation 3311. In FIG. 33, a poll frame for the polling operation may be included in a start frame signal as one of various frames such as a beacon frame, a PSMP frame, a CTS-to-self frame, a modified RTS frame, and the like.

Each of STA#1 113 and STA#2 115 performs a monitoring operation. As such, STA#1 113 and STA#2 115 may detect that an opportunity of transmitting a resource allocation request message is given to STA#1 113 and STA#2 115. So, if STA#1 113 and STA#2 115 may transmit an uplink signal, STA#1 113 and STA#2 115 may transmit a resource allocation request message for requesting resource allocation to the AP 111. In FIG. 33, STA#1 113 and STA#2 115 sequentially transmit a resource allocation request message to the AP 111 at operations 3313 and 3315. In FIG. 33, it will be noted that the resource allocation request message is illustrated as 'Request'.

The AP 111 allocates a resource to two STAs which the AP 111 receives the resource allocation request message, i.e., STA#1 113 and STA#2 115, that is, the AP 111 allocates the resource to STA#1 113 and STA#2 115 after a preset time, e.g., an XIFS or a contention-based interval after receiving the resource allocation request message from STA#1 113 and STA#2 115, and transmits information on the allocated resource, i.e., scheduling information at operation 3317. The XIFS denotes an arbitrary IFS. As such, an XIFS includes one of various IFSs such as an SIFS, a DIFS, a PIFS, an AIFS, and the like. Here, it will be assumed that the scheduling information may include information on one downlink or uplink transmission which may occur within a current TXOP. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 transmits a downlink signal to each of STA#1 113 and STA#2 115 at operations 3319-1 and 3319-2. Here, it will be understood that the downlink signals may be transmitted with an overlap form. In FIG. 33, it will be noted that a downlink signal transmitted from an AP is illustrated as 'DL Data'.

After receiving the downlink signal from the AP 111, STA#1 113 and STA#2 115 may transmit an ACK signal to the received downlink signal. The STA#1 113 and STA#2 115 which have uplink data to be transmitted transmit an uplink signal including the uplink data and the ACK signal at operations 3321 and 3323. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3317.

After a preset time, e.g., an SIFS, the AP 111 transmits a downlink signal including an ACK signal to the uplink signal received from each of STA#1 113 and STA#2 115, downlink information, and scheduling information for the next uplink transmission at operations 3325-1 and 3325-2. Here, it will be understood that the downlink signals may be transmitted with an overlap form. In FIG. 33, it will be noted that a downlink signal transmitted from an AP is illustrated as 'DL Data'.

After receiving the downlink signal from the AP 111, STA#1 113 and STA#2 115 may transmit an ACK signal to the received downlink signal. After receiving the scheduling information, STA#1 113 and STA#2 115 may transmit uplink data according to the received scheduling information. At this time, STA#1 113 and STA#2 115 which have uplink data to be transmitted transmit an uplink signal including the uplink data and the ACK signal at operations 3327 and 3329. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3317.

After a preset time, e.g., an SIFS, the AP 111 transmits a group ACK signal to STA#1 113 and STA#2 115 at operation 3331. In FIG. 33, the AP 111 transmits the group ACK signal to the uplink signal received from STA#1 113 and STA#2 115, however, it will be understood by those of ordinary skill in the art that the AP 111 may sequentially transmit ACK signals to the uplink signal received from STA#1 113 and STA#2 115 one to one.

In FIG. 33, two downlink transmissions and two downlink transmissions are sequentially performed, however, it will be understood by those of ordinary skill in the art that this may be repetitive more than twice.

If the STAs and the AP 111 are capable of using a plurality of sub-channels at the same time, for example, if the STAs and the AP 111 operate based on an OFDMA scheme, sub-channels through which the STAs transmit resource allocation request messages and transmit/receive information may be different.

Still another example of a resource operating process performed in a WLAN system supporting a multi-user transmission scheme according to an embodiment of the present disclosure has been described with reference to FIG. 33, and still another example of a resource operating process performed in a WLAN system supporting a multi-user transmission scheme according to an embodiment of the present disclosure will be described with reference to FIG. 34.

Figure 34:
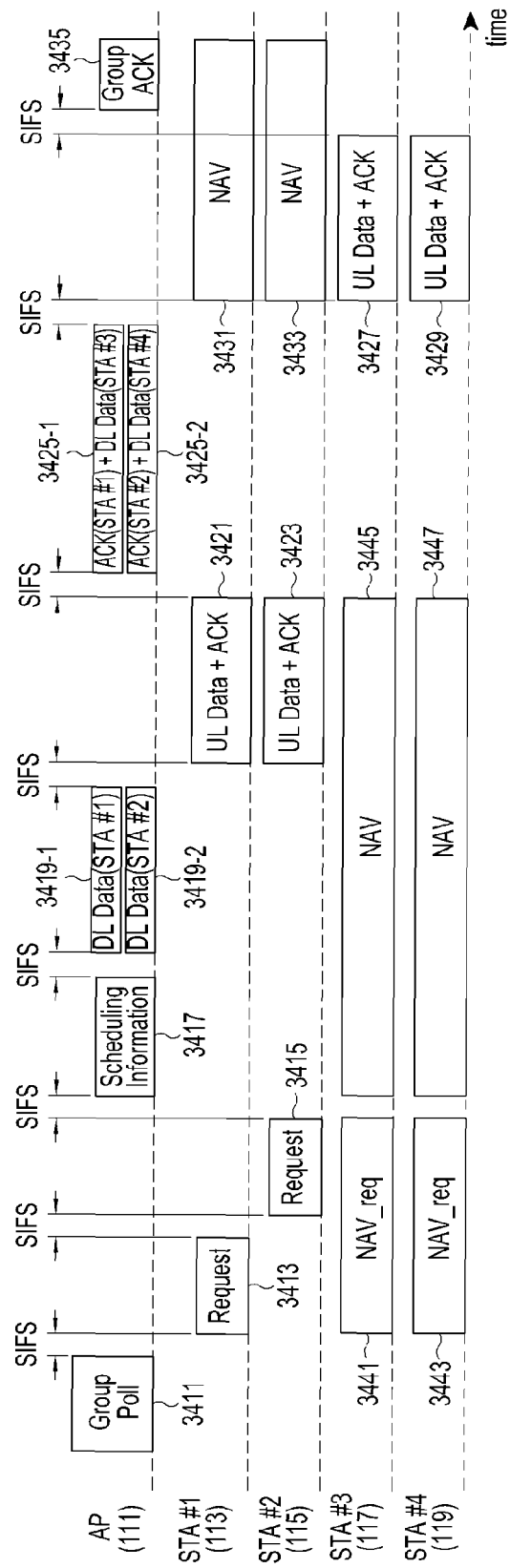
FIG. 34 schematically illustrates still another example of a resource operating process performed in a WLAN system supporting a multi-user transmission scheme according to an embodiment of the present disclosure.

FIG. 34 schematically illustrates still another example of a resource operating process performed in a WLAN system supporting a multi-user transmission scheme according to an embodiment of the present disclosure.

Referring to FIG. 34, a resource operating process in FIG. 34 is a resource operating process which is based on a contention-free scheme. The resource operating process in FIG. 34 includes: a process of performing a polling operation for related STAs based on a resource allocation request count $N_{req}$ in an AP, a process of transmitting resource allocation request messages to the AP in the STAs, a process of immediately broadcasting scheduling information in the AP, and a process of performing an uplink signal transmitting operation based on the scheduling information in the STAs, and this will be described below.

First, an AP 111 performs a polling operation for related STAs based on a resource allocation request count $N_{req}$. In FIG. 34, the resource allocation request count $N_{req}$ is set to 2. As such, the AP 111 may group poll or perform a group polling operation for STA#1 113 and STA#2 115 at operation 3411. In FIG. 34, a poll frame for the polling operation may be included in a start frame signal as one of various frames such as a beacon frame, a PSMP frame, a CTS-to-self frame, a modified RTS frame, and the like.

Each of STA#1 113 and STA#2 115 performs a monitoring operation. As such, STA#1 113 and STA#2 115 may detect that an opportunity of transmitting a resource allocation request message is given to STA#1 113 and STA#2 115.

So, if STA#1 113 and STA#2 115 may transmit an uplink signal, STA#1 113 and STA#2 115 may transmit a resource allocation request message for requesting resource allocation to the AP 111. In FIG. 34, STA#1 113 and STA#2 115 sequentially transmit a resource allocation request message to the AP 111 at operations 3413 and 3415. In FIG. 34, it will be noted that the resource allocation request message is illustrated as 'Request'.

The AP 111 allocates a resource to two STAs from which the AP 111 receives the resource allocation request message, i.e., STA#1 113 and STA#2 115, that is, the AP 111 allocates the resource to STA#1 113 and STA#2 115 after a preset time, e.g., an XIFS or a contention-based interval after receiving the resource allocation request message from STA#1 113 and STA#2 115, and transmits information on the allocated resource, i.e., scheduling information at operation 3417. The XIFS denotes an arbitrary IFS. As such, an XIFS may include one of various IFSs such as an SIFS, a DIFS, a PIFS, an AIFS, and the like. Here, it will be assumed that the scheduling information may include information on one downlink or uplink transmission which may occur within a current TXOP. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

After a preset time, e.g., an SIFS, the AP 111 transmits a downlink signal to each of STA#1 113 and STA#2 115 at operations 3419-1 and 3419-2. Here, it will be understood that the downlink signals may be transmitted with an overlap form. In FIG. 34, it will be noted that a downlink signal transmitted from an AP is illustrated as 'DL Data'.

After receiving the downlink signal from the AP 111, STA#1 113 and STA#2 115 may transmit an ACK signal to the received downlink signal. The STA#1 113 which has uplink data to be transmitted transmits an uplink signal including the uplink data and the ACK signal at operations 3421 and 3423. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3417.

After a preset time, e.g., an SIFS, the AP 111 transmits a downlink signal including an ACK signal to the uplink signal received from each of STA#1 113 and STA#2 115 and downlink information which may be transmitted to an STA#3 117 and an STA#4 119 at operations 3425-1 and 3425-2. Here, it will be understood that the downlink signals may be transmitted with an overlap form. In FIG. 34, it will be noted that a downlink signal transmitted from an AP is illustrated as 'DL Data'. At this time, it will be assumed that each STA may detect ACK signals and downlink information which are transmitted to other STAs. For example, it will be assumed that STA#1 113 and STA#3 117 use the same channel, and a physical layer protocol data unit (PPDU) including an ACK signal which may be transmitted to STA#1 113 and downlink information which may be transmitted to STA#3 117 may be transmitted with a multicast scheme or a broadcast scheme.

After receiving the downlink signal from the AP 111, STA#3 117 and STA#4 119 may transmit an ACK signal to the received downlink signal. If STA#3 117 and STA#4 119 which receives the downlink signal have uplink data to be transmitted, STA#3 117 and STA#4 119 transmit an uplink signal including the uplink data and the ACK signal at operations 3427 and 3429. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3417.

After a preset time, e.g., an SIFS, the AP 111 transmits a group ACK signal to STA#3 117 and STA#4 119 at operation 3431. In FIG. 34, the AP 111 transmits the group ACK signal for the uplink signal received from each of STA#3 117 and STA#4 119, however, it will be understood by those of ordinary skill in the art that the AP 111 may sequentially transmit ACK signals to the uplink signal received from each of STA#3 117 and STA#4 119 one to one.

In FIG. 34, two downlink transmissions and two uplink transmissions are sequentially performed, however, it will be understood by those of ordinary skill in the art that this may be repetitive more than twice.

If the STAs and the AP 111 are capable of using a plurality of sub-channels at the same time, for example, if the STAs and the AP 111 operate based on an OFDMA scheme, sub-channels through which the STAs transmit resource allocation request messages and transmit/receive information may be different.

In FIG. 34, an STA which receives downlink information recognizes the downlink information as a polling message to uplink information to transmit a PPDU including an ACK signal and the uplink information after an SIFS, however, it will be understood by those of ordinary skill in the art that an indicator used for determining whether each STA recognizes the downlink information as a polling message to uplink information may include in a group polling frame, a scheduling information frame, a beacon frame, or a control frame thereby being notified at operations 3411 and 3417. Alternatively, each STA may have the indicator of which a value is a preset value. Further, the AP 111 may determine all schedules for when each STA receives downlink information and transmits uplink information, and may notify each STA of this through the scheduling information frame at operation 3417.

At this time, in a case that each STA recognizes the downlink information as a polling message to a kind of uplink information, if it is predetermined that time of an interval may be used for uplink multi-user transmission, each STA performs an uplink multi-user transmission operation according to the time of the interval. Alternatively, if it is not predetermined that the time of the interval may be used for the uplink multi-user transmission, the AP 111 may transmit information on the time of the interval for the uplink multi-user transmission. If the information on the time of the interval for the uplink multi-user transmission is not informed to each STA, STAs may set an interval for the uplink multi-user transmission as the previous downlink transmission interval, or an interval which is obtained based on an arbitrary function of which a variable is the downlink transmission interval.

Still another example of a resource operating process performed in a WLAN system supporting a multi-user transmission scheme according to an embodiment of the present disclosure has been described with reference to FIG. 34, and still another example of a resource operating process performed in a WLAN system supporting a multi-user transmission scheme according to an embodiment of the present disclosure will be described with reference to FIG. 35.

Figure 35:
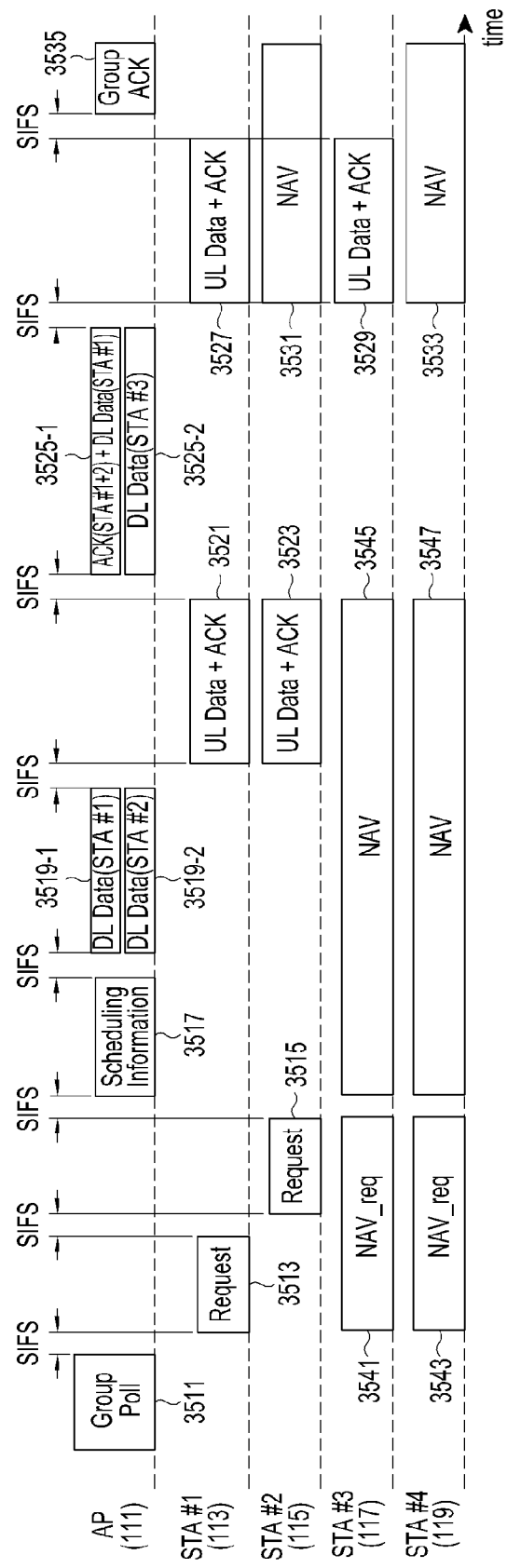
FIG. 35 schematically illustrates yet another example of a resource operating process performed in a WLAN system supporting a multi-user transmission scheme according to an embodiment of the present disclosure.

FIG. 35 schematically illustrates still another example of a resource operating process performed in a WLAN system supporting a multi-user transmission scheme according to an embodiment of the present disclosure.

Referring to FIG. 35, a resource operating process in FIG. 35 is a resource operating process which is based on a contention-free scheme. The resource operating process in FIG. 35 includes: a process of performing a polling operation on related STAs based on a resource allocation request count $N_{req}$ in an AP, a process of transmitting resource allocation request messages to the AP in the STAs, a process of immediately broadcasting scheduling information in the AP, and a process of performing an uplink signal transmitting operation based on the scheduling information in the STAs, and this will be described below.

First, an AP 111 performs a polling operation for related STAs based on a resource allocation request count $N_{req}$. In FIG. 35, the resource allocation request count $N_{req}$ is set to 2. As such, the AP 111 may group poll or perform a group polling operation for each of an STA#1 113 and an STA#2 115 at operation 3511. In FIG. 35, a poll frame for the polling operation may be included in a start frame signal as one of various frames such as a beacon frame, a PSMP frame, a CTS-to-self frame, a modified RTS frame, and the like.

Each of STA#1 113 and STA#2 115 performs a monitoring operation. As such, STA#1 113 and STA#2 115 may detect that an opportunity of transmitting a resource allocation request message is given to STA#1 113 and STA#2 115. So, if STA#1 113 and STA#2 115 may transmit an uplink signal, STA#1 113 and STA#2 115 may transmit a resource allocation request message for requesting resource allocation to the AP 111. In FIG. 35, STA#1 113 and STA#2 115 sequentially transmit a resource allocation request message to the AP 111 at operations 3513 and 3515. In FIG. 35, it will be noted that the resource allocation request message is illustrated as 'Request'.

The AP 111 allocates a resource to two STAs which the AP 111 receives the resource allocation request message, i.e., STA#1 113 and STA#2 115, that is, the AP 111 allocates the resource to STA#1 113 and STA#2 115 after a preset time, e.g., an XIFS or a contention-based interval after receiving the resource allocation request message from STA#1 113 and STA#2 115, and transmits information on the allocated resource, i.e., scheduling information at operation 3517. The scheduling information may include information on a frequency resource and a time resource which each STA may use, information on a resource which each STA may use at the same time, e.g., the number of data streams which each STA may receive at the same time, information on a channel which each STA may use at the same time, information on a frequency band which each STA may use at the same time, and the like, a timing point at which a downlink transmission and an uplink transmission are completed, and the like.

The XIFS denotes an arbitrary IFS. As such, an XIFS may include one of various IFSs such as an SIFS, a DIFS, a PIFS, an AIFS, and the like. Here, it will be assumed that the scheduling information may include information on one downlink or uplink transmission which may occur within a current TXOP.

After a preset time, e.g., an SIFS, the AP 111 transmits a downlink signal to each of STA#1 113 and STA#2 115 at operations 3519-1 and 3519-2. Here, it will be understood that the downlink signals may be transmitted with an overlap form. In FIG. 35, it will be noted that a downlink signal transmitted from an AP is illustrated as 'DL Data'.

After receiving the downlink signal from the AP 111, STA#1 113 and STA#2 115 may transmit an ACK signal to the received downlink signal. The STA#1 113 and STA#2 115 which have uplink data to be transmitted transmit an uplink signal including the uplink data and the ACK signal at operations 3521 and 3523. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3517.

After a preset time, e.g., an SIFS, the AP 111 transmits a downlink signal including an ACK signal to the uplink signal received from each of STA#1 113 and STA#2 115 and downlink information which may be transmitted to STA#1 113 and STA#3 117 at operations 3525-1 and 3525-2. Here, it will be understood that the downlink signals may be transmitted with an overlap form. In FIG. 35, it will be noted that a downlink signal transmitted from the AP 111 is illustrated as 'DL Data'.

At this time, it will be assumed that each STA may detect an ACK signal and downlink information which are transmitted to other STA. For example, it will be assumed that STA#1 113 and STA#2 115 may receive data through different channels or different data streams, and receive an ACK signal through a channel through which the AP 111 transmits an ACK signal and data. For another example, it will be assumed that STA#1 113 and STA#2 115 may receive a data stream and an ACK signal through different channels or different data streams. At this time, it will be assumed that a PPDU including downlink information may be transmitted with a multicast scheme or a broadcast scheme.

After receiving the downlink signal from the AP 111, STA#1 113 and STA#3 117 may transmit an ACK signal to the received downlink signal. If STA#1 113 and STA#3 117 which receives the downlink signal have uplink data to be transmitted, STA#3 117 and STA#4 119 transmit an uplink signal including the uplink data and the ACK signal at operations 3527 and 3529. At this time, an STA of which a length of a signal to be transmitted is less than predetermined uplink transmission time may pad remaining time with data with no information in order to acquire transmission time synchronization and transmit the signal to be transmitted. The uplink transmission time may be set to a time by the AP 111, or an uplink signal length of an STA with the longest transmission time, and information on the uplink transmission time may be informed to STAs through the scheduling information transmitting operation in operation 3517.

After a preset time, e.g., an SIFS, the AP 111 transmits a group ACK signal to STA#1 113 and STA#3 117 at operation 3531. In FIG. 35, the AP 111 transmits the group ACK signal for the uplink signal received from each of STA#1 113 and STA#3 117, however, it will be understood by those of ordinary skill in the art that the AP 111 may sequentially transmit ACK signals to the uplink signal received from each of STA#1 113 and STA#3 117 one to one.

In FIG. 35, two downlink transmissions and two downlink transmissions are sequentially performed, however, it will be understood by those of ordinary skill in the art that this may be repetitive more than twice.

If the STAs and the AP 111 are capable of using a plurality of sub-channels at the same time, for example, if the STAs and the AP 111 operate based on an OFDMA scheme, sub-channels through which the STAs transmit resource allocation request messages and transmit/receive information may be different.

In FIG. 35, an STA which receives downlink information recognizes the downlink information as a polling message to uplink information to transmit a PPDU including an ACK signal and the uplink information after an SIFS, however, it will be understood by those of ordinary skill in the art that an indicator used for determining whether each STA recognizes the downlink information as a polling message to uplink information may include in a group polling frame, a scheduling information frame, a beacon frame, or a control frame thereby being notified at operations 3511 and 3517. Further, the AP 111 may determine all schedules for when each STA receives downlink information and transmits uplink information, and may notify each STA of this through the scheduling information frame at operation 3517.

Still another example of a resource operating process performed in a WLAN system supporting a multi-user transmission scheme according to an embodiment of the present disclosure has been described with reference to FIG. 35, and an operating process of an AP in a WLAN system supporting a multi-channel according to an embodiment of the present disclosure will be described with reference to FIG. 36.

Figure 36:
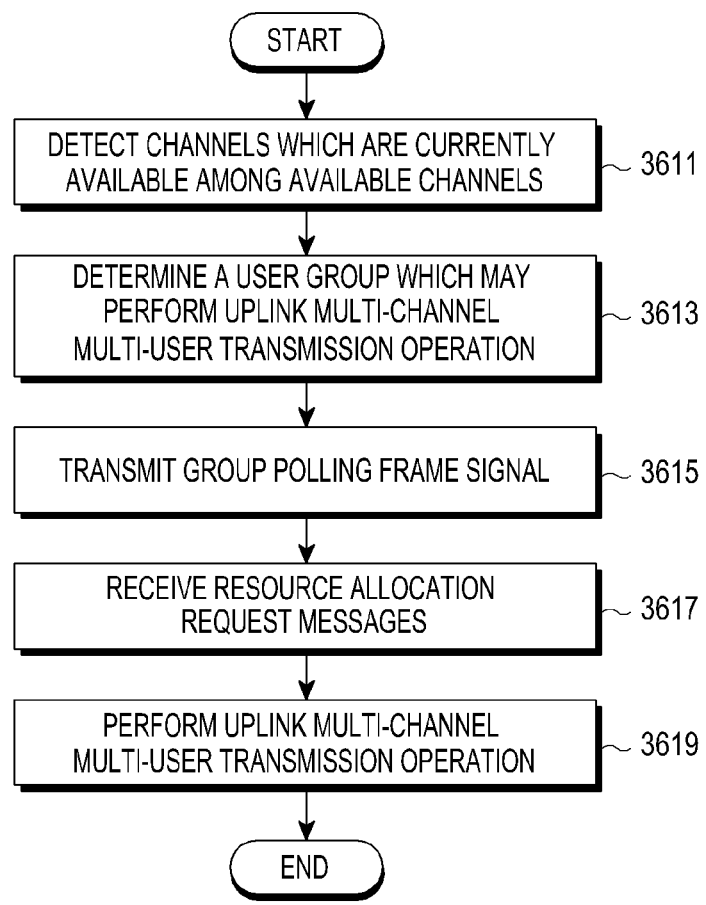
FIG. 36 schematically illustrates an operating process of an AP in a WLAN system supporting a multi-channel according to an embodiment of the present disclosure.

FIG. 36 schematically illustrates an operating process of an AP in a WLAN system supporting a multi-channel according to an embodiment of the present disclosure.

Referring to FIG. 36, it will be noted that an AP operates as a resource operating apparatus in the WLAN system.

Firstly, the AP detects channels which are currently available among available channels at operation 3611. The AP determines a user group which may perform an uplink multi-channel multi-user transmission operation at operation 3613. A process of determining the user group will be described below.

Firstly, the AP may randomly determine the user group.

Secondly, the AP may determine the user group based on at least one of the number of STAs which belongs to groups included in a BSS to which the AP belongs, a transmission probability of each STA, a traffic model, a collision probability of a channel, and the number of reception antennas $N_{rx}$. That is, the user group may be determined by a function of which a variable is one of the number of STAs which belongs to the groups included in the BSS, the transmission probability of each STA, the traffic model, the collision probability of the channel, and the number of reception antennas $N_{rx}$. The collision probability of the channel may be detected by measuring an actual collision, or may be estimated based on an uplink traffic characteristic, a downlink traffic characteristic, and the transmission probability of each STA.

As described above, it will be understood that the AP may determine the user group by considering various parameters.

Meanwhile, the AP transmits a group polling frame signal for requesting an uplink multi-channel multi-user transmission to the determined user group at operation 3615. The AP receives resource allocation request messages from STAs which belong to the user group through different channels at operation 3617. Here, it will be assumed that channels which the STAs which belong to the user group may use are predetermined. The AP performs the uplink multi-channel multi-user transmission operation with the STAs at operation 3619. For example, the AP and the STAs may operate in the manner described with reference to FIGS. 4, 8, and 30.

In FIG. 36, each STA receives the group polling frame signal, and the channels through which the uplink multi-channel multi-user transmission operation will be performed are predetermined, however, it will be understood by those of ordinary skill in the art that the AP selects a channel through which each STA may perform the uplink multi-channel multi-user transmission operation to transmit the group polling frame signal including information on the selected channel.

In FIG. 36, each STA receives the group polling frame signal, and the channels through which the uplink multi-channel multi-user transmission operation will be performed are predetermined as different channels, however, it will be understood by those of ordinary skill in the art that the AP transmits the group polling frame signal to each STA, and a channel through which each STA receives the group polling frame signal may be the same single channel.

Although FIG. 36 illustrates an operating process of an AP in a WLAN system supporting a multi-channel according to an embodiment of the present disclosure, various changes could be made to FIG. 36. For example, although shown as a series of operations, various operations in FIG. 36 could overlap, occur in parallel, occur in a different order, or occur multiple times.

An operating process of an AP in a WLAN system supporting a multi-channel according to an embodiment of the present disclosure has been described with reference to FIG. 36, and an operating process of an STA in a WLAN system supporting a multi-channel according to an embodiment of the present disclosure will be described with reference to FIG. 37.

Figure 37:
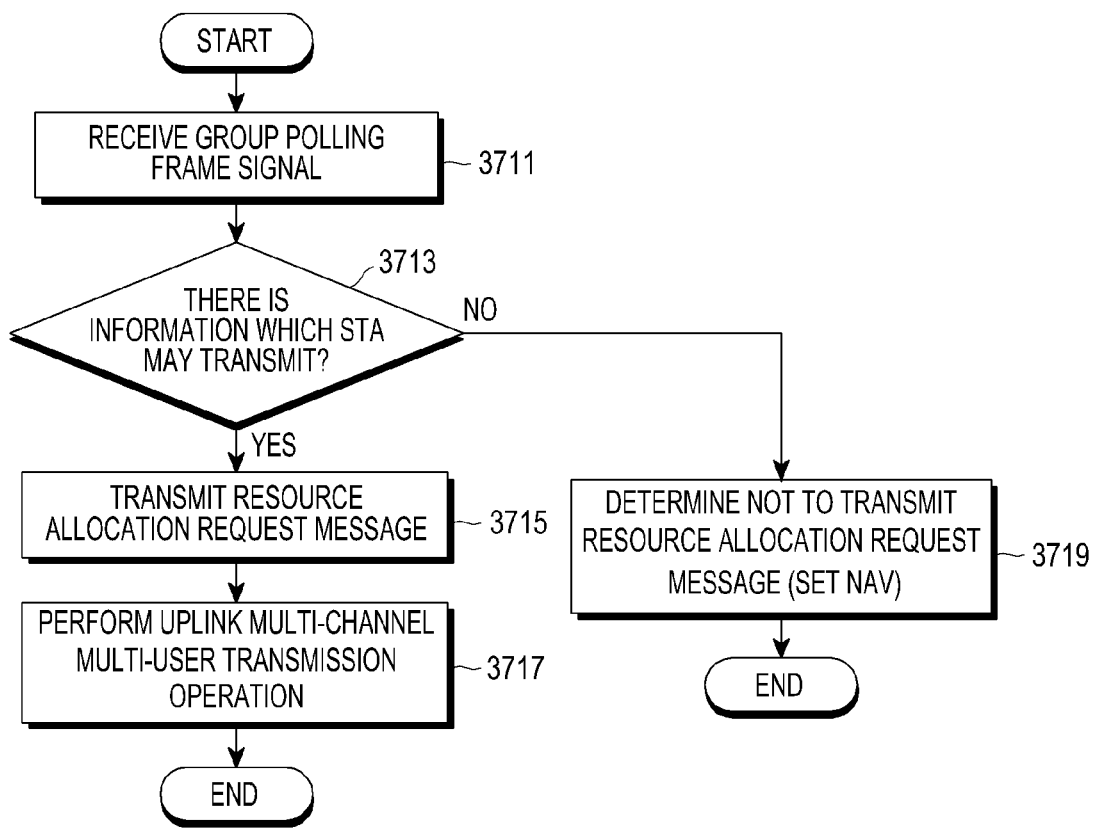
FIG. 37 schematically illustrates an operating process of an STA in a WLAN system supporting a multi-channel according to an embodiment of the present disclosure.

FIG. 37 schematically illustrates an operating process of an STA in a WLAN system supporting a multi-channel according to an embodiment of the present disclosure.

Referring to FIG. 37, the STA receives a group polling frame signal for an uplink multi-channel multi-user transmission operation from an AP at operation 3711. The STA determines whether there is information which the STA may transmit at operation 3713.

If there is the information which the STA may transmit, the STA transmits a resource allocation request message to the AP through a pre-allocated channel at operation 3715. The STA performs the uplink multi-channel multi-user transmission operation with the AP at operation 3717. For example, the STA may operate in the manner described with reference to FIG. 8.

If there is no information which the STA may transmit at operation 3713, the STA does not transmit a resource allocation request message and sets a remaining transmission interval as NAV at operation 3719. That is, the STA abandons resource allocation request and waits for an ACK signal.

In FIG. 37, each STA receives the group polling frame signal, and the channels through which the uplink multi-channel multi-user transmission operation will be performed are predetermined, however, it will be understood by those of ordinary skill in the art that the AP selects a channel through which each STA may perform the uplink multi-channel multi-user transmission operation to transmit the group polling frame signal including information on the selected channel. In this case, each STA may perform the uplink multi-channel multi-user transmission operation through a related channel based on the channel information included in the group polling frame signal.

In FIG. 37, each STA receives the group polling frame signal, and the channels through which the uplink multi-channel multi-user transmission operation will be performed are predetermined as different channels, however, it will be understood by those of ordinary skill in the art that the AP may transmit the group polling frame signal through the same single channel to each STA, and each STA may receive the group polling frame signal through the same single channel, and may perform the uplink multi-channel multi-user transmission operation based on the channel information included in the group polling frame signal.

Although FIG. 37 illustrates an operating process of an STA in a WLAN system supporting a multi-channel according to an embodiment of the present disclosure, various changes could be made to FIG. 37. For example, although shown as a series of operations, various operations in FIG. 37 could overlap, occur in parallel, occur in a different order, or occur multiple times.

An operating process of an STA in a WLAN system supporting a multi-channel according to an embodiment of the present disclosure has been described with reference to FIG. 37, and an inner structure of an AP in a WLAN system supporting a multi-user transmission scheme and a multi-channel according to an embodiment of the present disclosure will be described with reference to FIG. 38.

Figure 38:
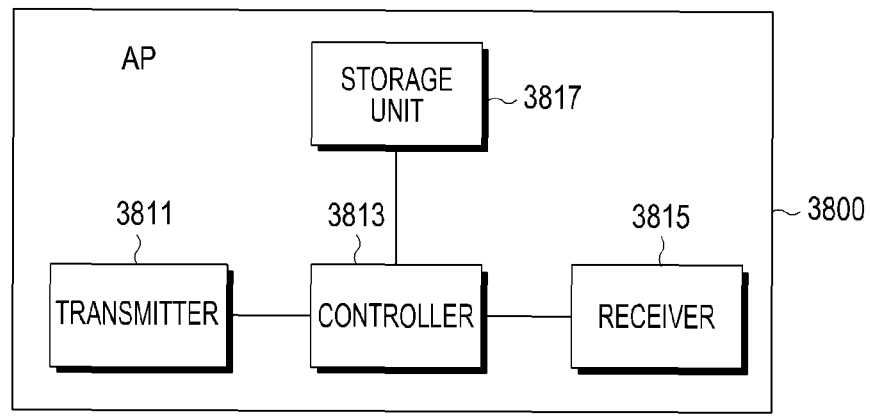
FIG. 38 schematically illustrates an inner structure of an AP in a WLAN system supporting a multi-user transmission scheme and a multi-channel according to an embodiment of the present disclosure.

FIG. 38 schematically illustrates an inner structure of an AP in a WLAN system supporting a multi-user transmission scheme and a multi-channel according to an embodiment of the present disclosure.

Referring to FIG. 38, an AP 3800 includes a transmitter 3811, a controller 3813, a receiver 3815, and a storage unit 3817.

The controller 3813 controls the overall operation of the AP 3800. More particularly, the controller 3813 controls the AP 3800 to perform an operation related to an operation of operating a resource according to an embodiment of the present disclosure, i.e., an operation of operating a resource based on a resource allocation request count $N_{req}$. The operation related to the operation of operating the resource based on the resource allocation request count $N_{req}$ according to an embodiment of the present disclosure is performed in the manner described with reference to FIGS. 3 to 37, and a description thereof will be omitted herein. Further, the controller 3813 controls the AP 3800 to perform an operation related to an uplink multi-channel multi-user transmission operation according to an embodiment of the present disclosure. The operation related to the uplink multi-channel multi-user transmission operation according to an embodiment of the present disclosure is performed in the manner described with reference to FIGS. 36 to 37, and a description thereof will be omitted herein.

The transmitter 3811 transmits various signals, various messages, and the like to an STA, and the like under a control of the controller 3813. The various signals, the various messages, and the like transmitted in the transmitter 3811 have been described in FIGS. 3 to 37, and a description thereof will be omitted herein.

The receiver 3815 receives various signals, various messages, and the like from the STA, and the like under a control of the controller 3813. The various signals, the various messages and the like received in the receiver 3815 have been described in FIGS. 3 to 37, and a description thereof will be omitted herein.

The storage unit 3817 stores a program and various data for the operation of the AP 3800, information related to the operation related to the operation of operating the resource based on the resource allocation request count $N_{req}$ according to an embodiment of the present disclosure, information related to the uplink multi-channel multi-user transmission operation according to an embodiment of the present disclosure, and the like. The storage unit 3817 stores the various signals, the various messages, and the like received in the receiver 3815.

While the transmitter 3811, the controller 3813, the receiver 3815, and the storage unit 3817 are described as separate units, it is to be understood that this is merely for convenience of description. In other words, two or more of the transmitter 3811, the controller 3813, the receiver 3815, and the storage unit 3817 may be incorporated into a single unit.

An inner structure of an AP in a WLAN system supporting a multi-user transmission scheme and a multi-channel according to an embodiment of the present disclosure has been described with reference to FIG. 38, and an inner structure of an STA in a WLAN system supporting a multi-user transmission scheme and a multi-channel according to an embodiment of the present disclosure will be described with reference to FIG. 39.

Figure 39:
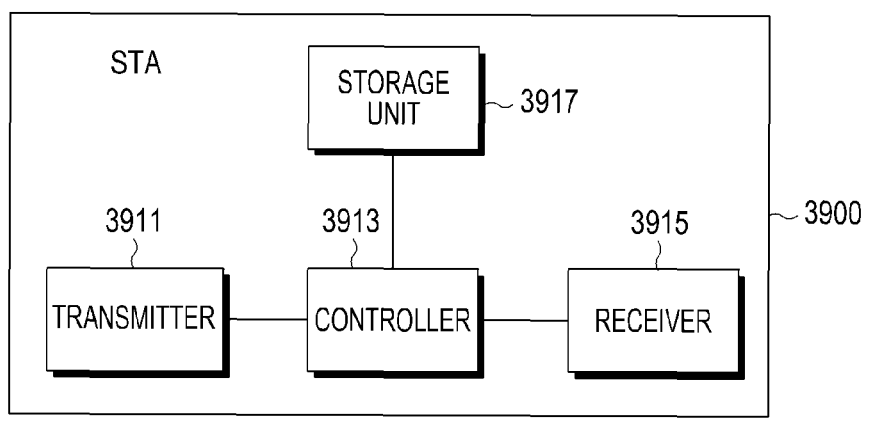
FIG. 39 schematically illustrates an inner structure of an STA in a WLAN system supporting a multi-user transmission scheme and a multi-channel according to an embodiment of the present disclosure.

FIG. 39 schematically illustrates an inner structure of an STA in a WLAN system supporting a multi-user transmission scheme and a multi-channel according to an embodiment of the present disclosure.

Referring to FIG. 39, an STA 3900 includes a transmitter 3911, a controller 3913, a receiver 3915, and a storage unit 3917.

The controller 3913 controls the overall operation of the STA 3900. More particularly, the controller 3913 controls the STA 3900 to perform an operation related to an operation of operating a resource according to an embodiment of the present disclosure, i.e., an operation of operating a resource based on a resource allocation request count $N_{req}$. The operation related to the operation of operating the resource based on the resource allocation request count $N_{req}$ according to an embodiment of the present disclosure is performed in the manner described with reference to FIGS. 3 to 37, and a description thereof will be omitted herein. Further, the controller 3913 controls the STA 3900 to perform an operation related to an uplink multi-channel multi-user transmission operation according to an embodiment of the present disclosure. The operation related to the uplink multi-channel multi-user transmission operation according to an embodiment of the present disclosure is performed in the manner described with reference to FIGS. 36 to 37, and a description thereof will be omitted herein.

The transmitter 3911 transmits various signals, various messages, and the like to an AP, and the like under a control of the controller 3913. The various signals, the various messages, and the like transmitted in the transmitter 3911 have been described in FIGS. 3 to 37, and a description thereof will be omitted herein.

The receiver 3915 receives various signals, various messages, and the like from the AP, and the like under a control of the controller 3913. The various signals, the various messages and the like received in the receiver 3915 have been described in FIGS. 3 to 37, and a description thereof will be omitted herein.

The storage unit 3917 stores a program and various data for the operation of the STA 3900, information related to the operation related to the operation of operating the resource based on the resource allocation request count $N_{req}$ according to an embodiment of the present disclosure, information related to the uplink multi-channel multi-user transmission operation according to an embodiment of the present disclosure, and the like. The storage unit 3917 stores the various signals, the various messages, and the like received in the receiver 3915.

While the transmitter 3911, the controller 3913, the receiver 3915, and the storage unit 3917 are described as separate units, it is to be understood that this is merely for convenience of description. In other words, two or more of the transmitter 3911, the controller 3913, the receiver 3915, and the storage unit 3917 may be incorporated into a single unit.

As is apparent from the foregoing description, an embodiment of the present disclosure enables to operate a resource in a WLAN system supporting a multi-user transmission scheme.

An embodiment of the present disclosure enables to operate a resource thereby preventing a collision occurrence in a WLAN system supporting a multi-user transmission scheme.

An embodiment of the present disclosure enables to operate a resource thereby decreasing service delay in a WLAN system supporting a multi-user transmission scheme.

An embodiment of the present disclosure enables to operate a resource thereby increasing wireless resource efficiency in a WLAN system supporting a multi-user transmission scheme.

An embodiment of the present disclosure enables to operate a resource based on the number of signal receiving apparatuses which are capable of requesting resource allocation in a WLAN system supporting a multi-user transmission scheme.

An embodiment of the present disclosure enables to operate a resource based on the number of antennas used in a signal transmitting apparatus in a WLAN system supporting a multi-user transmission scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy discs, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disc (CD), a digital versatile disc (DVD), a magnetic disc, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a first device in a wireless local area network (WLAN) system supporting a multi-user transmission scheme, the method comprising:
   transmitting a signal including information related to a number of resource allocation request messages to be accepted by the first device at a timing point and information related to each of second devices in which a resource allocation request message is to be transmitted at the timing point,
   wherein the resource allocation request message is to be accepted if the first device is capable of allocating a resource to each of the second devices at the timing point.

2. The method of claim 1, wherein a time interval during which each of other second devices different from the second devices waits until an acknowledgement (ACK) signal is received in each of the other second devices is set in each of the other second devices after the signal is received in each of the other second devices.

3. A method of a second device in a wireless local area network (WLAN) system supporting a multi-user transmission scheme, the method comprising:
   receiving a signal including information related to a number of resource allocation request messages to be accepted by a first device at a timing point and information related to each of second devices in which a resource allocation request message is to be transmitted at the timing point, wherein the resource allocation request message is to be accepted if the first device is capable of allocating a resource to each of the second devices at the timing point.

4. The method of claim 3, further comprising:

setting a time interval during which the second device waits until an acknowledgement (ACK) signal is received in the second device.

5. A first device in a wireless local area network (WLAN) system supporting a multi-user transmission scheme, the first device comprising:

a transceiver configured to transmit a signal including information related to a number of resource allocation request messages to be accepted by the first device at a timing point and information related to each of second devices in which a resource allocation request message is to be transmitted at the timing point, wherein the resource allocation request message is to be accepted if the first device is capable of allocating a resource to each of the second devices at the timing point.

6. The first device of claim 5, wherein a time interval during which each of other second devices different from the second devices waits until an acknowledgement (ACK) signal is received in each of the other second devices is set in each of the other second devices after the signal is received in each of the other second devices.

7. A second device in a wireless local area network (WLAN) system supporting a multi-user transmission scheme, the second device comprising:

a transceiver configured to receive a signal including information related to a number of resource allocation request messages to be accepted by a first device at a timing point and information related to each of second devices in which a resource allocation request message is to be transmitted at the timing point, wherein the resource allocation request message is to be accepted if the first device is capable of allocating a resource to each of the second devices at the timing point.

8. The second device of claim 7, further comprising:

a controller is configured to set a time interval during which the second device waits until an acknowledgement (ACK) signal is received in the second device.

* * * * *